(12) United States Patent
Estill et al.

(10) Patent No.: US 11,429,924 B2
(45) Date of Patent: Aug. 30, 2022

(54) SYSTEM FOR PARCEL TRANSPORT AND TRACKING OPERATED RESPONSIVE TO DATA BEARING RECORDS

(71) Applicant: ShipperBee, Inc., Guelph (CA)

(72) Inventors: Jim Estill, Guelph (CA); Darren Redfern, Guelph (CA)

(73) Assignee: DANBY PRODUCTS LIMITED, Guelph (CA)

( * ) Notice: Subject to any disclaimer, the term of this patent is extended or adjusted under 35 U.S.C. 154(b) by 0 days.

(21) Appl. No.: 17/189,836

(22) Filed: Mar. 2, 2021

(65) Prior Publication Data

US 2021/0182786 A1  Jun. 17, 2021

Related U.S. Application Data

(63) Continuation-in-part of application No. 16/987,841, filed on Aug. 7, 2020, now Pat. No. 11,080,646, which is a continuation-in-part of application No. 16/724,595, filed on Dec. 23, 2019, now Pat. No. 10,783,487, which is a continuation-in-part of application No. PCT/IB2019/050644, filed on Jan. 26, 2019, and a continuation-in-part of application (Continued)

(51) Int. Cl.
*G06Q 10/08* (2012.01)
*G07C 9/00* (2020.01)
*H04W 4/029* (2018.01)

(52) U.S. Cl.
CPC ..... *G06Q 10/0836* (2013.01); *G06Q 10/0835* (2013.01); *G07C 9/00571* (2013.01); *G07C 9/00896* (2013.01); *H04W 4/029* (2018.02)

(58) Field of Classification Search
CPC .......... G06Q 10/0836; G06Q 10/0835; G07C 9/00571; G07C 9/00896; G07C 9/00309; G07C 9/00912; H04W 4/029; H04W 4/90
See application file for complete search history.

(56) References Cited

U.S. PATENT DOCUMENTS

| 10,264,906 B2* | 4/2019 | Bloom ................ G06Q 20/322 |
| 11,080,646 B2* | 8/2021 | Estill .................... G06K 7/1413 |
| 2017/0255896 A1* | 9/2017 | Van Dyke .......... G06Q 10/0835 |

\* cited by examiner

*Primary Examiner* — Seung H Lee
(74) *Attorney, Agent, or Firm* — Ralph E. Jocke; Walker & Jocke

(57) ABSTRACT

A system for parcel transport and tracking that operates responsive to data bearing records includes a plurality of geographically spaced repositories. The exemplary repositories include a plurality of enclosed compartment spaces. Access to each of the enclosed compartment spaces is controlled by a respective door which is in operative connection with a respective lock of the repository. Central system circuitry in operative connection with the repositories is operative to control access to the compartment spaces and to cause compartments to be selectively accessible so that selected parcels may be placed therein or removed therefrom. At least one data store in operative connection with the central system circuitry includes record data concerning repositories and customer pickup and delivery locations. Such record data is accessible and communicable to portable wireless devices of item carriers to facilitate the pickup and delivery of parcels at repositories, customer locations and other delivery locations.

28 Claims, 55 Drawing Sheets

Related U.S. Application Data

No. 16/253,461, filed on Jan. 22, 2019, now Pat. No. 10,740,992.

(60) Provisional application No. 63/048,737, filed on Jul. 7, 2020, provisional application No. 62/784,967, filed on Dec. 26, 2018, provisional application No. 62/677,383, filed on May 29, 2018, provisional application No. 62/622,193, filed on Jan. 26, 2018.

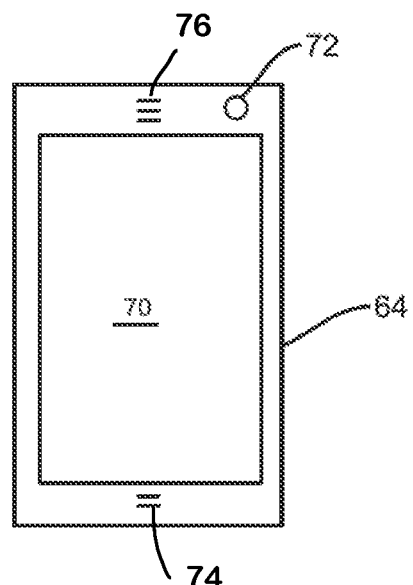
FIG. 5
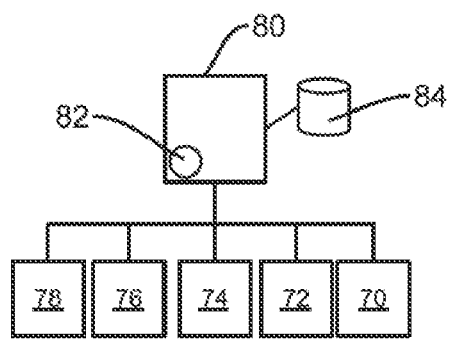
FIG. 6
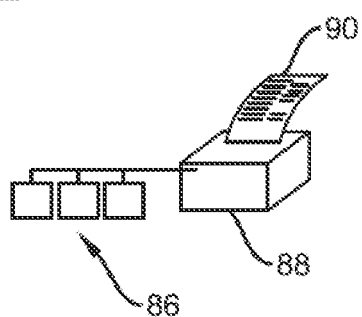

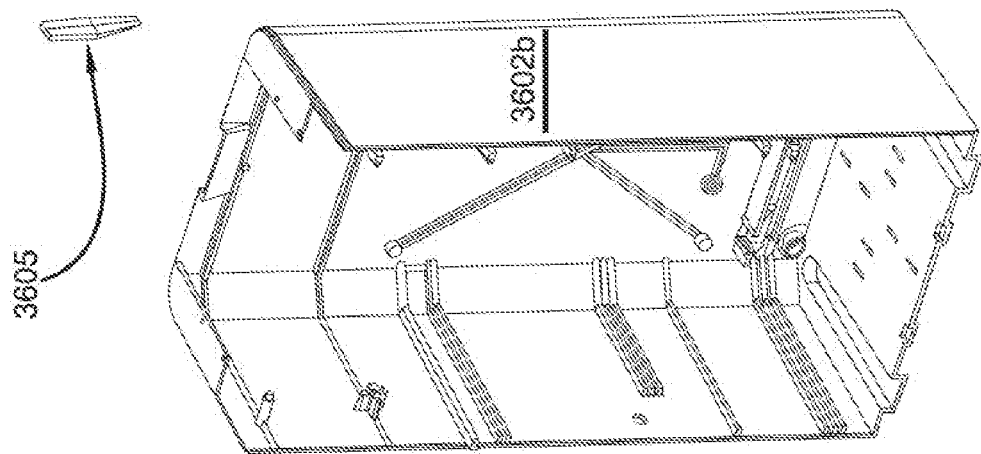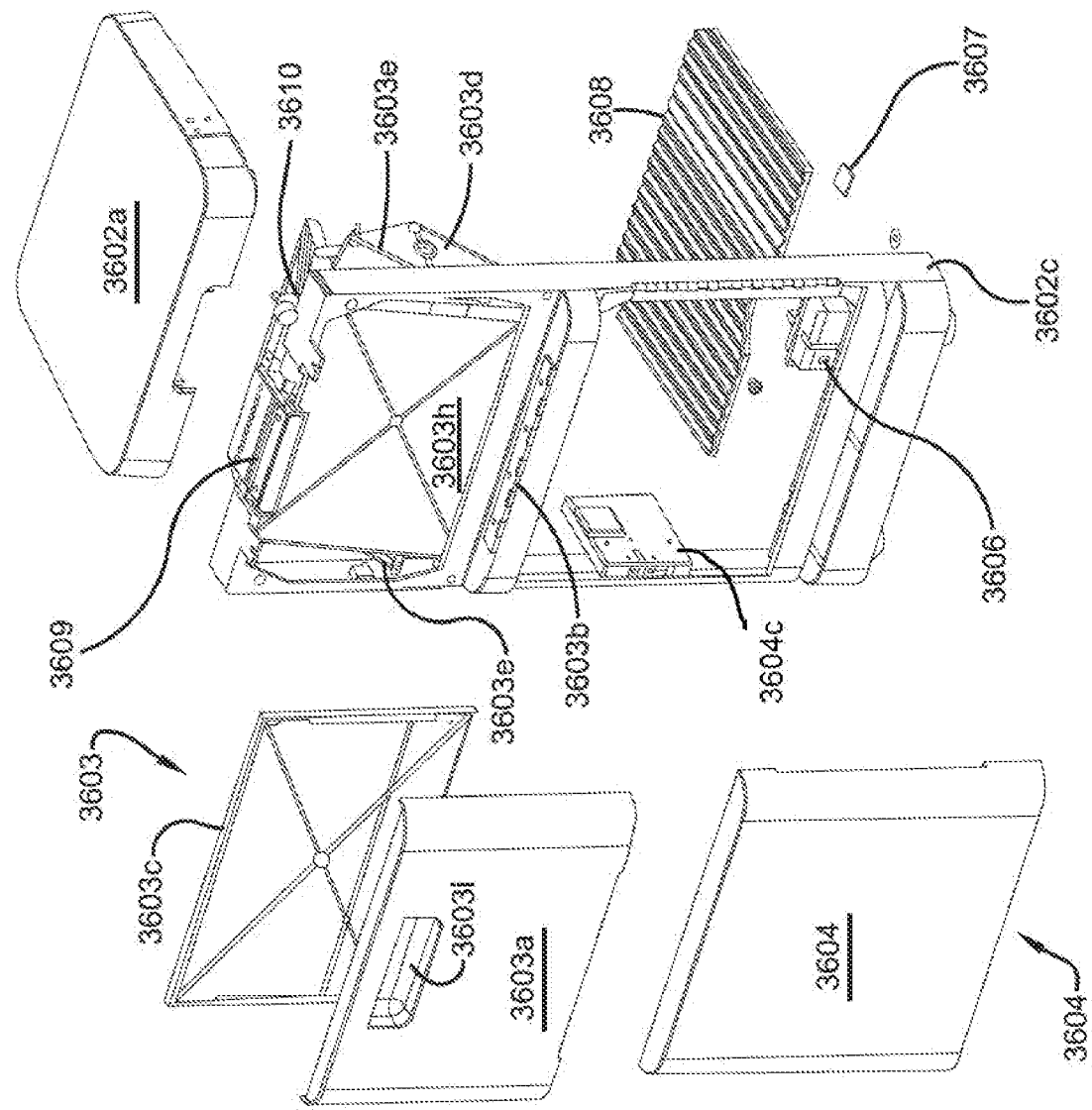
Figure 37

TYPE - REPOSITORY

STREET ADDRESS

GEOLOCATION

RELATED ADDRESS

FACILITY NAME

SECURITY

HAZARDS ⎯ 782

PARKING

HOURS

HANDLING

ROUTE

SITE CONTACT

IMAGES

REPOSITORY ID

REPOSITORY TYPE

COMPARTMENTS

COMPARTMENT SIZE

LOCKS

SENSORS

OTHER FIELDS

FIG. 51

TYPE - RESIDENTIAL CUSTOMER

STREET ADDRESS

CUSTOMER NAME

RELATED NAME

RELATED ADDRESS

GEOLOCATION – PICKUP AND DELIVERY

SECURITY

HAZARDS

PARKING

HOURS

HANDLING

ROUTE

CUSTOMER CONTACT

IMAGES

OTHER FIELDS

FIG 54

TYPE - COMMERCIAL CUSTOMER DELIVERY

STREET ADDRESS

CUSTOMER NAME

RELATED ADDRESS

RELATED CUSTOMER NAME

FACILITY NAME

GEOLOCATION - DELIVERY

SECURITY

HAZARDS

PARKING

HOURS

HANDLING

ROUTE

SITE CONTACT

IMAGES

OTHER FIELDS

FIG 55

TYPE - COMMERCIAL CUSTOMER PICKUP

STREET ADDRESS

CUSTOMER NAME

RELATED ADDRESS

RELATED CUSTOMER NAME

FACILITY NAME

GEOLOCATION - PICKUP

SECURITY

HAZARDS

PARKING ─ 818

HOURS

HANDLING

ROUTE

SITE CONTACT

IMAGES

OTHER FIELDS

FIG 56

TYPE - COMMERCIAL CUSTOMER INTERACTION

STREET ADDRESS

CUSTOMER NAME

RELATED ADDRESS

RELATED CUSTOMER NAME

FACILITY NAME

SITE CUSTOMER CONTACT

GEOLOCATION - CUSTOMER CONTACT

SECURITY

HAZARDS

PARKING

HOURS

ROUTE

IMAGES

OTHER FIELDS

FIG 57

TYPE - INTERNAL CARRIER INTERACTION

STREET ADDRESS

CUSTOMER NAME

RELATED ADDRESS

RELATED CUSTOMER NAME

FACILITY NAME

GEOLOCATION - CARRIER INTERACTION

SECURITY

HAZARDS

PARKING

HOURS

ROUTE

SITE CUSTOMER CONTACT

IMAGES

OTHER FIELDS

SYSTEM FOR PARCEL TRANSPORT AND TRACKING OPERATED RESPONSIVE TO DATA BEARING RECORDS

TECHNICAL FIELD

This invention relates to a depository apparatus and system that operates to control and record the receipt and removal of deposit items in response to data bearing records. Exemplary arrangements relate to systems that facilitate the pickup and delivery of items.

BACKGROUND

Depositories that operate to accept deposit items from users have been implemented in a number of different business environments. Commonly depositories are implemented for receiving items that are to be provided to an owner of the depository. For example, depositories have been implemented to receive financial deposits, utility bill payments or other items of value which are to be provided only to the bank, utility company or other entity that operates the depository. Generally the depositories are implemented so that once an item has been deposited therein by the user, only an authorized representative of the depository operator is enabled to access the deposited items and remove them from the depository for further processing.

Various endeavors have been made to improve depositories and the processes associated with the receipt and removal of deposit items. However, depositories and depository systems may benefit from improvements.

SUMMARY

The exemplary arrangements described herein relate to depositories (which are alternatively referred to herein as repositories) and associated systems that operate to accept and make available deposit items such as parcels to authorized users responsive at least in part to data read from data bearing records. Each exemplary depository includes a body that bounds an interior area which is configured to hold deposit items. The exemplary interior area includes one or more compartments each of which is accessible through a respective opening. Access through the opening to each compartment interior area is controlled by a respective door that is mounted in connection with the body and is movable between open and closed positions. An electronic lock is associated with each door. The lock is selectively changeable between locked and unlocked conditions. In the locked condition the lock is operative to hold the door in the closed position preventing access to the compartment.

The exemplary depository is in operative connection with at least one sensor comprising a reading device. The reading device is configured to read indicia on items such as parcels that are positionable within the interior area. The exemplary embodiment further includes at least one input device. The at least one input device is usable to input data which enables authorized users to access the interior area of the depository.

In the exemplary arrangement the depository includes control circuitry. The control circuitry is in operative connection with the at least one reading device, the at least one input device, each of the locks and at least one wireless communication device. Responsive to the receipt of user identifying information from data bearing records through the at least one input device, the control circuitry is operative to cause an access determination to be made that the received user identifying information corresponds to stored data associated with an authorized user that is authorized to access the interior area of the depository. Responsive at least in part to the determination that the data bearing record data corresponds to an authorized user, a lock associated with at least one compartment is changed from the locked condition to the unlocked condition such that the authorized user can open the door and access the compartment interior area.

The exemplary control circuitry is further operative to receive from the at least one reading device item indicia from a deposit item that is either being placed in or removed from the interior area. The exemplary control circuitry is further operative responsive to the at least one reading device to determine an action status indicative of whether the deposit item is removed from or placed into the interior area. An item determination is made through operation of the control circuitry concerning whether the item indicia that is read from the deposit item corresponds to stored data associated with a deposit item to be placed into or removed from the interior area of the depository by the authorized user.

Once the deposit item has been placed in or removed from the interior area of the depository, the door is closed and the control circuitry is operative to return the lock to the locked condition. A system in operative connection with the exemplary control circuitry is operative to track the status of the deposit item. This may include for example, tracking transport of the deposit item to another depository into which the item can be deposited by the authorized user who removed it from the first depository, so that the item may then undergo further processing activity. Alternatively, the system may enable a further authorized user to access and remove a deposit item that had been previously placed in the depository, and track the receipt of the deposit item by an authorized user that is the authorized recipient of the item. Depositories may include one or a plurality of interior areas the access to each of which is selectively controlled by a respective door and a respective lock.

Exemplary embodiments of the control circuitry associated with the depository enable determining the available space in the interior area. This enables evaluating whether the depository or a compartment therein has space available to accept a further deposit item prior to a user who is seeking to deposit an item being directed to the depository. Other exemplary arrangements include one or more indicators which operate responsive to the control circuitry and the at least one reading device, to provide indications to users that they have placed or removed proper deposit items from the interior area. Other exemplary arrangements include the ability for the depository to provide audit information that includes identifying indicia associated with deposit items currently positioned in the interior area, as well as data regarding items previously placed in or removed from the depository. Exemplary arrangements may also capture and store images of users and deposit items to further provide records of activities conducted at the depository. Further exemplary arrangements provide information to item carriers that transport items between depositories and that pickup and deliver deposit items at customer locations Numerous other features and arrangements may be used in exemplary systems to provide reliable, cost-effective deposit and item tracking capabilities.

BRIEF DESCRIPTION OF DRAWINGS

FIG. 5 is a plan view of a portable wireless device that is usable by an authorized user of the depository in connection with obtaining access thereto for placing items into or removing items from the interior area of the depository.

FIG. 6 is a schematic view of the circuitry associated with the device of FIG. 5 and an associated system for producing data bearing records that can be associated with deposit items.

FIG. 37 is an exploded perspective view of the repository depicted in FIG. 36.

FIG. 51 is a schematic view of an exemplary record data format for records stored in the at least one data store associated with the central system circuitry related to parcel repositories included in an exemplary system.

FIG. 54 is a schematic view of an exemplary record data format for records stored in the at least one data store associated with residential customers from which parcels may be picked up and to which parcels may be delivered by item carriers.

FIG. 55 is a schematic view of an exemplary record data format for records stored in the at least one data store associated with commercial customers to which parcel deliveries may be made.

FIG. 56 is a schematic view of an exemplary record data format for records stored in the at least one data store associated with commercial customers from which parcels may be picked up by item carriers.

FIG. 57 is a schematic view of an exemplary record data format for records stored in the at least one data store associated with commercial customers regarding interactions that may be carried out with the customers.

FIG. 58 is a schematic view of an exemplary record data format for records stored in the at least one data store associated with commercial customers concerning carrier interactions that may need to be carried out by item carriers at the customer locations.

DETAILED DESCRIPTION

Figure 1:
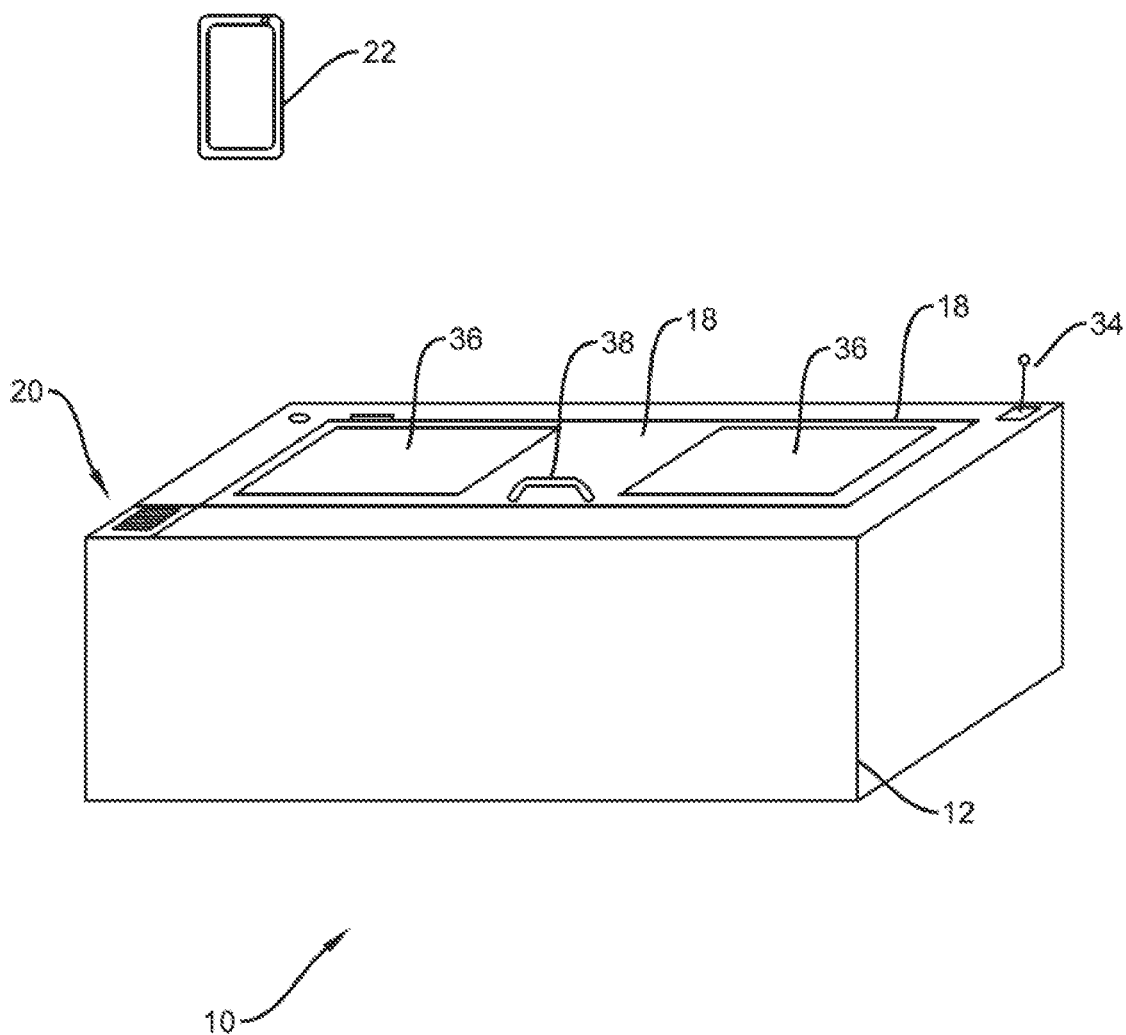
FIG. 1 is a perspective view of a depository of an exemplary embodiment with access to the interior area thereof closed, and a portable wireless device which may be used in conjunction with operation of the depository.
Figure 2:
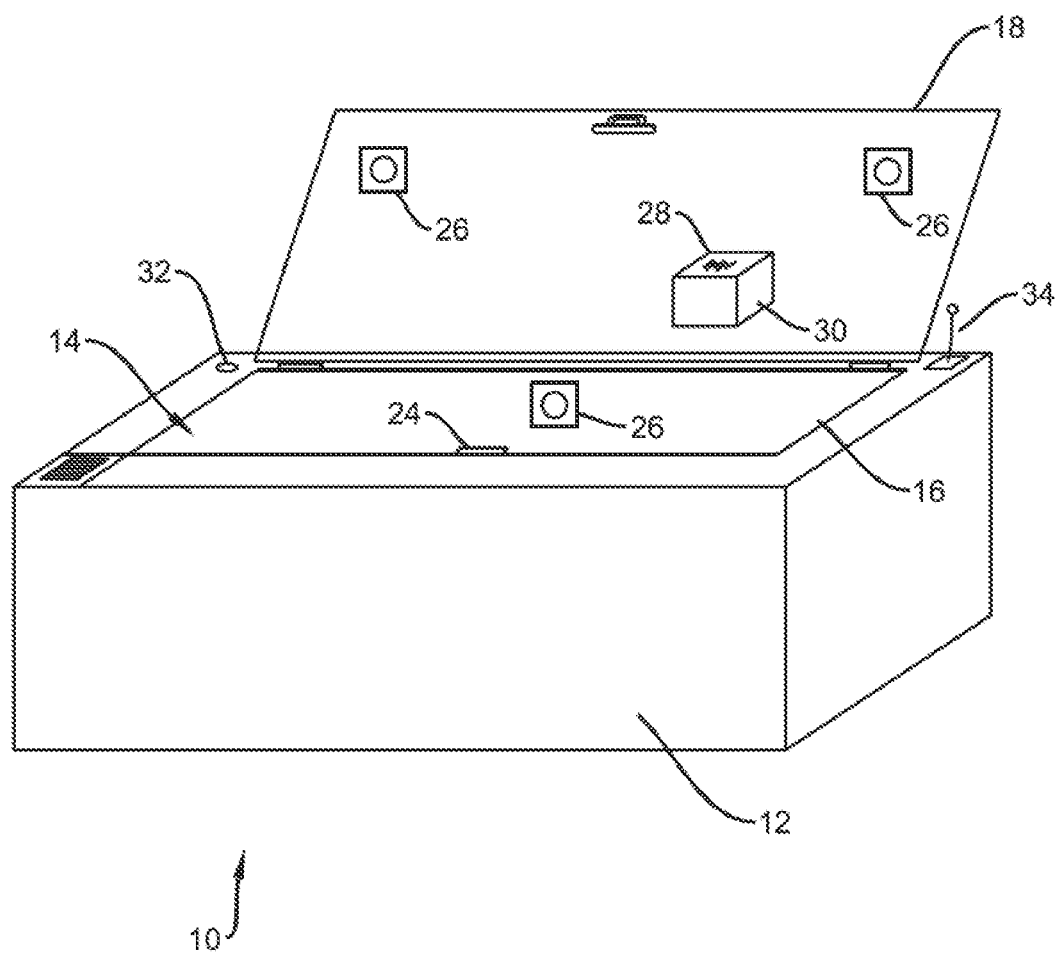
FIG. 2 is a view similar to FIG. 1 but with the interior area of the depository accessible from outside the depository.

Referring now to the drawings and particularly to FIG. 1, there is shown therein an exemplary depository generally indicated 10. A depository is alternatively referred to herein as a repository. The exemplary depository shown includes a body 12 which bounds an interior area 14 (see FIG. 2). The interior area 14 is accessible from outside the body 12 through an opening 16. A door 18 is movably mounted in operative connection with the body through hinged connections. The door 18 is sized for closing the opening 16 when the door is in a closed position as shown in FIG. 1. The door 18 is movable to an open position shown in FIG. 2 in which at least a portion of the door is disposed from the opening 16 and the interior area 14 is accessible from outside the body 12.

The exemplary depository 10 further includes at least one input device 20. In the exemplary embodiment the at least one input device includes a manually accessible input device that is operatively accessible when the door is in the closed position. In some exemplary embodiments the at least one input device 20 includes a keypad through which codes can be manually input. Further in exemplary arrangements the at least one input device includes a radio frequency (RF) input device such as a wireless transceiver that is operative to communicate wireless signals with a portable wireless device 22. In some exemplary arrangements the RF input device may include a wireless communication device that is operative to communicate signals via a Bluetooth, NFC, cellular or other wireless communication method.

In other exemplary embodiments input devices may include other types of readers or devices that are operative to receive or read indicia. Exemplary input devices may include without limitation, card readers, token readers, barcode readers, infrared readers or other types of devices that may receive inputs that are usable to determine whether access to the depository should be provided. Of course it should be understood that multiple different types of input devices may be used in operative connection with a single depository depending on the access requirements thereto.

The exemplary depository further includes at least one electrically actuated lock 24. In the exemplary embodiment the lock is changeable between a locked condition in which the door 18 is held in a closed position, and an unlocked condition in which the door is enabled to be moved from the closed position to the open position. The exemplary depository is in operative connection with at least one sensor which comprises a reading device 26. In the exemplary embodiment the at least one reading device may include one or a plurality of image capture devices including at least one camera. In other arrangements the reader may comprise a portable wireless device. The at least one reading device of the exemplary arrangement is usable to read machine readable indicia 28 that is included on deposit items 30. In exemplary arrangements the reading devices 26 are operative to read indicia such as bar codes (including without limitation two-dimensional bar codes and QR codes) that are included on deposit items. Further in exemplary arrangements the at least one reading device is operative to capture information usable to make a status determination that a deposit item is removed from or placed into the interior area of the depository. It should be understood however that although in the exemplary embodiment the sensors comprising reading devices operate to read visible indicia and capture images, in other arrangements other types of reading devices that read different types of signals or indicia may be utilized. This may include for example, card readers, fingerprint readers or other types of biometric readers including cameras or microphones, LIDAR image capture devices and readers that are capable of communicating using wireless signals such as the wireless input devices previously discussed.

The exemplary depository 10 further includes at least one indicator 32. As later discussed, the exemplary at least one indicator may include an output device operative to provide an indication as to whether a deposit item that is being placed in or removed from the interior area of the depository is a correct item to be removed by the particular user who has accessed the depository. In other exemplary arrangements, the at least one indicator may include an output device in operative connection with the depository, such as an output device of a user's portable wireless device. The exemplary depository further includes at least one sensor that comprises a weight sensor 43. The at least one weight sensor is usable to determine the weight of one or more items that are within an interior area of the depository. The exemplary depository further includes a wireless communication device 34. The wireless communication device which is alternatively referred to herein as a wireless communication portal or a wireless communication interface is operative to enable the control circuitry associated with the depository to communicate with one or more local or remote systems or devices as later discussed. In some arrangements, the wireless communications device may include a wireless input device 20. Exemplary depository 10 further includes solar panels 36. The exemplary solar panels 36 are in supported connection with the door 18 and are suitable for providing electrical power to the depository from exposure of the solar panels to sunlight. In the exemplary arrangement a manually engageable handle 38 is in operative connection with the door 18 to facilitate the manual opening and closing thereof by authorized users. Of course it should be understood that these depository devices and configurations are exemplary and in other embodiments other configurations may be used.

Figure 3:
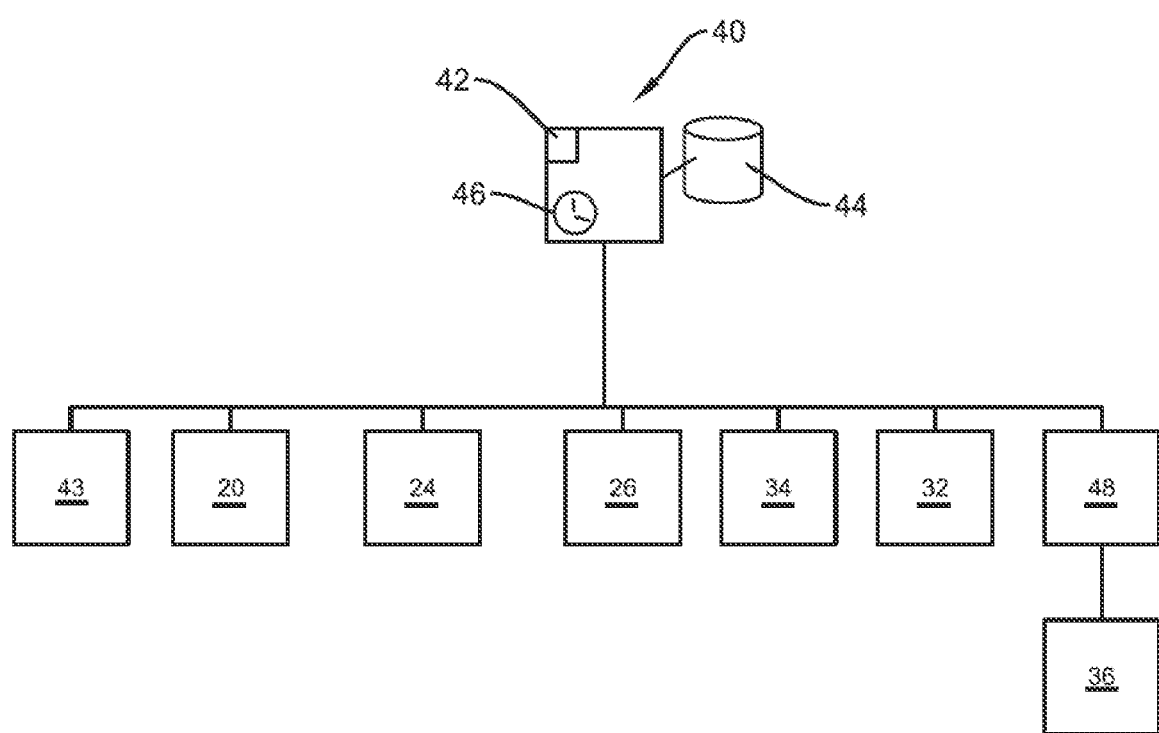
FIG. 3 is a schematic view of exemplary control circuitry used in connection with the depository.

As shown schematically in FIG. 3 the exemplary depository is in operative correction with control circuitry 40. The exemplary control circuitry includes one or more circuits which are operative to communicate electrical signals and control the operation of the devices of the depository. The control circuitry may be located proximate to the depository or may have some portions remotely located therefrom. In the exemplary arrangement the control circuitry 40 includes at least one circuit including at least one processor schematically indicated 42 and at least one data store schematically indicated at 44. In exemplary arrangements the processor may include a processor suitable for carrying out circuit executable instructions that are stored in the one or more associated data stores. The processor includes or is in operative connection with a non-volatile storage medium including instructions that include a basic input/output system (BIOS). For example, the processor may correspond to one or more of a combination of a CPU, FPGA, ASIC or any other integrated circuit or other type of circuit that is capable of processing data and instructions. The one or more data stores may correspond to one or more of volatile or non-volatile memories such as random access memory, flash memory, magnetic memory, optical memory, solid state memory or other devices that are operative to store computer executable instructions and data. Processor executable instructions may include instructions in any of a plurality of programming languages and formats including, without limitation, routines, subroutines, programs, scripts, threads of execution, objects, methodologies and functions which carry out the actions such as those described herein. Structures for processors may include, correspond to and utilize the principles described in the textbook entitled Microprocessor Architecture, Programming and Applications with the 8085 by Ramesh S. Gaonker (Prentice Hall 2002), which is incorporated herein by reference in its entirety. Exemplary arrangements may include processors made by Intel Corporation, Advanced Micro Devices or other suitable types of processors. Of course it should be understood that these processors are exemplary of many types of processors that may be used.

The exemplary data stores used in connection with exemplary embodiments may include one or more of several types of mediums suitable for holding circuit executable instructions and data. Such instructions and data may be non-transitory. These may include for example, magnetic media, optical media, solid-state media or other types of media such as RAM, ROM, PROM, flash memory, computer hard drives or any other form of media suitable for holding data and circuit executable instructions. Exemplary control circuitry may include other components such as hardware and/or software interfaces for communication with devices within the depository or for communication with external devices and systems. The exemplary control circuitry 40 further includes a clock 46. The clock is operative to provide time functions in connection with operation of the depository and associated systems as later discussed.

As represented in FIG. 3 the control circuitry 40 is in operative connection with the at least one input device 20, the lock 24 and the at least one sensor including the at least one reading device 26. The control circuitry 40 is further in operative connection with the at least one indicator 32, the at least one weight sensor 43 and the at least one wireless communication device 34. In the exemplary arrangement the devices of the depository and the control circuitry are powered by a battery 48. The battery 48 is in operative connection with the solar panels 36. The control circuitry is operative to control the delivery of power to the battery such that the battery maintains a suitable power level for operating the depository during both light and darkness. However other embodiments may include other power sources, including the ability to connect to a suitable available supply of household current or other power for purposes of operating the depository.

While the exemplary depository includes a single interior area for holding deposit items, other depositories may have other configurations. Such other configurations may include a plurality of interior areas or compartments, each of which are accessible via a respective opening, each of which openings has an associated closable door, drawer or other closure member, each of which is referred to herein as a door for brevity. Exemplary arrangements of depositories including a plurality of interior areas are discussed hereafter in this detailed description.

Figure 4:
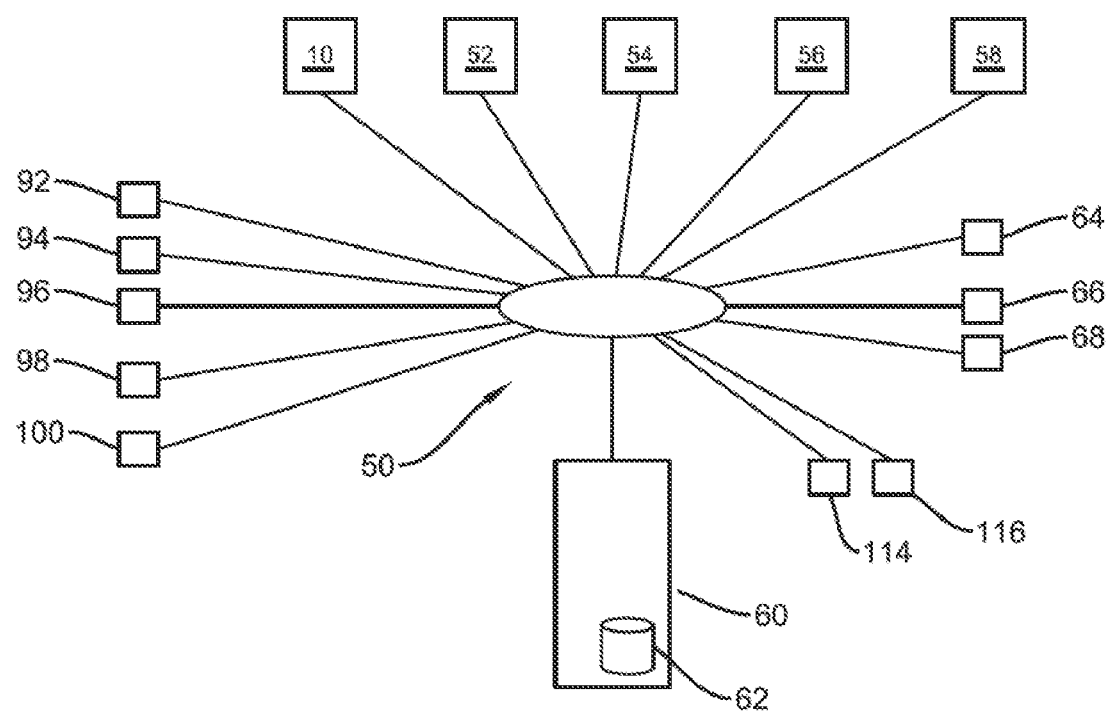
FIG. 4 is a schematic view of a network in which the exemplary depository may be operative.

FIG. 4 shows schematically an exemplary network 50 in which depository 10 may be operated. It should be understood that this exemplary network arrangement is shown schematically and in exemplary arrangements the network may include a plurality of interconnected networks.

In the exemplary arrangement a plurality of depositories 10, 52, 54, 56 and 58 are in operative connection with the network. In exemplary arrangements all these depositories may be similar to depository 10 previously discussed. The control circuitry associated with each of the depositories is operative to communicate in the network through the respective wireless communication device associated with the depository which may be alternatively referred to herein as a wireless transceiver. Of course it should be understood that in other arrangements the depositories may be in operative connection with one or more networks via other wired or wireless communication methods. Further it should be understood that exemplary embodiments may include a much larger number of depositories than is represented in FIG. 4.

The exemplary network 50 is in operative connection with central system circuitry 60. The exemplary central circuitry includes one or more processors and data stores of the types previously discussed. In some arrangements the central system circuitry 60 which is alternatively referred to herein as central circuitry, may include one or more servers with associated data stores 62 that perform the functions hereinafter described. Exemplary arrangements may include central system circuitry located at a single location, or central system circuitry in a distributed arrangement of control circuitry which operates in a cloud environment, virtual server environment or other suitable environment for performing the functions described herein. Numerous different types of central system circuitry arrangements may be utilized in connection with exemplary embodiments.

The exemplary network further includes a plurality of portable wireless devices that are operated by users who wish to send deposit items to others or to receive deposit items from others through the use of the depositories and associated system. Devices 64, 66 and 68 in FIG. 4 are representative of devices associated with individuals who send and/or receive deposit items.

In exemplary arrangements the devices may comprise portable wireless devices associated with users who are registered users of the system. In some exemplary arrangements the registered users may have stored in at least one data store associated with the central system circuitry, user identifying data such as an ID token that uniquely identifies the registered user, contact data associated with a device of the registered user such as a communication address such as a phone number or network address associated with a user's portable wireless device, funds source data that corresponds to a source of funds such as a credit or debit card account or similar monetary account which in exemplary arrangements may be credited or debited through operation of the system, as well as other associated data. Of course it should be understood that this data that is associated with registered system users is exemplary and in other arrangements other types of registered user information may be utilized.

FIGS. 5 and 6 show an exemplary portable wireless device 64 that is used by such users in the exemplary network. Devices 66 and 68 may be similar to device 64. Device 64 in some exemplary arrangements may include a portable smart phone or other portable wireless device which includes user input devices and user output devices such as an associated touchscreen 70. The exemplary device 64 may include other input devices such as a camera 72, as well as an audio input device such as a microphone 74 and an audio output device such as a speaker 76. A biometric reader such as the camera, the microphone or other reader such as a fingerprint reader may also be included. The exemplary device 64 further includes at least one wireless communication device 78. The at least one wireless communication device may include a device suitable for Wi-Fi or cellular communications. The at least one wireless communication device 78 may also include a local RF communication device for providing Bluetooth or NFC communication. Of course these devices are exemplary.

The exemplary device further includes control circuitry 80. The control circuitry is similar to that previously discussed and may include at least one processor 82 and at least one data store like those previously described. The exemplary control circuitry is in operative connection with the component devices of the device 64 as shown in FIG. 6. In addition to communicating in the network 50, the exemplary device 64 is also enabled to communicate with other devices in other networks such as network 86. Network 86 may include a printer 88 or other device that is operative to produce data bearing records 90. Such data bearing records may include labels bearing parcel identifying indicia or other data suitable for use in connection with the exemplary embodiments later discussed.

The exemplary network 50 is also in communication with the plurality of portable wireless devices associated with individuals who are item carriers that transport deposit items between depositories. These portable wireless devices schematically indicated 92, 94, 96, 98 and 100 may be used by authorized and/or registered system users to access depositories for purposes of placing deposit items therein or removing deposit items therefrom. Deposit items are alternatively referred to herein as delivery items or parcels.

Figure 7:
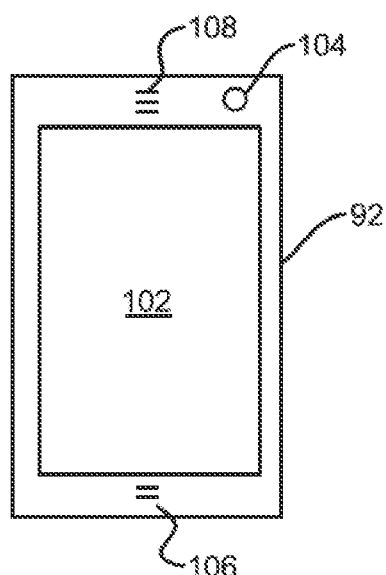
FIG. 7 is a plan view of the portable wireless device that may be used by an authorized user to access the interior area of a depository for purposes of taking deposit items therein for transport.
Figure 8:
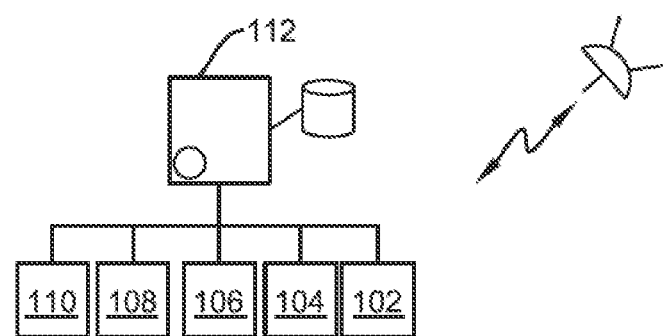
FIG. 8 is a schematic view of circuitry associated with the device of FIG. 7, including the capabilities for tracking the device and deposit items associated with the user thereof.

As represented in FIGS. 7 and 8 the exemplary portable wireless devices such as device 92, that is operated as a carrier contact device by an individual user who is an item carrier that transports deposit items, may include mobile phone devices including an input output device such as a touchscreen 102. Devices 94, 96, 98 and 100 may be similar to device 92. Exemplary device 92 may further include a camera 104, as well as a microphone 106 and a speaker 108. It may also include other types of biometric readers and other devices. The exemplary device 92 further includes at least one wireless communication device 110. The at least one wireless communication device 110 may include a Wi-Fi interface, cellular phone interface, Bluetooth, NFC or other wireless interface of the types previously discussed. Further in the exemplary arrangement device 92 includes a wireless communication interface suitable for providing tracking of the device via a global positioning system (GPS). The GPS capability enables tracking the device as well as the item carrier user and deposit items associated therewith in a manner that is later discussed. Alternatively, cellular tracking systems or other tracking systems may be used. The exemplary device further includes control circuitry 112. The control circuitry 112 includes at least one processor and at least one data store of the types previously described. The control circuitry 112 enables operation of the device 92 in the manner later discussed.

The exemplary network 50 is also in operative connection with portable wireless devices which are operated by entities that are owners of respective depositories or other entities having responsibility for depositories, which are also referred to as owners herein. Such owners are registered system users in the exemplary arrangement. These portable wireless devices schematically represented 114, 116 in FIG. 4 may be similar in exemplary embodiments to wireless device 64 previously discussed. However such devices may further include circuit executable instructions that additionally provide capabilities for the owner of the depository to receive payments from the operator of the system for the use of their depositories in connection with the storage and transport of deposit items. In exemplary arrangements such payments are made for the receipt, storage or delivery of deposit items that are placed into the depository by third parties for purposes of having the deposit items transported to an entity other than the entity associated with the particular depository into which the item is deposited or received into the repository for purposes of pickup by another delivery item recipient.

It should be understood that the network configuration 50 and the devices in operative connection therewith are exemplary. Numerous other types of devices, network configurations and arrangements may be utilized in connection with exemplary embodiments. Further while the exemplary devices operated by users of the system have been generally described as portable wireless devices, it should be understood that other types of stationary or portable computer devices may be operated in connection with the system to carry out the functions described herein.

In exemplary arrangements the central system circuitry 60 is operative to include in at least one or more associated data stores 62, data records related to devices that are utilized in connection with the exemplary system. For example in exemplary arrangements the data stores include identifying data regarding each depository and its respective location. Data stores may include data regarding registered system users of the types previously discussed. The stored data regarding depositories in exemplary embodiments also includes data regarding the entity that is the owner of the depository, and restrictions that the entity who is the owner of the depository may have placed on the use thereof. For example in some arrangements the owner of the depository may restrict use solely to receiving therein or having removed therefrom deposit items that are received or sent by the owner of the depository. Other depository owners may establish rules which allow other entities to provide deposit items into the depository for transport elsewhere, or to receive items in the depository that can be taken from the depository by the authorized recipient entities.

Other exemplary rules that may be established in connection with depositories may include only having the depository available to be accessed by certain transport users, such as users who have achieved a certain security level or performance rating. This may include for example transport users for deposit items who have achieved above a certain rating based on background checks and/or measured metrics for performance, reliability and dependability. Other rules associated with depositories may include restrictions on days of the week and/or times during particular days when entities other than the depository owner are permitted to access the depository. Numerous different restrictions may be set for depositories by depository owners or the central system circuitry operator for purposes of operating the depository in connection with the system.

In addition stored data regarding depositories may include information related to security features or other features associated with the depository. For example in order to provide secure communication between the central circuitry and each depository, the depository and the central circuitry may have respective public and private key pairs and digital certificates that enable secure communication between the central circuitry and the control circuitry of the respective depository. This enables the control circuitry of the depository and the central circuitry to identify the system originating messages and to be assured of the origin of received messages. In addition the central circuitry and the control circuitry of each depository may include respective programming that enables the sending of instructions or other messages which enable the operation or performance of certain functions. For example the control circuitry of the respective depository may include programming from the central system that is operative to cause the locking or unlocking of the respective lock of the depository in response to the receipt of certain messages and/or data by the depository from the central system. Further in exemplary arrangements the central system may be operative to cause the control circuitry of a respective depository to operate the plurality of reading devices therein for purposes of determining the amount of space that is currently available in the interior area of the depository. Such functionality may enable the central circuitry to determine the ability of the particular depository to accept therein a deposit item having a particular size that may be available for deposit into the depository.

Further in exemplary embodiments the central circuitry may operate in accordance with its programming to maintain data corresponding to the indicia associated with deposit items that are currently positioned in the interior area of each depository. Further, in exemplary arrangements the central system may communicate with a respective depository so as to cause the control circuitry thereof to deliver to the central circuitry, data corresponding to activities that have been conducted at the depository. This may include not only the indicia usable to identify deposit items currently therein, but also historical record data related to deposit items placed into the depository and/or deposit items removed therefrom, and data associated with the users and times associated with each respective activity that has occurred. In exemplary arrangements each depository may also operate to have its control circuitry store images associated with activities that occur at the depository. This may include images of each user who places a deposit item into or removes a deposit item from the interior area of the depository. Such image data may also include item identifying indicia included on each item that is placed in or removed from the depository by the authorized user as well as other data associated with each event or activity that has occurred. Instructions communicated from the central circuitry may be operative to cause the control circuitry of a respective depository to send image data corresponding to the captured images associated with the activities that have occurred at the depository. This may further enable documenting the deposit or removal of deposit items as well as facilitate resolving any discrepancies which may occur. Of course these functions and capabilities, and stored record data of the central circuitry and each depository is exemplary, and in other embodiments other approaches may be used.

Further in exemplary embodiments the central system circuitry 60 is operative to include in the at least one data store 62 information regarding the devices and authorized and/or registered users who utilize the depositories included in the system. For example in an exemplary embodiment the central circuitry is operative to include the information shown in FIG. 9 for the devices such as devices 92, 94, 96, 98 and 100 that are operated by the authorized users who access the depositories and transport deposit items. In the exemplary arrangements each of the authorized and/or registered users has included in the data store associated with their portable wireless device, identifying data that is usable in conjunction with the depositories to indicate that the user of the device is an authorized and/or registered user. Such data may include for example, ID token information which can be utilized to identify the user as an authorized and/or registered user. Such token information may include digital information that can be correlated through operation of the central circuitry with the identity of the particular individual that is associated with operation of the particular device. In addition such token information may include other types of data which can be used for identification purposes. Such other types of data may include for example, user biometric data such as fingerprint data, iris scan data or other data that comprises record data that is uniquely associated with the user.

Further in other exemplary arrangements stored data regarding users may include other record data which may be utilized in connection with operation of the system. For example in systems that utilize card data for purposes of accessing depositories, the record data maintained by the central circuitry may include the data corresponding to the respective user's card data and other associated data for the respective user. This enables the system to compare the data received through the at least one input device of a depository, to stored data so as to identify the person seeking access to the depository as an authorized user who is appropriately authorized to have access thereto. Of course the approaches described in connection with the authorized users are exemplary, and in other embodiments other approaches may be used.

Figure 9:
FIG. 9 is a schematic view of types of data bearing records included in an exemplary system related to authorized users who transport deposit items between depositories.

Further as described in connection with FIG. 9, the record data associated with devices operated by users who transport items may include information regarding payments to such users. In the exemplary system the users who transport items between the depositories are paid for the transport services. The payment for services may be based on certain information regarding the particular depository item that is transported such as, the size of the item, the weight of the item, the distance and timing associated with such transport and other factors. The exemplary data that is stored by the central circuitry further includes data regarding payments that are made to the individuals who perform the transport services. Such payment data may also include data such as account data associated with a funds source of the user which enables the making of the payments to the user for the services provided. Alternatively such funds source data may be associated with an account that can be credited for amounts payable or refundable. This may include for example, information regarding a PayPal account, a Venmo account, a bank account, an electronic stored value account or other accounts into which appropriate payments to such users may be made.

Further in the exemplary arrangement the central circuitry is operative to include data regarding the activities that are performed by each respective user who is an item carrier that transports deposit items in connection with the system. Such data may include contact data for the mobile wireless carrier contact device of the item carrier such as a communication address of the carrier contact device. Such data may include metrics which include information on the timeliness and reliability of the particular individual. For example as later discussed, transport activities associated with particular deposit items are assigned by the system to the particular authorized user, and the activity is reserved to the user for a particular time. In cases where the particular user that is initially assigned to the activity does not perform the activity within the allotted time, the system is operative to reassign the activity to another item carrier user. Such events where an activity is not performed by a user is considered significant to the user's performance. Likewise in situations where an authorized user has taken longer than would normally be expected to accomplish the transport of the deposit item to a depository destination, such factors would also be significant in terms of the user's associated metrics. Losses of items and cases of misdirected deposit items are also significant metrics. These and other metrics are recorded through operation of the central system circuitry with regard to each authorized item carrier transport user.

Further the exemplary central system circuitry is operative to apply ratings to each authorized user based on the metrics that are associated with the user's performance. Such user ratings may be utilized in connection with screening authorized users for purposes of accessing certain depositories and/or handling certain types or values of deposit items. Such ratings may also be utilized in connection with determining the rate that is paid to the user for the transport activities that are performed. Of course these categories that are represented in FIG. 9 are exemplary and in other embodiments other or additional information regarding such users may be stored and evaluated through operation of the central circuitry.

Figure 10:
FIG. 10 is a schematic view listing types of data bearing records included in an exemplary system associated with depositories related to authorized users who place deposit items in depositories for subsequent transport and/or who remove items from depositories for purposes of receiving such items.

FIG. 10 shows exemplary records and data items that may be associated with shipper and recipient users and their associated devices that place items into depositories for purposes of requesting deliveries to other depositories and/or that receive items from depositories. In the exemplary network arrangement this data would be associated with devices 64, 66 and 68 of registered users. As is the case in connection with individuals and devices that provide transport services, the data associated with these devices include ID tokens or other identifying record information that can be utilized to reliably identify that the user or device is one that is authorized to access the depository. As the individuals that provide the functions of providing deposit items to be transported to the depositories will generally be required to pay for the transport services, the central circuitry includes data for such users that include a fund source such as account data for assessing charges associated with payments for shipments. This may include credit card accounts, bank accounts, PayPal accounts or other suitable accounts from which payments may be made.

Further in the exemplary system individuals in this category may choose to travel an extended distance to a depository in order to receive a deposit item that would otherwise be handled by an item carrier user that is paid to transport the item to a destination depository substantially closer to the recipient or to a designated delivery address that is not a depository. In the exemplary system if the recipient chooses to conduct a substantial portion of the transport by taking the item from a depository that is remotely located from the destination that the person arranging for shipment has paid to have the item delivered to, then the central circuitry is operative to compensate the recipient for the transport activity associated with picking up the item from the remote destination. As such the exemplary central circuitry includes data regarding account information which can be credited for pickup amounts to which the authorized user receiving an item may be entitled. This account information may include account information for accounts which can be credited with value to the recipient for transport and pick up of deposit items. Of course it should be understood that the data types shown for this category of authorized user and their associated devices in FIG. 10 is merely exemplary of some items of information which may be included in records of the central circuitry.

Figure 11:
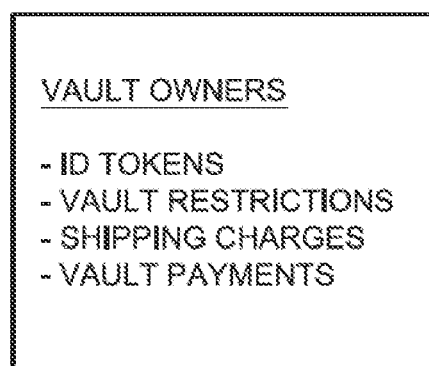
FIG. 11 is a schematic view listing types of data bearing records included in an exemplary system which relate to entities that are the owners of the exemplary depositories.
Figure 12:
FIGS. 12 through 27 are a schematic representation of logic flow carried out by the control circuitry of the exemplary depository, associated central system circuitry and devices operated by authorized users who place deposit items into and/or remove deposit items from the depositories.
Figure 13:
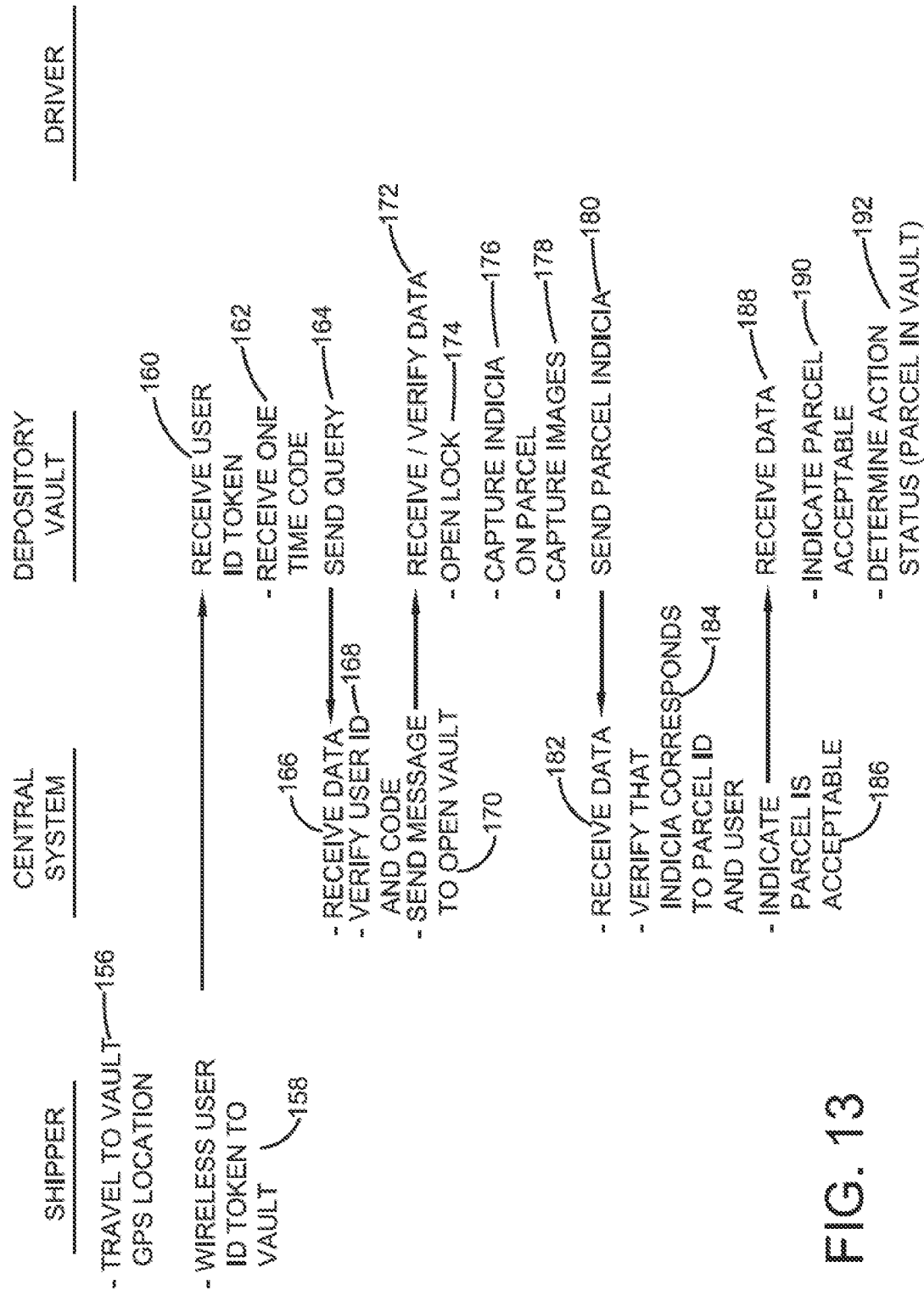
Figure 14:
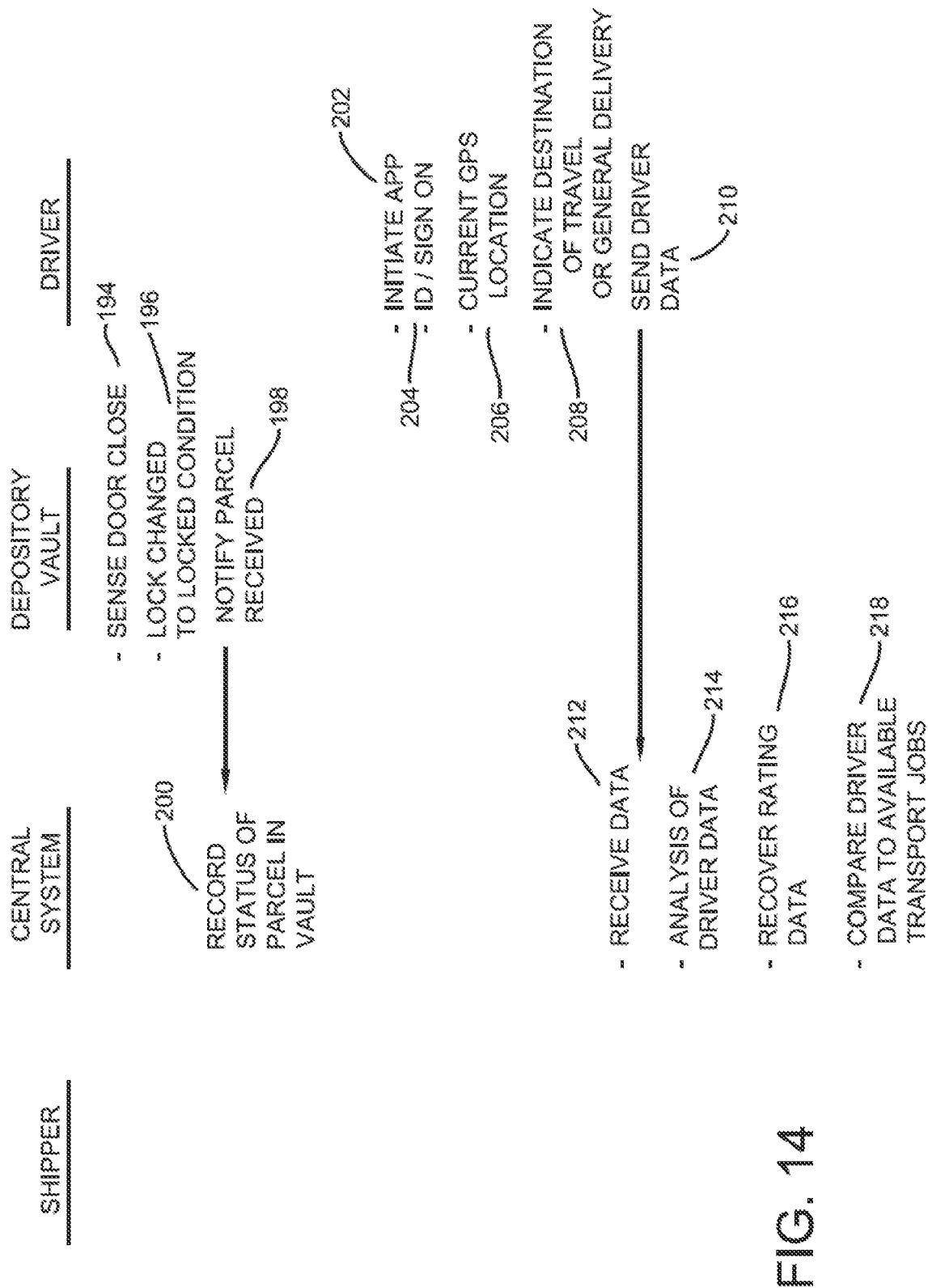
Figure 15:
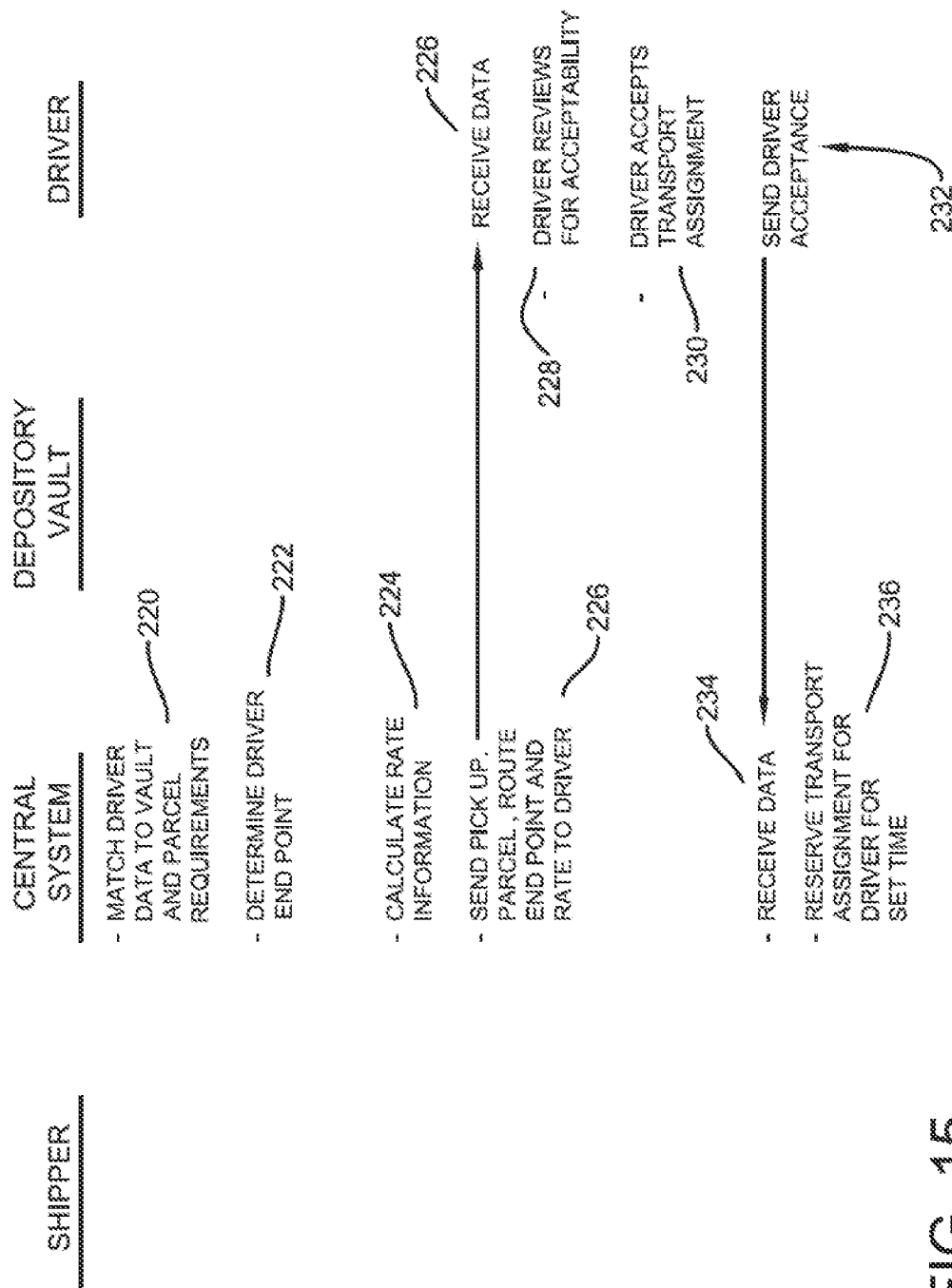
Figure 16:
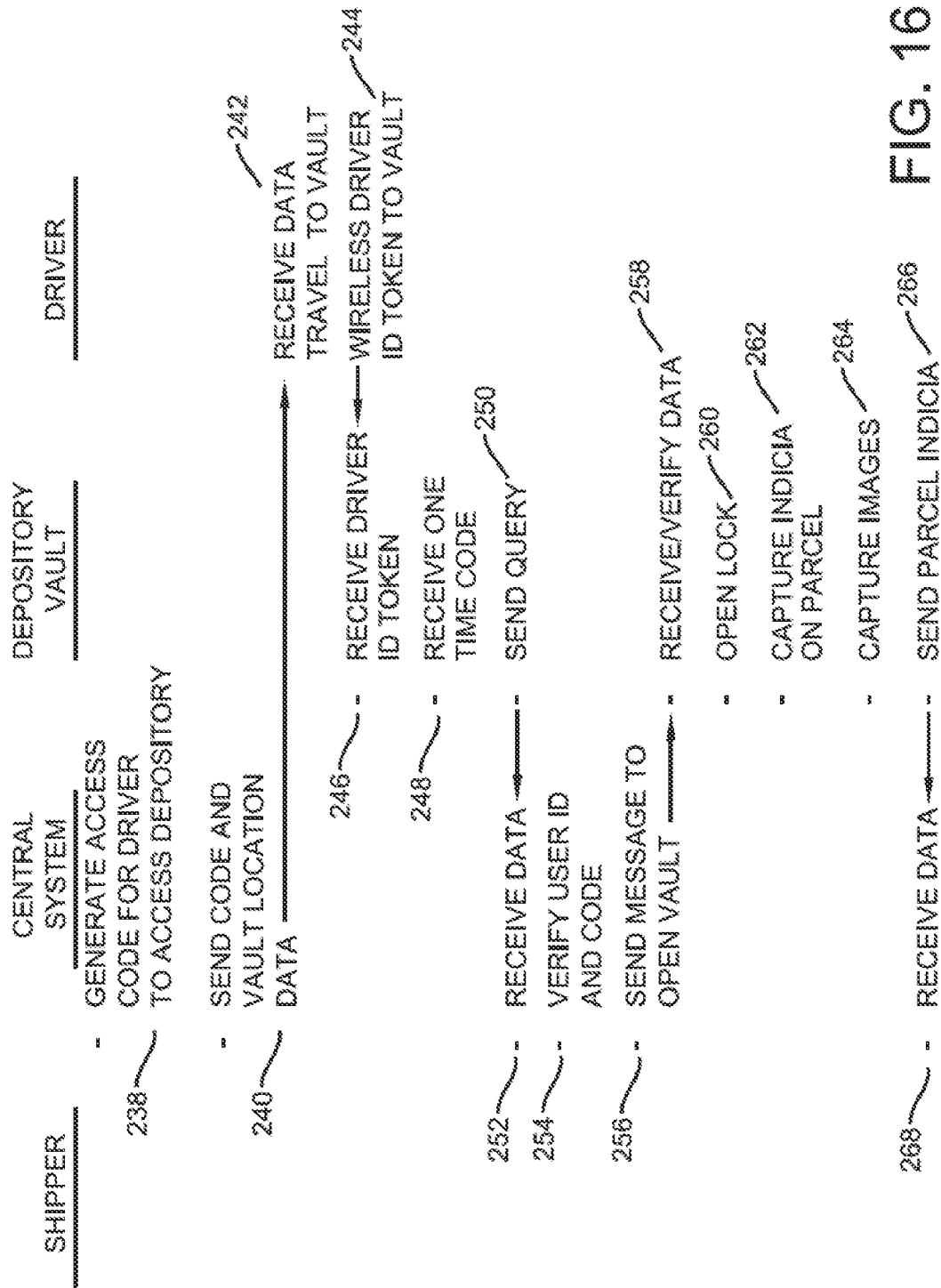
Figure 17:
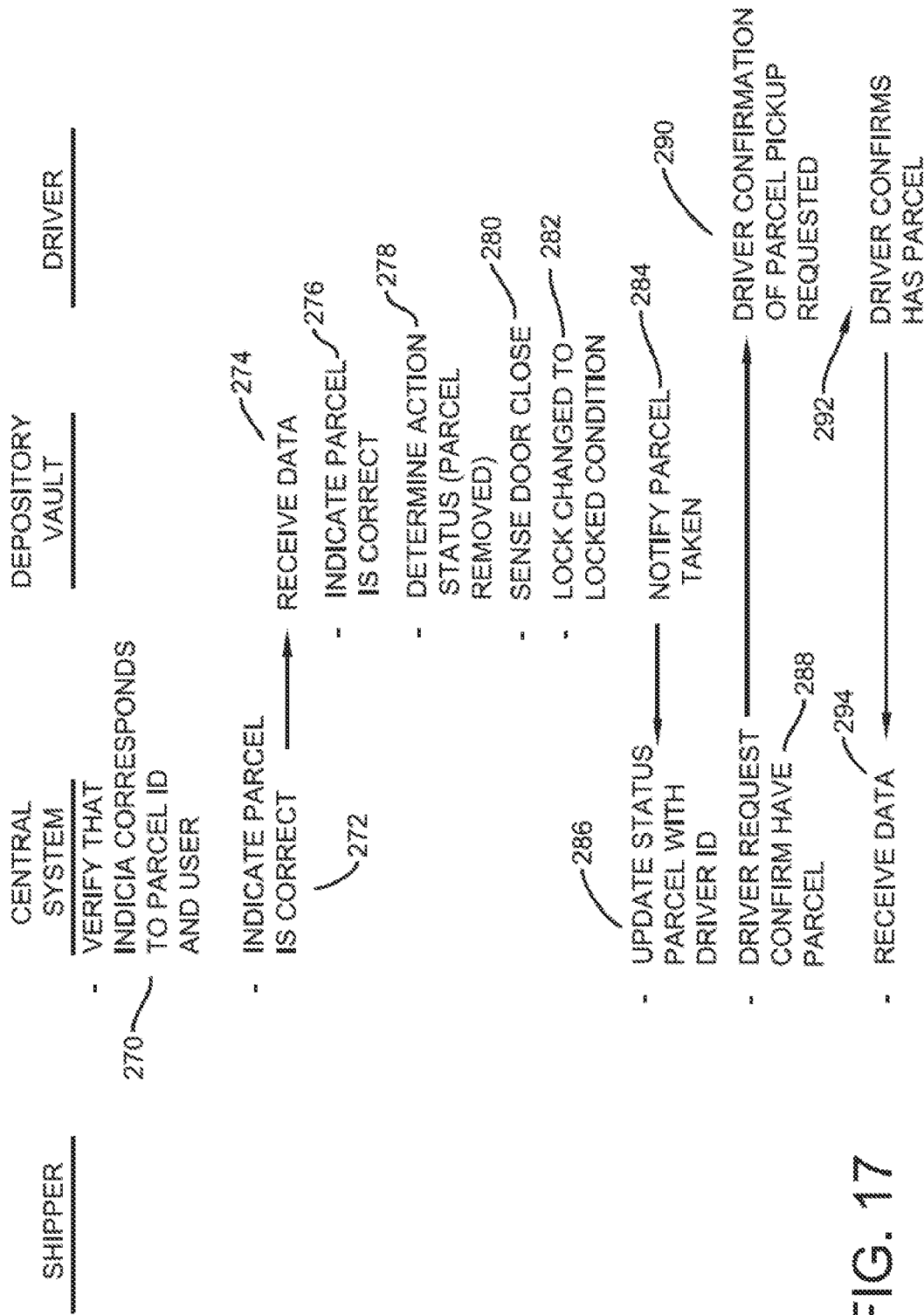
Figure 18:
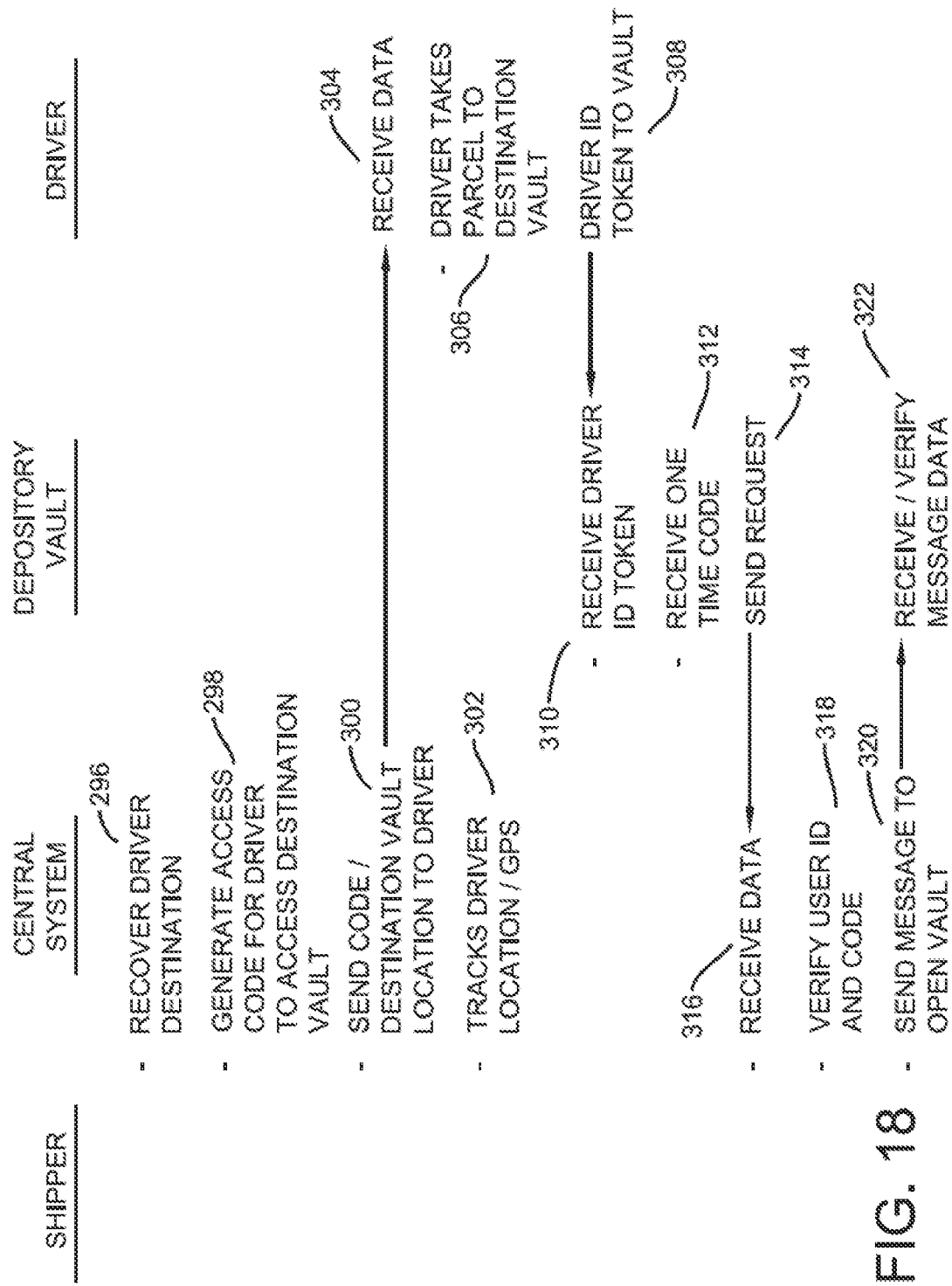
Figure 19:
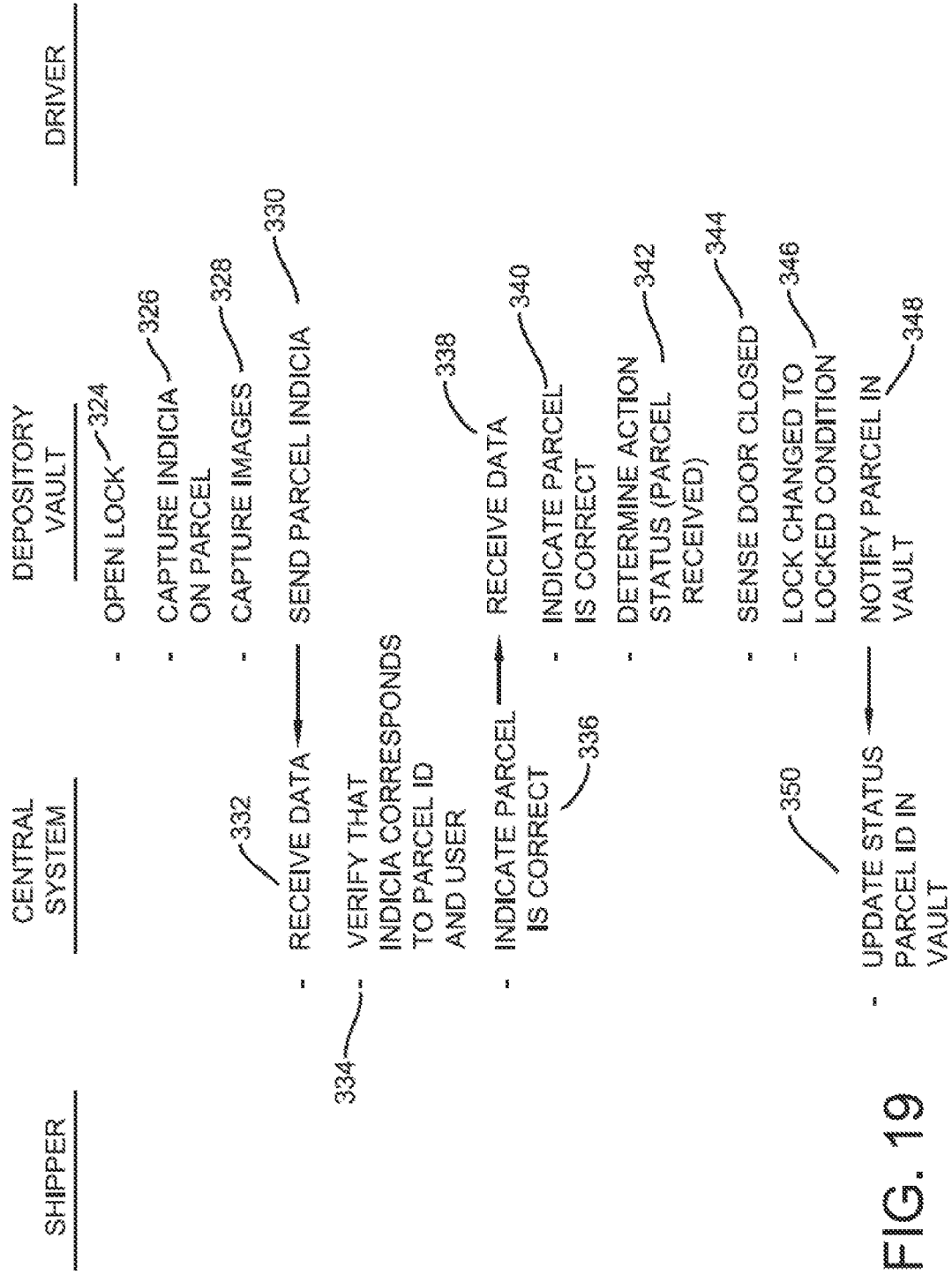
Figure 20:
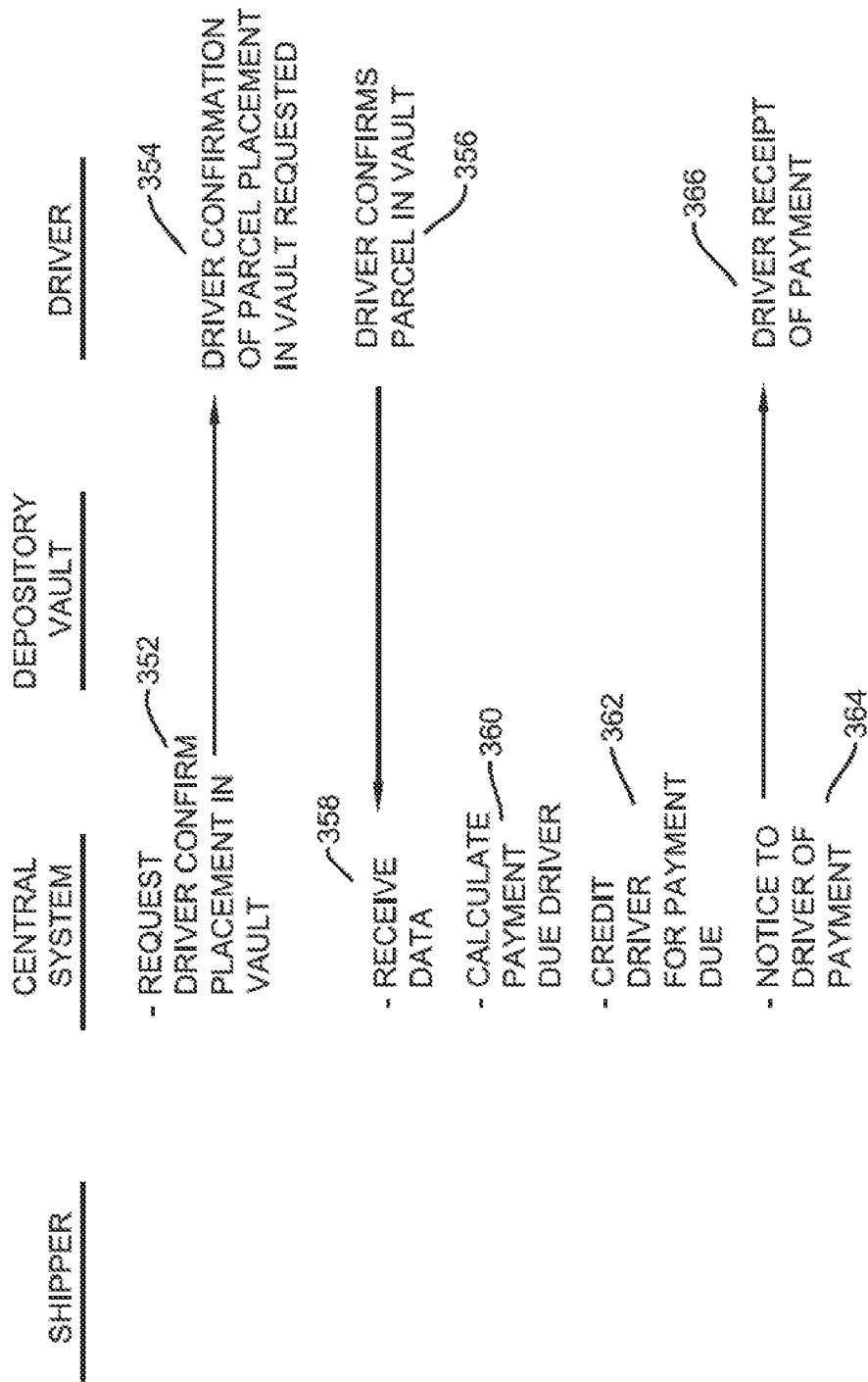
Figure 21:
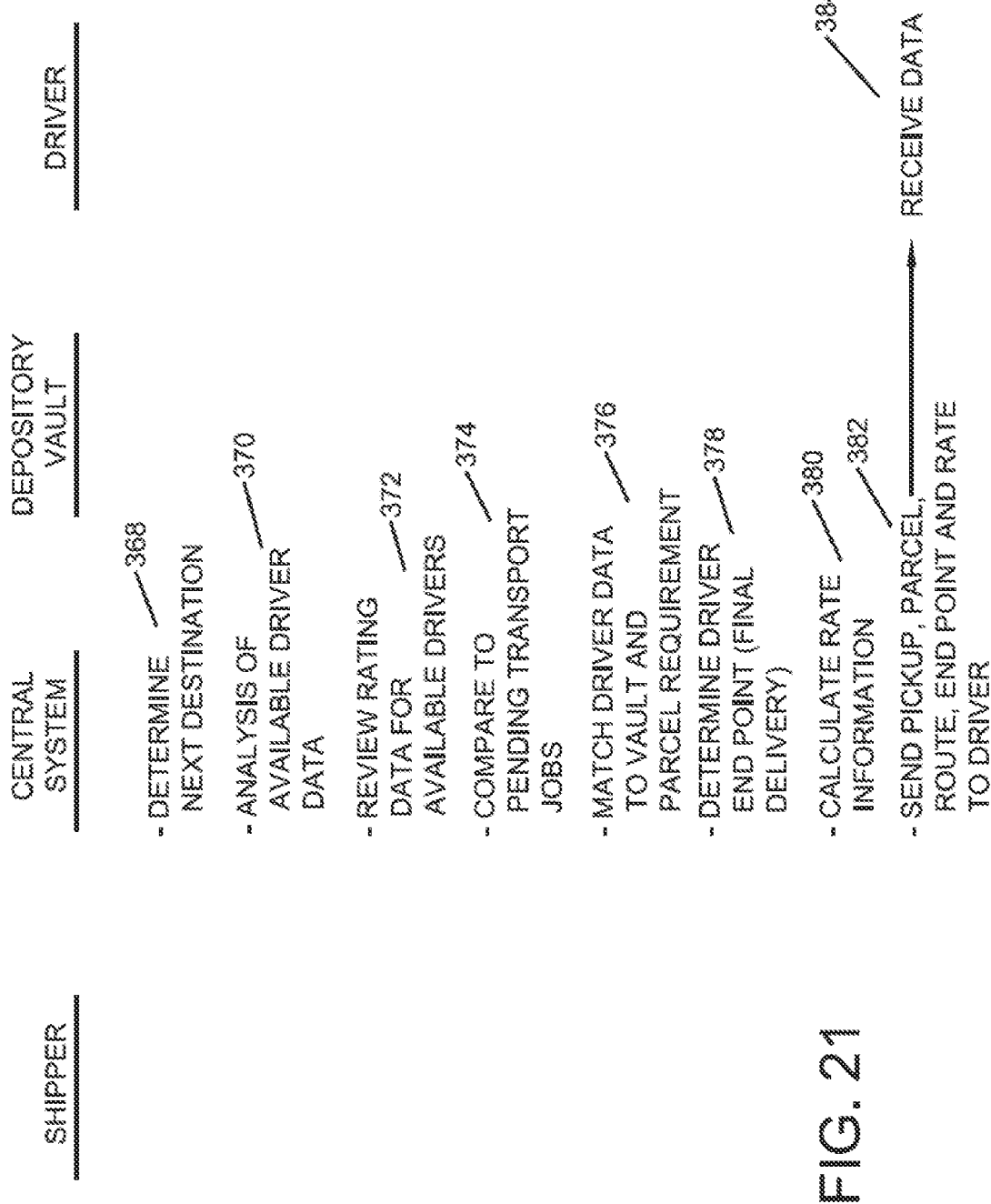
Figure 22:
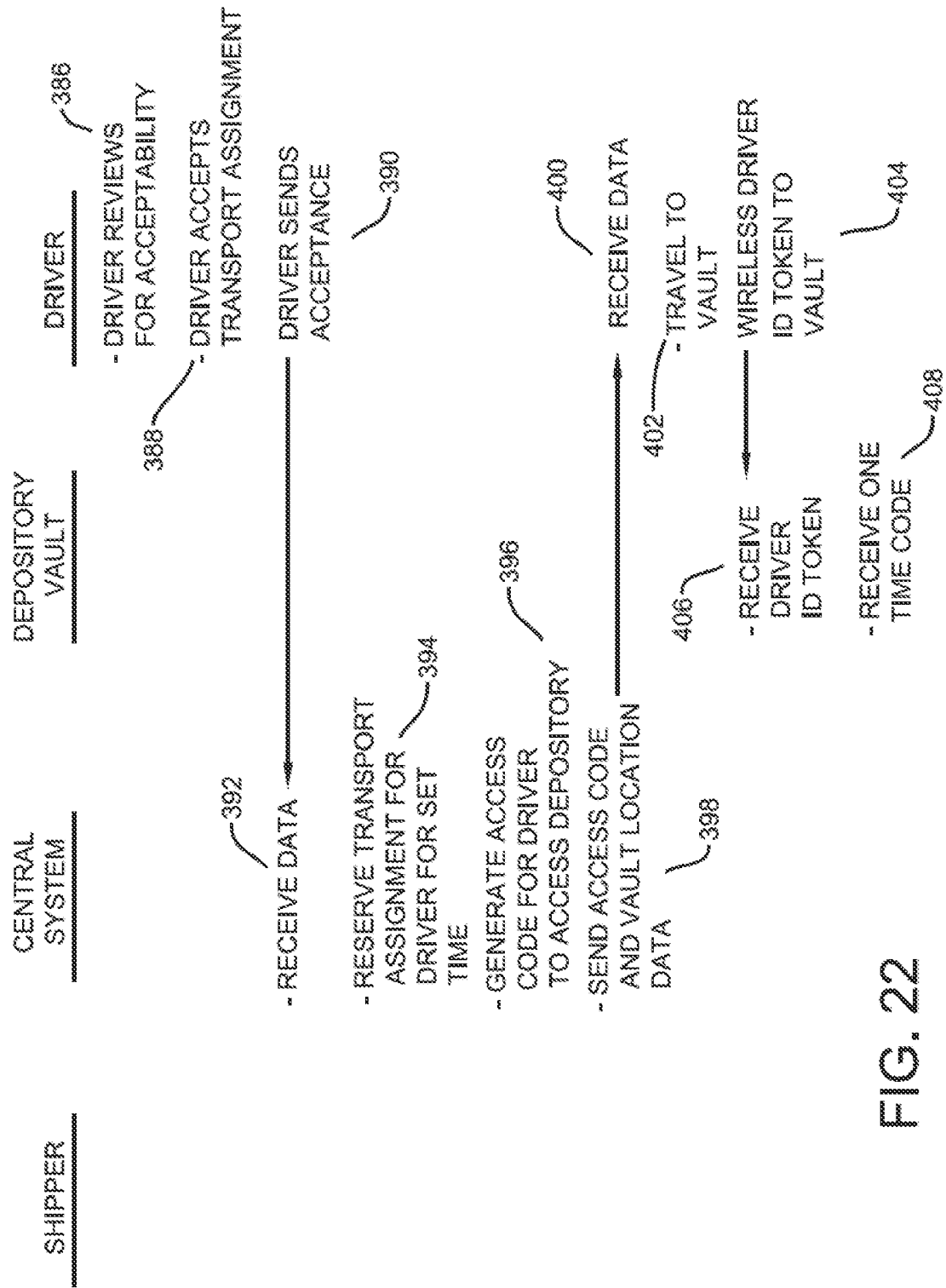
Figure 23:
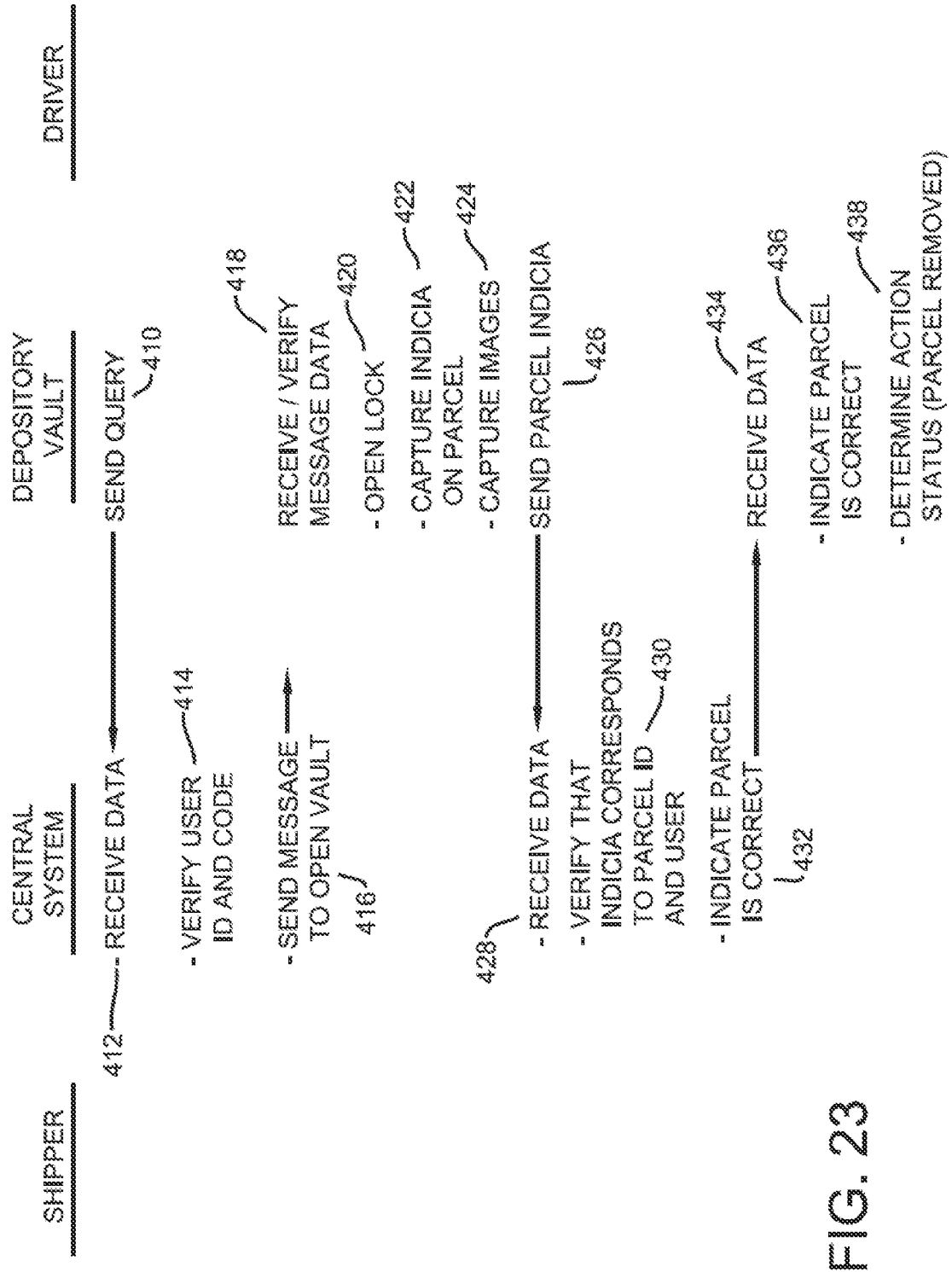
Figure 24:
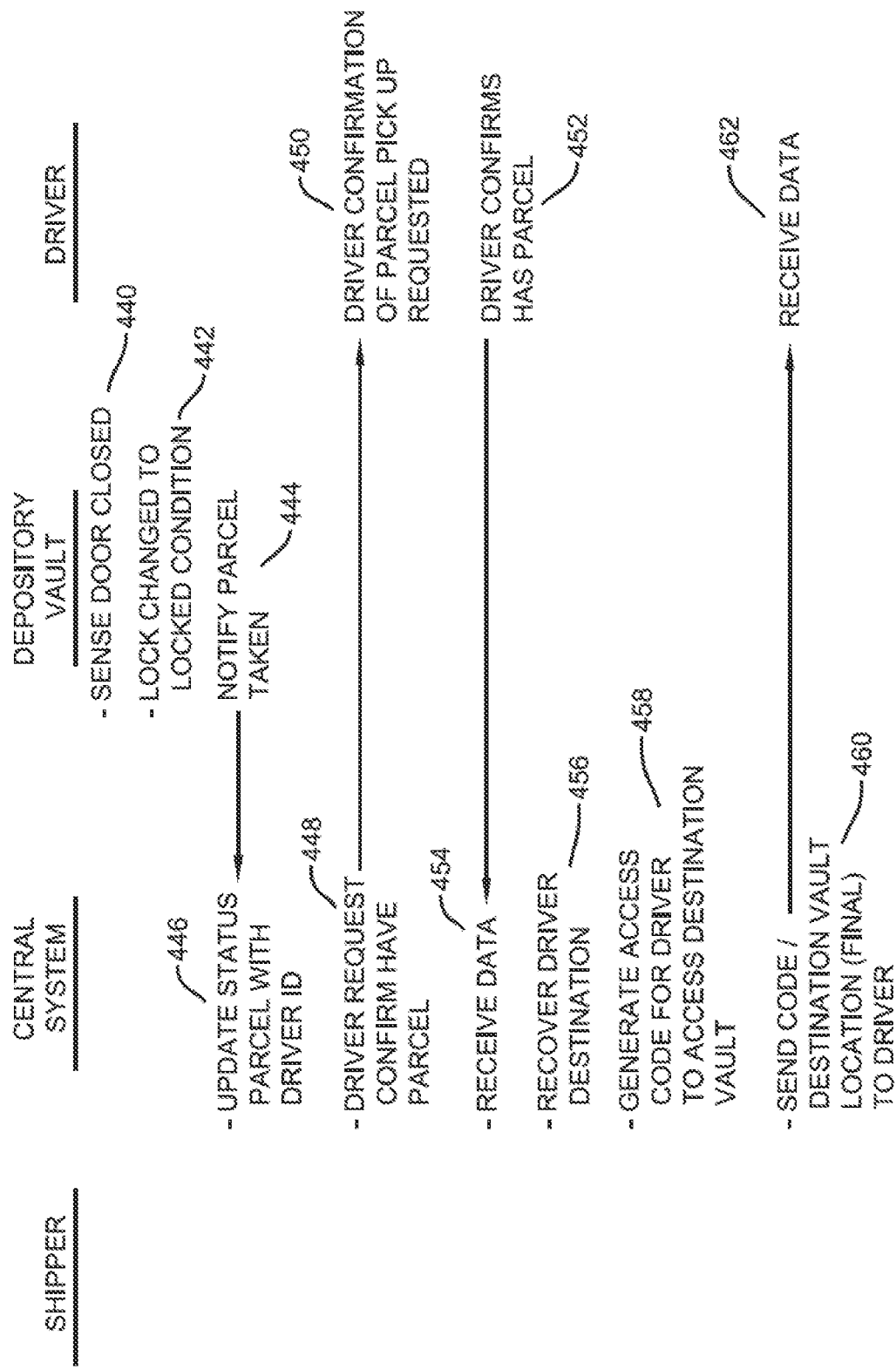
Figure 25:
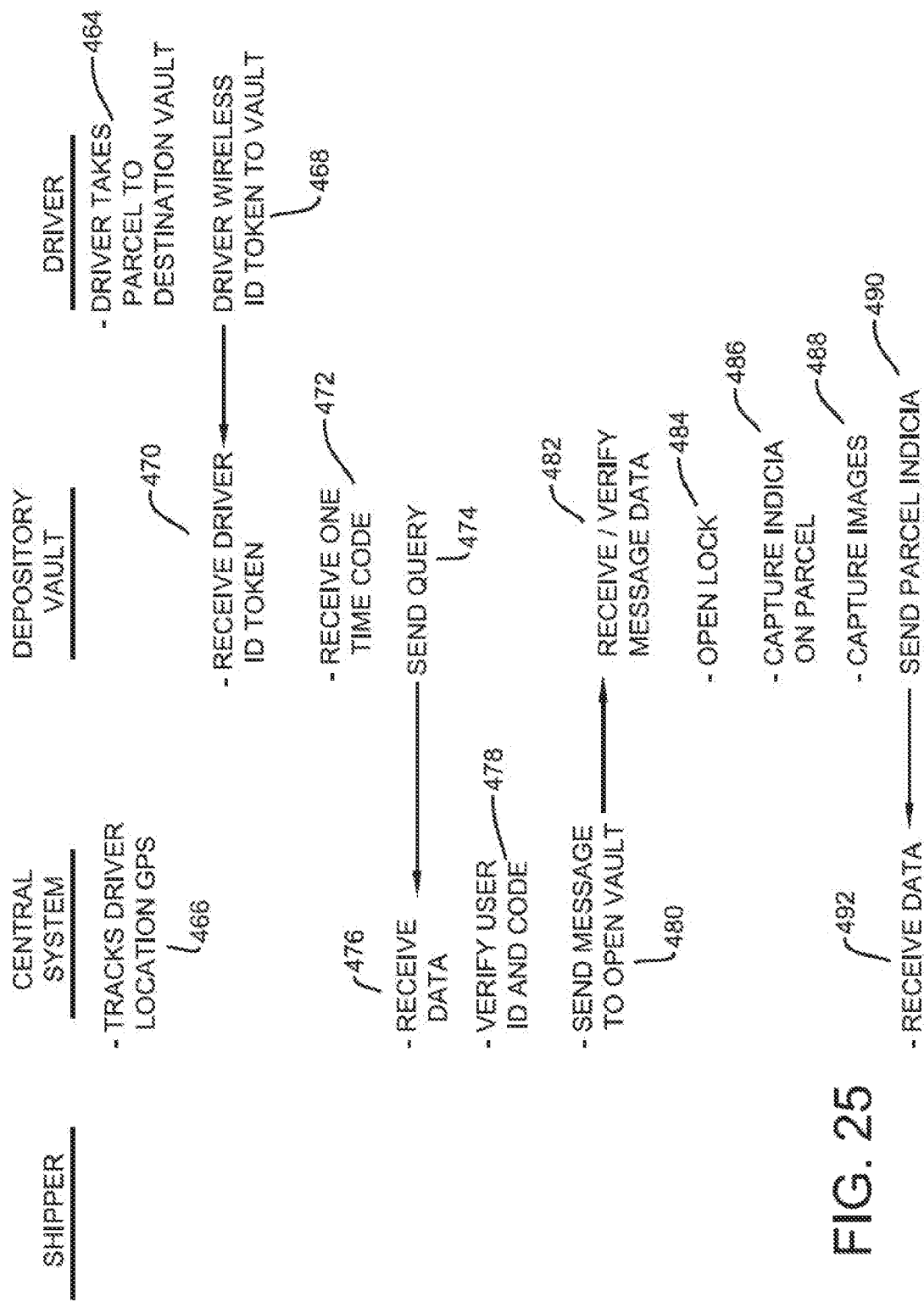
Figure 26:
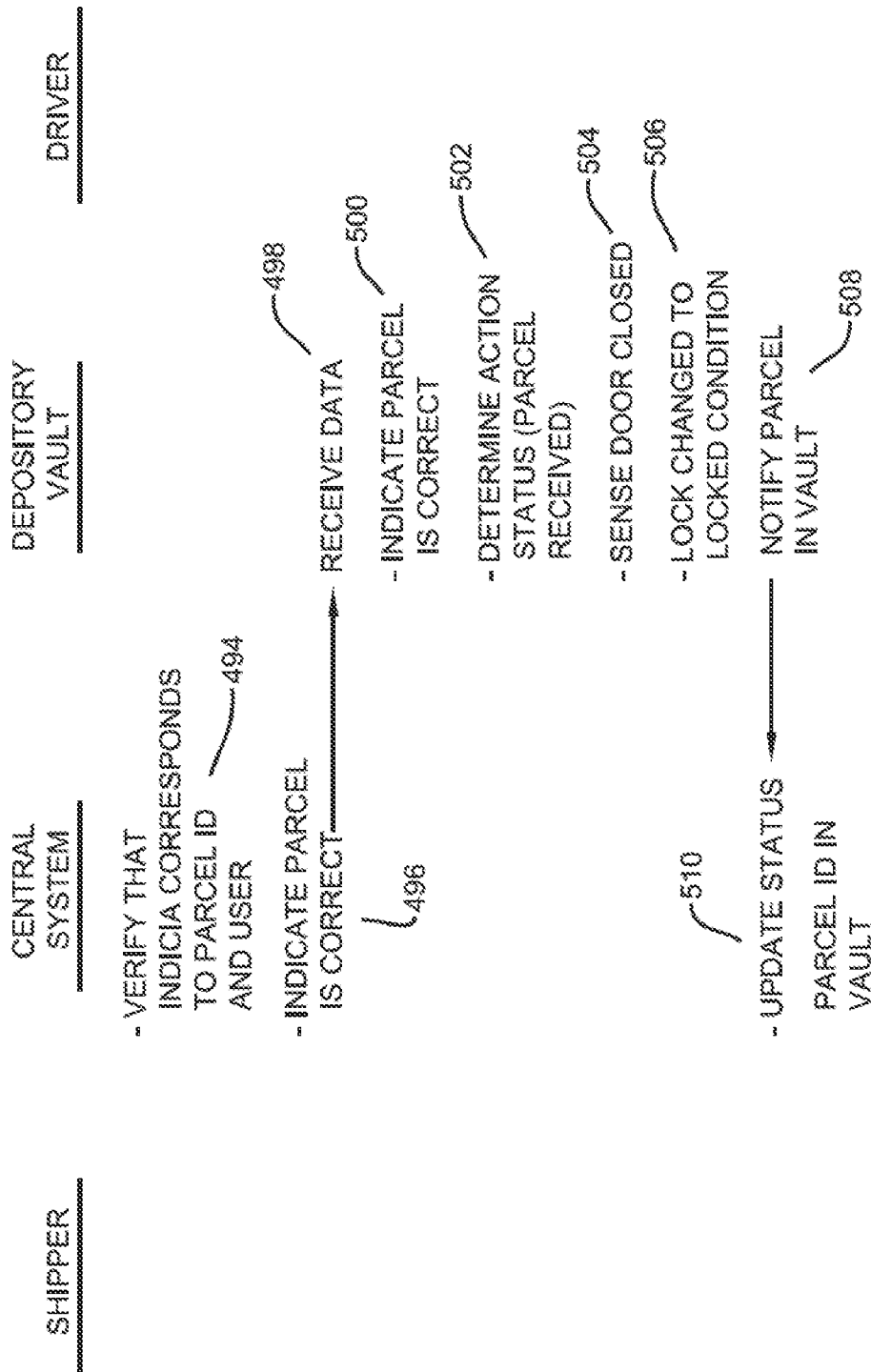
Figure 27:
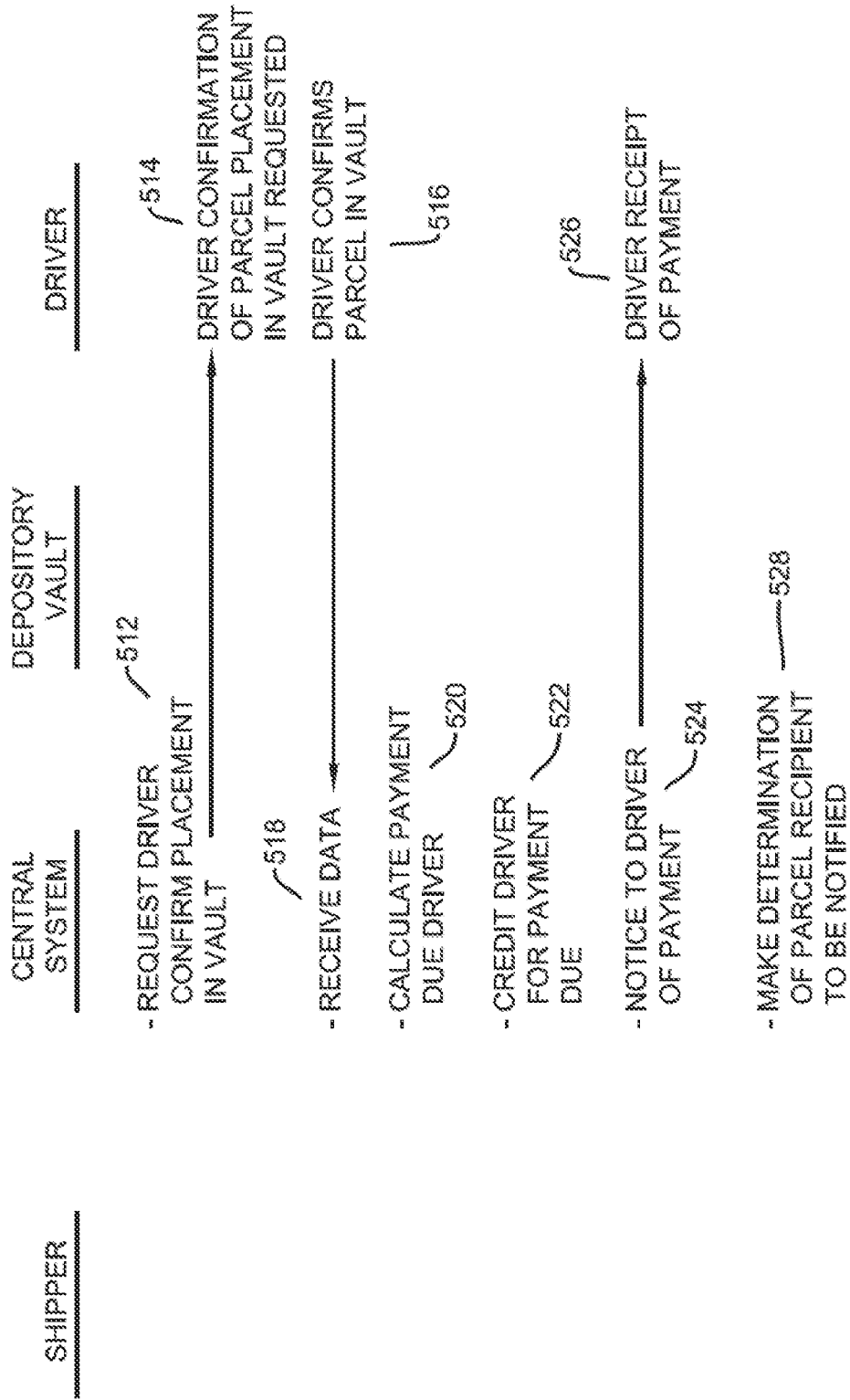

FIG. 11 shows exemplary record data that is associated with owners of depositories and their associated devices. The data shown in FIG. 11 would generally be associated with the devices 114, 116 that were previously discussed in connection with the exemplary network 50. Similar to other devices, the devices associated with depository owners would include the identifying information which identifies the user as an authorized or registered shipper or recipient user. In addition in the exemplary arrangement the records associated with the depository owner includes data regarding the restrictions on the depositories such as those previously discussed. The exemplary central circuitry is operative to associate the depository owner with the respective depository that is owned by the depository owner and to cause the restrictions set by the owner for the depository to be applicable to the records associated with the depository in the one or more data stores of the central circuitry.

Further in some exemplary arrangements the depository owners are entities that engage in sending deposit items for transport and receiving deposit items. As such the data associated with the depository owners includes a funds source such as account information corresponding to accounts which can be assessed for charges associated with transport of deposit items to remote depository destinations. Further in exemplary arrangements the central circuitry is operative to compensate depository owners for deposit items that are placed in the depository of the depository owner by other authorized user individuals for purposes of transport to other depositories. In the exemplary arrangement the depository owner is compensated for the use of their depository by such third parties. The exemplary system is operative to include in the data associated with the depository owners, account information concerning accounts that are credited through operation of the central circuitry for the use of the depository by other authorized entities.

Of course the types of record data shown as maintained by the central circuitry for the different types of devices and users associated with the system, are exemplary. Additional types of information will generally be stored in association with the various types of devices and users to facilitate operation of the system and to provide record-keeping and tracking for the activities that are carried out in connection therewith. Further as can be appreciated, the central circuitry is operative to store data associated with the whereabouts of deposit items that are moving through the system at all times, and to track the status of depositories, and individuals who provide transport for the items, such that the whereabouts of each deposit item throughout the term of its inclusion in the system can be determined at all times. In exemplary arrangements the central circuitry is operative to estimate arrival times for depository items at destination depositories and makes such data available to users responsible for sending the items and recipients. Further historical information on each deposit item is also maintained for a programmed time. To assure that any errors or loss situations can be tracked, investigated and remedied, tracking and image data can be accessed through the central system circuitry and in some arrangements obtained from each of the respective depositories.

A schematic representation of the logic flow that is carried out through operation of the central system circuitry, the depositories and the portable wireless devices of entities that provide, transport and receive deposit items, is shown in FIGS. 12 through 27. This exemplary logic flow of each of the devices involved is exemplary and is described in connection with an example that is intended to be representative of the operation of the various devices. Deposit items are alternatively referred to herein as delivery items or parcels. Of course numerous other features and operations may be utilized in connection with exemplary embodiments.

The example of the logic flow commences with an authorized user of the system who wishes to have a deposit item transported to a remote destination operating their respective portable wireless device such as wireless device 64. In the exemplary logic flow the entity wishing to have the deposit item transported may be referred to as a shipper for purposes of simplicity in connection with this particular example.

As represented in a step 118 the individual wishing to have a deposit item transported operates their associated device such as device 64 to provide inputs which indicate that they wish to have an item transported. In a next step 120 the user operates the device to provide inputs which are usable to identify the user as an authorized and/or registered user of the system. In a next step 122 the user is operative to provide inputs to their device which indicate the payment method that will be utilized to make payment for the transport of the deposit item. In exemplary arrangements this may include selection from a menu to indicate the type of payment or account that the user wishes to utilize in connection with the deposit item. The user may also be required to provide information or respond to certain questions regarding the item. These questions may include providing information regarding whether the item is flammable or otherwise hazardous. The individual may also be required to indicate whether the item contains perishable or fragile material. The user may also be required to provide information regarding the dimensions of the item, the weight of the item and/or the value of the item. Of course these queries are merely exemplary.

In a step 124 the user operates the device to indicate a delivery item originating address which corresponds to the origin for the transport of the deposit item. This may include the user's business address or other address. In some arrangements the originating address may include a business address associated with the particular depository into which the deposit item will eventually be placed for purposes of initiating the transport activity. In a step 126 the user inputs to the device the address information for the delivery item destination location which corresponds to a point or area of delivery of the particular deposit item. This may include an address associated with a remote depository that is associated with the entity that will receive the deposit item. Alternatively in other arrangements the delivery address may include an address or area associated with an entity that does not have a dedicated depository. In such cases the delivery address may include information regarding an authorized user of the system that is enabled to access a depository that is located in proximity to them for purposes of receiving the deposit item to be transported. In other arrangements the delivery location may be a commercial or residential address which is the address of the recipient.

In the exemplary arrangement the user wishing to arrange for transport of an item may wish to pay an incentive fee in order to have the item delivered more promptly or in accordance with other requirements. In the exemplary arrangement the programming associated with the user device enables the user arranging for transport to apply an incentive for particular delivery parameters or timing that is associated with the particular deposit item. This is represented in a step 128. This may be a payment for delivery within a set time such as within one day, for example. Of course if the user does not wish to apply an incentive, the programming associated with the device will cause the standard rates and/or parameters set through operation of the central circuitry to apply.

The exemplary programming associated with the user's device may include the capability to capture images of the deposit item such that the size of the deposit item can be assessed. In some exemplary arrangements the user device may require the user to input dimensions of the deposit item and/or the weight thereof via a touch screen or other input device. This is represented in a step 130. Assessing the size of the deposit item is useful for purposes of enabling the central system circuitry to determine depositories where sufficient space is available in the interior area for purposes of receiving the deposit item therein at the present time. This may be done in the manner previously discussed using the reading devices that are included in the respective depositories. The size as well as weight can also be factors in determining the charges for transport of the deposit item.

In some exemplary arrangements the user may have circuit executable instructions on their mobile device or other computer that guides or prompts a user to provide the necessary information for shipment. In other arrangements the central circuitry may provide an online portal which the user may access to receive the prompts to input necessary information, and to which the information may be supplied.

In the exemplary arrangement, once the information has been input by the user to the device, the information regarding the request to transport the deposit item is submitted to the central system circuitry as at least one transport request message represented in a step 132. The central circuitry is then operative to verify the identifying information associated with the user that has submitted the request. This is represented in a step 134. This may include comparing user identifying data stored in the user device such as an ID token that is included in the at least one transport request message, with stored data associated with authorized users by the central circuitry. The central circuitry is also operative to verify that the user who has submitted the request has indicated a suitable funds source which provides a payment method associated with the central system in order to make payment for the transport of the deposit item. The central system circuitry may also analyze the delivery item size data and/or weight data included in the at least one transport request message to determine if the delivery item is suitable for transport through the system. This is represented in a step 136.

The central circuitry then operates to assign a parcel ID to the particular deposit item as represented in step 138. The parcel ID is alternatively referred to herein as a delivery item identifier. The data provided by the user regarding the originating location and destination location for the transport of the deposit item is also stored in at least one data store associated with the central circuitry as represented in step 140. The central circuitry is then operative responsive to the originating location information to resolve an originating depository that is considered the most suitable for receipt of the deposit item. This is represented in a step 142. Generally the originating depository will be the depository located in closest geographical proximity to the user wishing to have the deposit item transported. However, in order to assure that space for the deposit item is available in the nearest depository, the central circuitry operates as represented at a step 144 to determine if the delivery item is of a suitable size and/or weight to be transported and communicate with the initially selected depository to verify that sufficient space is available to accept a deposit item of the size that was determined at step 130. If such space is not available, the central circuitry operates to determine an alternative available originating depository that has the space available to receive the deposit item therein. The central system circuitry is operative to evaluate at least one of the size and/or the weight of the deposit item to determine if it is within at least one size or weight limit. If the deposit item is not suitable for transit due to size, weight or space factors the request is flagged to be declined or be processed in a manner that provides special handling.

As represented in a step 146, once the originating depository for receiving the deposit item is resolved, the central circuitry operates to generate a one-time code to be input by the authorized user for purposes of accessing the depository. The one-time code is alternatively referred to herein as an item depositor access code. The central circuitry is operative to correlate stored data corresponding to at least two of the authorized user identifying data, the delivery item identifier, and the depository which receives the item from the user and/or a respective interior area thereof, in the at least one data store. In a step 148 the central circuitry is then operative to send the originating depository location information and the code data to the user's device. In exemplary arrangements the depository identifying data for the originating depository may include GPS coordinates, address data or other information that can be used to locate the depository.

As represented at step 150 the user's device is operative to receive the data from the central circuitry. In situations where the transaction is not accepted due to an invalid funds source or a parcel size or weight outside a set limit, the user is notified the transaction is denied, or alternatively the user is provided with instructions to obtain special handling. If the transaction may proceed the user may then operate their device in the manner represented in FIG. 6 to produce a data bearing record which includes data representative of the origin and destination address as well as indicia corresponding to the delivery item identifier which uniquely identifies the deposit item. The delivery item identifier is alternatively referred to herein as a parcel identifier. This is represented by a step 152. In the exemplary arrangements the delivery item identifier may be encoded in identifying indicia that may include a machine readable bar code, a QR code or other suitable machine readable indicia which comprises record data which can be read for purposes of identifying the deposit item. As represented in a step 154 in the exemplary arrangement the user may operate their device in association with a label printer to produce a label which is then applied to the deposit item. In the exemplary arrangement the label that is applied to the deposit item is externally visible such that the machine readable indicia thereon that corresponds to the delivery item identifier can be read through operation of the reading devices such as a reader included in the depository or a user's portable wireless device. The label may also include human readable indicia so that the particular deposit item can be visually identified by item carrier users or other users who access the depository. Of course it should be understood that in other exemplary arrangements other types of indicia may be utilized for purposes of providing identifying indicia. Such indicia may include for example, programmable RFID tags, QR codes, a signature or other manually made indicia, an image of the deposit item, or other indicia that may be placed in operative connection with a deposit item for purposes of enabling the identification of the item through operation of the system.

As represented in a step 156 the user seeking to have the deposit item transported may utilize their device to guide their travel to the GPS location or other location as identified to the device, so that the user may place the item into the originating depository. In the exemplary arrangement the user operates their device to cause data corresponding to a data bearing record which identifies the user, to the at least one input device on the depository. This is represented by a step 158. In the exemplary arrangement the user device is operative to send user identifying data such as the user token data to the RF input device included in the depository. The depository receives the user identifying data as represented in step 160. The control circuitry of the exemplary depository is operative to enable the keypad of the exemplary embodiment to receive a manually input code therethrough from the user as represented at step 162. The input code may correspond to the one-time depositor access code. Alternatively, in some arrangements the one-time access code may be delivered wirelessly from the user's device to the RF input device. Further in some arrangements user identifying data and the one-time code may be replaced by a single code string or object. As represented at step 164 the control circuitry of the depository is operative to wirelessly transmit at least one message including data corresponding to the received user identifying data and the one-time code as well as depository identifying data to the central circuitry. This may be done in a suitably encrypted manner or using other suitable security techniques to assure that the data is not compromised.

The central system circuitry is operative to receive the data from the depository as represented at a step 166. The central circuitry then operates as represented at step 168 to verify that the received user identifying information corresponds to the authorized user, and that the one-time code corresponds to the code provided to the user in connection with the request to transport the deposit item. In the exemplary arrangement the central circuitry is operative to assign to the user an item depositor access code that can be utilized only on one occasion for purposes of opening the central system assigned interior area of the depository. This prevents the authorized user from opening other depositories or other interior areas of the same depository, or opening the depository on multiple occasions using the provided code. Of course it should be understood that this approach is exemplary and in other arrangements other approaches may be used.

Responsive to the central circuitry making a determination based on stored data that the data received by the depository from the user is the appropriate data for the user accessing the depository in connection with receiving the deposit item, the central circuitry is operative to send one or more messages to the depository as represented in step 170. The messages include instructions and/or data which are operative to cause the repository control circuitry of the depository to unlock the lock which holds the designated depository door in the closed position. At a step 172 the control circuitry of the depository operates to verify that the received message data corresponds to an authorized message from the central circuitry to unlock the lock. This may be done by an analysis of the received message data including decryption of the instructions and other data included in the message which verifies the instructions as appropriately authorized by the central circuitry.

If the control circuitry of the depository determines that the message data from the central circuitry is genuine, the circuitry operates to cause the lock associated with the appropriate door and compartment to be changed from the locked condition to the unlocked condition. This is represented at a step 174. The exemplary control circuitry then operates to detect the opening of the depository door. In some arrangements the control circuitry causes the plurality of reading devices to operate to capture images including the indicia corresponding to the delivery item identifier included on the depository item as represented at step 176. The control circuitry also operates to capture images showing the user as well as the deposit item as it is being placed into the interior area of the depository. These images are stored in the data store associated with the control circuitry of the depository along with time data to indicate when the activity occurred. In other exemplary arrangements the user may be instructed to operate their portable wireless device to have a camera thereon capture an image of the item identifying indicia on the deposit item, identifying indicia on the depository, or both. This is represented by a step 178.

Further in exemplary arrangements data from the at least one weight sensor may be captured to verify placement of the item in the depository and/or to detect the weight of the item. The additional weight added to the depository may be used to verify that the weight indicated for the item by the shipper is accurate. If the item is substantially heavier than specified in the at least one transport request message, the person requesting the shipment may be assessed an additional charge. Sensors such as image capture devices such as cameras or LIDAR sensors may be used to capture data that is used to determine the size of the item. This may be done so that the central system circuitry can verify that the parcel size is consistent with the parcel size data included in the at least one transport request message. Image sensors, sonic sensors or other sensors may operate to capture other properties such as color, sound absorption, reflectivity of light or sound waves, or other types of signals as well as combinations thereof. Further the weight, size and/or other property (or a combination of properties) associated with the item may be used by the central system circuitry as an additional identifying feature and tracking identifier for the item. Of course these approaches are exemplary.

In the exemplary arrangement the control circuitry associated with the depository is operative to send at least one message including data corresponding to the indicia read, detected and/or sensed from the deposit item to the central circuitry as represented at step 180. The central circuitry receives the data as represented at step 182 and verifies that the received data and read indicia corresponds to the identifying information associated with the deposit item and the authorized user who is authorized to place the deposit item in the depository. This is represented by step 184. The central circuitry is then operative to send one or more messages to the depository indicating that the deposit item is acceptable into the depository. This is represented by a step 186. It should be understood however that if the central circuitry determines that received data or the indicia associated with the deposit item is incorrect and/or does not correspond with the authorized user who has accessed the depository, the central circuitry will send at least one message including data which is indicative of this discrepancy to the depository.

In the exemplary logic flow as represented at step 188 the wireless communication portal of the depository receives the data indicative of whether the deposit item and its receipt into the depository is acceptable. The control circuitry of the exemplary depository then operates to provide an indication if the acceptance of the deposit item is authorized. This is represented by a step 190. In the exemplary arrangement, the control circuitry of the depository is operative to cause operation of the at least one indicator 32 to provide an indication as to whether the acceptance of the deposit item is authorized. For example in an exemplary arrangement the indicator may be operated to provide a green color light output when the deposit item is acceptable and a red color light output when the deposit item is not acceptable. In addition an audio annunciator output or other indicator output may be output by the depository to indicate the acceptability or unacceptability of the deposit. In other exemplary arrangements, an indication of the acceptability of the deposit item may be sent to the user's mobile device so as to cause at least one output from an output device thereof. In other exemplary arrangements the door of the depository may be spring loaded so that the door at least partially opens responsive to the deposit item being acceptable. Of course these outputs are exemplary, and in other arrangements, other types of outputs may be provided.

Further in exemplary arrangements at least one message indicative of a determination as to the acceptability or unacceptability of the deposit item or the associated circumstances may be sent by the central system circuitry to the portable device of the authorized user. Such information may be sent in the form of a text message or other suitable output to indicate to the user the acceptability or unacceptability of the deposit item or activity. Such approaches may be useful in some exemplary systems for purposes of preventing users from making mistakes in placing incorrect deposit items into depositories. Such features may be particularly helpful in situations where an authorized user may be handling multiple deposit items, some of which may be intended for placement in a particular depository while others are not. Of course these approaches are exemplary and in other embodiments other approaches may be used.

In the exemplary arrangement the control circuitry associated with the depository is operative in a step 192 to evaluate the image data captured by the reading devices and/or the weight sensors to make an action status determination. The action status determination includes evaluating the image data and/or weight data for purposes of determining whether the deposit item has been placed in or removed from the interior area of the depository. In alternative arrangements, the user may be prompted to provide at least one input to their mobile wireless device to indicate the deposit item has been placed in the interior area. The wireless device sends at least one message indicative of the input. In this exemplary logic flow the determination of action status by the control circuitry is indicative that the deposit item has been placed in the depository. After the action status determination that the deposit item has been received, the control circuitry of the depository senses for the door of the depository being closed. This is done through appropriate switches, detectors or the reading devices in operative connection with the control circuitry and is represented in a step 194. In some exemplary arrangements the repository control circuitry will cause at least one output device of the depository to provide outputs which instruct the user to close the depository door in the event that such action is not taken within a calculated time of the deposit item being received. In other exemplary arrangements the user's portable wireless device may receive messages from the central circuitry that are caused to be sent responsive to messages from the depository in the event that the user is detected as not taking appropriate steps towards closure of the door after the deposit item has been deposited in the interior area.

Once the depository door is in the closed position, the control circuitry operates to cause the lock to be changed to the locked condition as represented in a step 196. The control circuitry of the depository then operates to send one or more item received messages to the central circuitry indicating that the interior area of the depository has been made accessible responsive at least in part to the item depositor access code, token data and/or other input data and the deposit item has been received in the depository as indicated at step 198. Responsive to receiving the at least one item received message from the depository and/or from the user's mobile wireless device, the central circuitry is operative to update the record data stored in its associated data store to reflect the status of the deposit item as being within the particular depository as represented at step 200. The central circuitry may also operate to determine the remaining available volume of space in the compartment or interior area in which the deposit item has been placed.

The central circuitry then operates to take the actions necessary to arrange for the deposit item to be transported from the originating depository into which it has been received, to a depository associated with the destination location for the item. In some circumstances the central circuitry is enabled to arrange for a single authorized user of the system to transport the deposit item from the originating depository into which it is received to another depository which is a destination depository that corresponds to the delivery item destination, such as a final destination address for the deposit item. In other arrangements the system is operative to arrange for delivery to a recipient address rather than a depository. However, in many situations the central circuitry must arrange for the transport of the deposit item to an intermediate location which corresponds to a destination depository which is only part way to the delivery item destination. This occurs because the individuals available to transport the deposit item are available only to transport the item to the intermediate destination. The central circuitry will then later arrange for a different authorized user to transport the item from the intermediate destination to the depository at the final destination depository for the deposit item. Of course it should be understood while this example indicates that the deposit item is transported through a destination depository at one intermediate destination, other exemplary deposit item transport situations will involve transport through multiple intermediate destinations. This is particularly true when the transport of the deposit item is over a long distance. In some exemplary arrangements the incentive payments which the system user arranging for the transport can make, will help to reduce the number of intermediate depository destinations and result in delivery of the deposit item to the final destination more quickly.

As represented at step 202 an authorized system user that is willing to transport deposit items may operate their portable wireless device, such as carrier contact device 92, to indicate their availability to transport deposit items by initiating operation of an application on the device. Such system users are alternatively referred to herein as item carriers. In the exemplary arrangement the device application requires that the user sign onto the carrier contact device and provide appropriate carrier contact device data such as a telephone number or email address and user identifying information which identifies the particular user to the central circuitry, as represented at step 204. In exemplary arrangements the item carrier contact device data and other user identifying information as well as credentials such as token data for the item carrier that may be stored in the user device and in the central circuitry, will have been previously established through a registration process applicable to authorized users. In the exemplary arrangement the circuit executable instructions associated with the user's device 92 also require that the user provide location information such as through GPS data associated with the current carrier contact device location to the central system circuitry through at least one driver data message. This is represented at step 206.

In the exemplary system a user may choose to transport deposit items based on planned travel for other purposes. This may include for example, the user having a daily commute to a job that is substantially remote from where they reside. Alternatively a user may have planned travel for personal or other purposes to a destination, and is willing to transport deposit items in the course of their personal travel. Alternatively a user may be willing to perform transport services of deposit items to any local location to receive compensation for the transport services. As represented in step 208 the user inputs to the carrier contact device their available delivery location such as, for example destination information related to their current travel plans, or if the user is willing to travel to any location within a set distance range for purposes of making deliveries of deposit items. In some arrangements the user may also indicate that they have specialized capabilities such as handling fragile or perishable items, handling refrigerated items, handling large and/or heavy items, providing transport for items in secure compartments and/or they are bonded or insured for handling high value or legally controlled items. As represented at step 210 the control circuitry associated with the user's portable wireless carrier contact device is operative to send the data regarding the available item carrier transport user in at least one driver data message to the central circuitry for purposes of determining if the item carrier user will receive transport job assignments which will result in compensation being paid to the user.

As represented at step 212 the central circuitry receives the data from the item carrier contact device and conducts an analysis of the received data as represented at step 214. The central circuitry is also operative to recover the stored data regarding the rating information associated with the user as represented in step 216. The central circuitry is then operative to compare the data associated with the available transport user received driver data messages to the data associated with available transport jobs that need to be conducted. This is represented at step 218. Of course as can be appreciated, this activity is carried out by the central circuitry for each authorized item carrier transport user that indicates availability to participate in providing transport services for deposit items at the current time. The central circuitry is enabled to match available authorized item carriers with transport jobs in a manner that causes the deposit items to be moved to either a respective final delivery address, a final delivery depository destination of the deposit item, or an intermediate delivery depository location at a depository that causes the deposit item to move closer to its final delivery destination.

As represented in step 220 the central circuitry operates to match the authorized transport item carrier current location and the associated item carrier available delivery location data to the originating depository, the destination depository and the deposit item delivery requirements. The central circuitry is then operative to determine the destination depository which is the endpoint destination for the available item carrier as represented in step 222. In other arrangements the end point for the delivery may be the address of the recipient. In this particular example the endpoint destination for the initial item carrier is an intermediate destination depository that is not the final destination for the particular deposit item. The central circuitry is then operative to calculate the rate information for the transport user as represented in step 224. In an exemplary arrangement this calculation reflects an amount that the item carrier will receive for taking the deposit item from the current depository in which it is located, transporting it to the designated intermediate destination depository, and placing the deposit item in the intermediate destination depository for subsequent transport towards its final destination. In some exemplary arrangements the central circuitry may operate to determine multiple parcels that can be transported together by the item carrier as a bundle to a destination.

As represented in step 226 the central circuitry operates to send one or more opportunity messages to the carrier contact device which is the portable wireless device of the item carrier. The messages include the originating depository for pickup, parcel route for transport of the deposit item (or a bundle of items), end point destination depository (or end point delivery address) and monetary rate to be paid to the item carrier for transport of the deposit item. The messages may also provide an indication of the size and weight of the deposit items. The exemplary messages may also include data to indicate to the item carrier how far the transport job will require the item carrier to go off their currently indicated planned travel route to the input destination at the originating depository and/or at the destination depository. In operation of the exemplary system the carrier contact device receives the data regarding the transport assignment in at least one opportunity message as represented by a step 226. The control circuitry of the carrier contact device is then operative responsive to the received data in the at least one opportunity message to provide one or more outputs to the item carrier user indicative of the available transport assignment. The output data is then available for review by the item carrier user as represented at step 228. If the item carrier user finds the transport assignment details to be acceptable, the user operates the carrier contact device to provide one or more inputs as represented at step 230 which indicates that the user accepts the transport assignment. The carrier contact device then operates in accordance with its programming to send one or more item transport acceptance messages to the central circuitry as represented at step 232, indicative of the user acceptance and willingness to transport the delivery item from the delivery depository to the destination depository (or other end point location) in accordance with any other conditions specified in the at least one opportunity message.

The central circuitry receives the at least one item transport acceptance message data from the user's carrier contact device indicating acceptance of the transport assignment as represented at step 234. The central circuitry then operates to reserve the transport assignment for the item carrier as represented at a step 236. In the exemplary embodiment the central circuitry operates in accordance with its programming to reserve the transport assignment for the particular item carrier user only for a limited period of time. This helps to assure that the deposit item is transported in a commercially prompt manner. In the event that the item carrier to which the transport assignment has been reserved does not act to obtain the deposit item from the depository within the time period for which the transport assignment has been reserved, the central circuitry operates in accordance with its programming to reassign the transport assignment to a different designated authorized item carrier. As can be appreciated such a reassignment would generally require analysis of available transport carrier information and may change the route or other information to which the deposit item is next transported. Of course these approaches are exemplary and in other embodiments other approaches to be used.

Also in an exemplary embodiment a transport item carrier may send transport acceptance messages to accept a plurality of opportunity messages corresponding to transport assignments associated with the item carrier's planned or available delivery location travel. This may include a plurality of different deposit items, each of which may have a respective different pickup originating depository or shipment location and delivery destination depository or delivery location. The communication between the user device and the central circuitry enables storing the data related to each deposit item and transport job on the user carrier contact device to facilitate the activities that the item carrier is to perform in a proper manner and sequence.

In the exemplary arrangement once the transport assignment has been reserved for the authorized transport user by the central circuitry responsive to the at least one item transport acceptance message, the central circuitry operates in a step 238 to generate the one-time designated carrier access code that will enable the authorized user to access the originating depository in which the deposit item is currently located. At step 240 the central circuitry then operates to send the at least one transport assignment message to the carrier contact device. The at least one transport assignment message includes data corresponding to the one-time designated carrier access code and the location data for the originating depository to the item carrier. The user's carrier contact device operates to receive the data such as in the at least one transport assignment message represented at step 242. The exemplary central circuitry is operative to correlate the stored data corresponding to at least two of the item carrier identifying information, the delivery item identifier, and the depository from which the item carrier will receive the item and/or a respective interior area thereof, in the at least one data store such that they are stored in correlated relation. The exemplary central circuitry is further operative to store in correlated relation, the stored data regarding the one-time carrier access code and at least one of the item carrier identifying information, the delivery item identifier and the depository/interior area in which the delivery item is housed. The contact device then operates in accordance with its programming to guide the item carrier such as through the use of GPS data, to the originating depository location at which the deposit item is to be picked up.

Once the item carrier has arrived at the originating depository, the carrier contact device is operated by the item carrier to wirelessly send their user identifying information from the carrier contact device to the at least one input device of the depository. In the exemplary arrangement as represented at step 244, the user's wireless token data is sent from the carrier contact device of the user item carrier to the RF input device such as the wireless portal associated with the depository. The control circuitry of the depository is operative to receive user identifying data as represented at step 246, and is also operative to enable the keypad of the depository to receive an input access code which may correspond to the one-time designated carrier access code as represented at step 248. In other arrangements the designated carrier access code may be received through other input devices of the depository, such as for example, the wireless portal. The control circuitry is then operative responsive at least in part to receipt of the input access code to send at least one repository access request message as represented at step 250. The at least one repository access request message includes data corresponding to the user identification data, the input access code value and depository identifying data to the central circuitry. The central circuitry operates to receive the data in the at least one repository access request message from the depository as represented at step 252 and makes an authorized access determination responsive to verifying based on the stored data that the user identifying data corresponds to the authorized user who is to receive the deposit item, and that the input access code value corresponds to the designated access code appropriate for accessing the depository. In some arrangements the central circuitry is also operative to carry out the authorized access determination responsive to the identifying data for the depository receiving the input access code value and/or the user identification data corresponding to the origination depository for the transport of the deposit item. The authorized access determination is represented by step 254.

Responsive to the authorized access determination that the user identifying data and the one-time designated access code received at the originating depository is appropriate for accessing the deposit item, the central circuitry then is operative to send at least one repository access approval message to the originating depository as represented at step 256 to enable the interior area holding the deposit item in the depository to be accessed. As represented at step 258 the control circuitry of the originating depository is operative to receive and verify the genuineness of the message data from the central circuitry. Responsive at least in part to receipt and verification of the at least one depository access approval message, the control circuitry is operative to cause the lock to be changed to the unlocked condition as represented at step 260. The deposit item in the interior area of the depository thereby becomes accessible to the item carrier. The exemplary control circuitry associated with the originating depository is then operative to detect the opening of the door and to operate the sensors comprising reading devices to capture the indicia such as machine readable bar code for example, included on the deposit item that is removed from the interior area of the depository as represented by step 262. Alternatively in some arrangements the item carrier may capture an image of the item identifying indicia using their portable wireless device. The exemplary control circuitry is also operative to capture a plurality of images including the user and the deposit item, and to store the image data along with time data in the data store associated with the depository control circuitry. The weight sensor is also operative to indicate the change in weight associated with the removed item. This is represented by step 264.

The exemplary control circuitry and/or portable wireless device is then operative to send at least one parcel removal message to the central system circuitry, at step 266. The at least one parcel removal message includes parcel removal data corresponding to the identifying indicia read by the at least one sensor from the deposit item and the weight data. In other exemplary arrangements the parcel removal data may include other data that can be detected or read by one or more readers/sensors of the originating depository and/or through operation of the item carrier's portable wireless device. The central circuitry receives the parcel removal data in the at least one parcel removal message at step 268 and is operative at step 270 to verify that the parcel removal data corresponding to the read indicia corresponds to the deposit item identifying data for the delivery item that is to be taken by the identified item carrier that has accessed the depository based on the stored correlated data. The central circuitry may also verify that the weight removed and/or the size and/or other property of the item removed corresponds to removal of the proper delivery item. The central circuitry then operates at step 272 to send one or more correct parcel removal messages to the originating depository, that indicate that the deposit item identification indicia and user indicia is appropriate. Alternatively or in addition the at least one correct parcel removal message may be sent to the carrier contact device. The control circuitry of the depository may receive the message data from the central circuitry as represented at step 274 and is operative to provide an indication to the user that the removal activity is appropriate as represented at step 276. As previously discussed this indication may be given through visual and/or audible indication output by one or more output devices such as indicators on the depository. Alternatively such indications may be provided as outputs from the carrier contact device. Of course if the deposit item removal activity or user data is not appropriate, then negative indication outputs are provided either through the depository indicators and/or through messages that are sent by the central circuitry to the user's portable wireless carrier contact device.

The control circuitry of the exemplary originating depository is then operative responsive to the captured image data from the sensors such as reading devices, and/or the detected change in weight, to make a determination of the action status that has been carried out by the item carrier with regard to the identified deposit item. Alternatively or in addition, the determination may be carried out responsive at least in part to a wireless message from the carrier contact device responsive to an input from the user indicating that they have removed the parcel. This determination which is represented by step 278, is an action determination that the deposit item has been removed from the interior area of the depository. The control circuitry associated with the originating depository then senses for detection that the depository door has been closed as represented in step 280. As previously discussed the control circuitry of the depository either alone or through communication with the central circuitry, may operate to prompt the user to close the depository door in the event that closure is not detected within a programmed time. The control circuitry then operates to cause the lock to be changed to the locked condition once the door is closed as represented by step 282. The control circuitry then operates to send one or more delivery item parcel removal messages to the central circuitry indicating that the deposit item has been removed and taken from the depository by the item carrier as represented by step 284. As can be appreciated this process may be carried out for multiple parcels that are to be transported by the item carrier.

Responsive to the central circuitry receiving the one or more delivery item parcel removal messages from the depository and/or the carrier contact device that the deposit item has been taken by the item carrier, the exemplary central circuitry operates as indicated at step 286 to update the status data for the deposit item in the associated data store to indicate that the deposit item is with the authorized item carrier. In some exemplary arrangements the central circuitry then operates to cause at least one pick up request confirmation message to be sent to the portable wireless carrier contact device of the item carrier who has taken the deposit item to confirm that they have the item. This is represented by step 288. The portable wireless carrier contact device of the item carrier operates in accordance with its programming to cause one or more outputs that prompt the item carrier to confirm that they have received possession of the deposit item. This is represented at step 290. As represented at step 292, the user's portable wireless carrier contact device operates responsive to at least one confirmation input from the item carrier to send one or more wireless delivery item possession confirmation messages to the central circuitry to confirm that the user received possession of the deposit item. Of course it should be understood that in other exemplary arrangements the central system circuitry may omit the confirmation steps 286 through 292. This is particularly true in situations where the user indicates that they have the item by providing an input to their carrier contact device indicating they have taken the item and/or the user scans the parcel identifying indicia using the camera on the device, which results in wireless messages to the central system circuitry.

Responsive to the central circuitry receiving the delivery item possession confirmation messages from the user's portable wireless carrier contact device at step 294, or in some arrangements more directly responsive to one or more parcel removal messages, the central circuitry operates to recover from memory or otherwise resolve the destination depository for the item carrier to deliver the deposit item. This is represented at step 296. The exemplary central circuitry further operates to generate a one-time access delivery code to be input by the item carrier to the destination depository into which the item carrier is to place the deposit item. This is represented by step 298. The exemplary central system circuitry is further operative to store in correlated relation the data corresponding to at least two of the delivery item identifier, the item carrier identifying information, the one-time access code and the depository/interior area into which the delivery item is to be placed. The exemplary central circuitry is next operative to send at least one item transport delivery message including data corresponding to the one-time item carrier access code and the location information for the destination depository to the user's portable wireless carrier contact device. This is represented by step 300. The exemplary central circuitry continues to monitor the location of the portable wireless carrier contact device of the item carrier through GPS as the deposit item is transported toward the destination depository. This is represented by step 302.

As represented by step 304, in the exemplary system the portable wireless device of the transport user is operative to receive in the at least one item transport delivery message the data regarding the depository location and the one-time item carrier access delivery code. The portable wireless carrier contact device operates in accordance with its programming to direct the item carrier through use of the GPS data or other location data to the destination depository or other location at which the deposit item is to be deposited. This is represented by step 306. Upon arrival at the destination depository the item carrier operates their portable wireless device to cause the user identifying data including the user ID token to be sent from the user's device to the RF input device of the depository. This is represented by step 308.

The control circuitry associated with the destination depository is operative to receive the wireless user identifying information as represented by step 310. The control circuitry is also operative to enable receipt through the keypad or in some arrangements the wireless portal of the destination depository, of the input access code value corresponding to the one-time item carrier access delivery code from the item carrier. This is represented by step 312. The control circuitry associated with the destination depository is operative to send the received user identifying data, the input access code value, and depository identifying data to the central circuitry in at least one repository access message as represented by step 314. The exemplary central circuitry is operative to receive the data in the at least one repository access message as represented by step 316, and operates to verify that the received user data corresponds to the item carrier and that the input access code value corresponds to the one-time item carrier access delivery code as represented in step 318. The exemplary central circuitry is then operative to send at least one repository access approval message to the depository which includes data indicative that the received user data and the code data are appropriate based on the correlated stored data, and that the central system circuitry determined interior area of the destination depository should be unlocked so as to make the designated interior area of the destination repository accessible. This is represented by step 320.

The control circuitry of the exemplary destination depository is operative to receive the repository access approval message data from the central circuitry as represented by step 322. Responsive to the at least one repository message from the central circuitry being received and verified, the control circuitry associated with the destination depository is operative to cause the lock thereof to be changed to the unlocked condition as represented in step 324. As a result the designated interior area of the destination repository is externally accessible so that the delivery item may be placed therein by the item carrier. Responsive to detecting that the depository door has been opened, the exemplary control circuitry is operative to cause the reading devices to capture the machine readable indicia including the identifying indicia on the deposit item being placed in the designated interior area of the destination depository as represented by step 326. Alternatively the item carrier may use their portable wireless device to capture an image of the parcel identifying indicia and/or the depository to document placement of the item. The control circuitry is also operative to cause images from the reading devices and the change in weight detected by the at least one weight sensor to be captured and stored in the at least one data store along with the data corresponding to the captured identifying indicia on the deposit item, to document the accessing of the depository and the placement of the deposit item therein. This is represented by step 328.

The exemplary control circuitry associated with the destination depository is next operative to send at least one parcel insertion message, which is alternatively referred to herein as a parcel placement message to the central system circuitry as represented in step 330. The exemplary at least one parcel insertion message includes data corresponding to the indicia read and/or sensed from the deposit item including the machine readable indicia. Alternatively, in some arrangements, the parcel insertion message may be sent by the carrier contact device responsive to using the device to read the parcel identifier and receiving at least one input indicative of placement in the depository. The central circuitry receives the data included in the at least one parcel insertion message at step 332 and verifies that the indicia read and/or sensed from the deposit item (size, weight or other information or properties) corresponds to the correlated stored data for the deposit item to be deposited in the destination depository. This includes verifying that the read machine readable indicia read from the deposit item placed in the destination depository corresponds to the delivery item identifier. The central circuitry also verifies that the identifying data associated with the user corresponds to the user that is authorized to place the delivery item into the depository. This is represented by step 334. The central circuitry is then operative to send one or more correct parcel placement verification messages to the control circuitry of the destination depository to indicate that the received identifying indicia on the deposit item is correct. Alternatively or in addition the at least one correct parcel verification message may be sent to the carrier contact device. This is represented by step 336. The exemplary control circuitry of the depository receives the at least one correct parcel placement verification messages from the central circuitry as represented in step 338 and provides one or more outputs to the user to indicate that the indicia read and/or sensed from the deposit item is appropriate as represented in step 340. The at least one output may be provided by at least one output device of the destination depository and/or through an output device of the carrier contact device. The exemplary control circuitry associated with the depository may then be operative to analyze the captured image data and/or weight data to determine the action status associated with the deposit item. As represented in step 342 the control circuitry is operative to determine an action status that the deposit item has been received into the interior area of the depository.

In other exemplary arrangements the control circuitry associated with the depository may operate in an alternative manner to provide the authorized user with access to the interior area so that the deposit item may be placed therein. In such alternative arrangements the control circuitry may operate to receive the user identifying data wirelessly from the mobile wireless device associated with the user in a manner like that previously discussed. This may be done for example through a wireless input device such as a wireless transceiver in operative connection with the control circuitry that is operative to control access to the depository. Further in this alternative arrangement, a camera of the portable wireless device associated with the item carrier may be utilized as the reading device which is operative to read the item identifying indicia on the deposit item. The mobile carrier contact device may then operate to wirelessly communicate the item identifying indicia to the control circuitry. This may be done through the same or a different wireless communication path as the user identifying information. The control circuitry may then operate in accordance with its circuit executable instructions to make a determination based on the correlated stored data that the user identifying information corresponds to an authorized user, as well as a determination that the read item indicia corresponds to a deposit item that is authorized to be placed within the depository. The control circuitry may then operate in accordance with its programmed circuit executable instructions to cause the corresponding lock associated with the depository door to be changeable to the unlocked condition responsive at least in part to the user identification determination, the determination that the deposit item indicia corresponds to previously stored data indicative that the item is authorized to be placed in the respective interior area of the depository, or both. Further in some alternative exemplary arrangements, the control circuitry may operate responsive at least in part to the read item identifying indicia, which may include additional information about the item, to operate to cause the corresponding lock to be able to be placed in the unlocked condition. For example in some exemplary arrangements the item indicia included on the deposit item may correspond to a destination repository or a location in which the deposit item is to be delivered. In some exemplary arrangements the control circuitry may operate to determine if the item indicia includes data corresponding to the GPS determined location and/or identifying information for the depository in which the item is sought to be positioned. Responsive at least in part to the determination, the control circuitry is operative to enable the depository lock associated with the interior area in which the item is authorized to be placed, to be changeable to the unlocked condition. Further although in the exemplary arrangements the data regarding item carrier contact information and/or one-time access code, the delivery item identifier or other information may be received from a carrier contact device through an input device such as a wireless portal that is located at the particular depository, in other arrangements such information may be received through at least one wireless transceiver located remotely from the depository. For example, in such arrangements location data, such as GPS data associated with the location of the carrier contact device, may be provided to the central system circuitry in the messages from the carrier contact device. Such location data may be usable by the central system circuitry to determine that the carrier contact device is in proximity to a particular depository. Thus in such alternative arrangements it is not necessary for the local circuitry associated with the particular depository to receive the messages from the carrier contact device for purposes of assuring that the carrier contact device is in proximity to the depository and the item carrier is positioned to place the delivery item in or remove the delivery item from the depository. Of course it should be understood that these approaches are exemplary and in other arrangements other approaches may be used.

After the deposit is placed in the interior area the exemplary control circuitry then operates in accordance with its programming to sense for closure of the depository door. This is represented by step 344. As previously discussed the exemplary control circuitry may provide different forms of prompts to the user in the event that the depository door is not sensed as closed within a programmed time. Responsive to detecting the closure of the depository door the control circuitry of the destination repository operates to change the condition of the lock to the locked condition as represented by step 346. The exemplary control circuitry is then operative to send one or more delivery completion messages from the depository to the central system circuitry to indicate that the deposit item is within the designated interior area of the depository as represented by step 348. Alternatively or in addition a delivery completion message may be sent by the carrier contact device responsive to at least one input thereto by the item carrier. The exemplary central circuitry responsive to receiving the delivery completion messages, operates to update the status related to the deposit item in its associated data store to indicate that the deposit item is located within the particular destination depository. This is represented by step 350.

In situations where the delivery completion message is not sent from the carrier contact device, the exemplary central circuitry is next operative to send one or more delivery confirmation request messages to the portable wireless carrier contact device of the item carrier requesting confirmation that the deposit item has been placed in the destination depository. This is represented by step 352. The portable wireless carrier contact device of the item carrier operates responsive to the received messages to provide outputs which prompt the user to confirm the placement of the deposit item in the destination depository. This is represented by step 354. Responsive to receipt of at least one input from the item carrier the portable wireless carrier contact device is operative at step 356 to provide one or more delivery confirmation response messages to the central circuitry confirming that the user has placed the deposit item in the interior area of the destination depository. In other exemplary arrangements the confirmation steps 352 through 356 are not carried out.

The central circuitry of the exemplary embodiment is operative responsive at least in part to receipt of the delivery confirmation response messages from the transport user at step 358 or more directly responsive at least in part to the at least one delivery completion message, to determine that the item carrier has completed the transport assignment and to calculate a payment that is due to the item carrier as represented at step 360. The exemplary central circuitry is then operative to credit the item carrier for a payment amount corresponding to the payment that is due as represented at step 362. This may include crediting an account associated with the item carrier for the amount payable. Alternatively it may include a financial transfer to an account associated with the item carrier. Various payment forms may be accomplished depending on the arrangement that has been set up by the central system circuitry for making payment to the particular item carrier. The exemplary central circuitry then operates to send one or more messages to the carrier contact device of the item carrier indicating the payment as represented at step 364. The item carrier receives the notice of the payment through the portable wireless carrier contact device which outputs appropriate messages to the item carrier user as represented at step 366. Of course it should be understood that these steps are representative of only some exemplary payment transactions that may be carried out responsive to operation of the central circuitry.

In this example the initial item carrier was available only to transport the deposit item to a destination depository at an intermediate destination, and not to the final destination depository for the deposit item. Therefore responsive to the determination that the deposit item has arrived at the intermediate destination depository, the exemplary central circuitry is operative to determine a next destination depository for the deposit item. This is represented by step 368. As previously discussed the central circuitry will try to have the deposit item reach its final destination depository with a minimum number of intermediate destinations. However if it is not possible with the available item carriers to move the deposit item to its final destination with the next transport assignment, the exemplary control circuitry will cause the deposit item to be moved to another intermediate destination depository that is closer to its final destination. However for purposes of this example the next transport assignment will result in the deposit item reaching its final destination depository. Of course it should be understood that in other arrangements delivery may be made to a recipient's address rather than to a destination repository.

The exemplary central circuitry conducts a similar analysis to that previously discussed with regard to available item carriers for purposes of determining the next transport assignment which can be made for the deposit item. The central circuitry conducts an analysis of the available item carrier information at step 370. The central circuitry also reviews the rating data and other information for the available item carriers as represented at step 372. As represented at step 374 a comparative analysis is done of the available item carrier data to pending transport jobs to produce a match as represented at step 376. The exemplary central circuitry will then operate to determine the destination depository endpoint (or delivery location end point) for the deposit item delivery to be made by the available item carrier as represented at step 378. In this example the next destination will be the destination depository which is the final delivery destination for the deposit item.

The exemplary central circuitry is further operative to calculate the rate information to be paid for the transport by the available item carrier. This is represented at step 380. In some exemplary arrangements the central circuitry may operate to provide item carriers with incentives to transport particular deposit items. For example, if an item is not moving toward the final destination at an acceptable rate, the central circuitry may offer a premium to an available item carrier to transport the item. Of course this approach is exemplary.

The exemplary central circuitry is then operative at step 382 to send one or more opportunity messages to the portable wireless carrier contact device of the selected item carrier which describes the transport job that is available. In the exemplary arrangement the data included in the at least one opportunity message includes information regarding the pickup originating depository, deposit item parcel, transport route, endpoint destination depository and monetary amount or rate to be paid to the available item carrier. Of course in some cases additional or different information may be provided. Further in some arrangements an item carrier may be offered an opportunity to transport multiple parcels to the same destination or to multiple destinations along a common route. The portable wireless carrier contact device of the item carrier receives the at least one opportunity message as represented by step 384. The portable wireless carrier contact device of the item carrier operates responsive at least in part to the received data included in the at least one opportunity message to provide at least one output which indicates the details of the available transport job which the item carrier can then review as represented at step 386. If the item carrier wishes to accept the transport job, the item carrier provides one or more inputs to their portable wireless carrier contact device as represented at step 388, and the carrier contact device operates to send one or more item transport acceptance messages indicating a willingness to accept the transport job as represented at step 390.

As represented by step 392 the central circuitry operates to receive the item transport acceptance messages including data indicating that the item carrier is willing to perform the transport job, and reserves the transport assignment for the item carrier as represented at step 394. The central circuitry operates to generate a one-time designated carrier access code for the item carrier as represented at step 396. The central system circuitry operates to store the correlated data corresponding to at least two of the authorized user identifying data for the user who has accepted the item transport assignment, the delivery item identifying data, the one-time access code, and the interior area/depository where the item will be placed in a manner like that previously discussed. The central circuitry operates to send at least one transport assignment message including data corresponding to the one-time designated carrier access code and the location data for the originating depository to the user's portable wireless carrier contact device as represented by step 398.

The portable wireless carrier contact device of the item carrier receives the access code and location information in the at least one transport assignment message as represented by step 400. The portable wireless carrier contact device operates in accordance with its programming and the originating depository location information to guide the user to the depository as represented by step 402. As in the previous example the carrier contact device may be tracked via GPS, cell phone data or other methodology. Once arriving at the depository the item carrier operates the portable wireless carrier contact device to send the wireless identifying information such as the ID token data that identifies the item carrier, to the RF input device of the originating depository as represented by step 404. The control circuitry of the depository receives the item carrier user identifying information as represented at step 406. The circuitry associated with the originating depository also receives an input access code that may correspond to the one-time designated carrier access code from the item carrier as represented by step 408. The depository control circuitry is then operative to send at least one depository access request message including data corresponding to the user identifying information, the one-time designated carrier code and the depository identifying information, to the central circuitry as represented by step 410.

The central circuitry receives the data included in the at least one depository access request message from the depository at step 412 and operates using the stored data to verify the user identifying information corresponding to the authorized item carrier and that the input access code corresponds to the one-time designated carrier access code as represented at step 414. The central circuitry is operative to send one or more depository access approval messages to the depository indicating that the received item carrier identifying information and designated carrier access code is appropriate for accessing the interior area of the originating depository. This is represented by step 416. The control circuitry associated with the depository receives the at least one depository access approval message from the central circuitry indicating that the depository is to be opened and verifies the authenticity of the message as represented at step 418. The control circuitry associated with the depository is operative responsive at least in part to the at least one depository access approval message to cause the lock controlling access to the interior area or compartment space where the deposit item is housed to be enabled to be changed to the unlocked condition as represented at step 420. The control circuitry is further operative to operate at least one sensor to sense and/or capture the machine readable deposit item identifying indicia on the deposit item, image and/or size or other property data and the change in detected weight as the item is removed from the interior area of the originating depository as represented by step 422. Alternatively the item carrier may operate their portable wireless device to capture one or more images of the item identifying indicia and the device sends the image data and/or parcel identifying indicia to the central circuitry. The exemplary control circuitry also captures and stores images associated with accessing the depository including the item carrier user and the removal of the deposit item as represented by step 424. The control circuity also associates time data with the captured images. The control circuitry is then operative to send at least one parcel removal message including data corresponding to the deposit identifying indicia, size, other property data and/or weight information to the central circuitry as represented by step 426. Alternatively or in addition, one or more parcel removal messages may be sent by the carrier contact device.

The central circuitry is operative to receive the data included in the at least one parcel removal message as represented by step 428 and verify that the indicia read from the deposit item, size property data and/or weight data corresponds to the deposit item to be taken by the user whose identifying data has been received as represented at step 430. This may include verifying that machine readable indicia read from the deposit item corresponds to the deposit item identifier. The central circuitry is then operative to send one or more correct parcel verification messages to the depository indicating that the information received related to the deposit item and the user is correct. Alternatively or in addition the one or more correct parcel verification messages may be sent to the carrier contact device. This is represented by step 432.

The depository is operative to receive the data included in the at least one correct parcel verification messages from the central circuitry as represented by step 434 and to provide an indication to the user from an output device that the identifying indicia for the deposit item being removed is correct as represented at step 436. Alternatively or in addition the central circuitry may operate to send the confirmation message to the item carrier's portable wireless device. Of course as previously discussed, if the indicia, size, property and/or weight associated with the deposit item and/or the user data is incorrect, a warning indication is output from an output device of the depository and/or the user's portable wireless carrier contact device to indicate the error. The control circuitry associated with the exemplary depository is then operative to determine from the sensors of the originating repository which comprise reading devices and/or messages from the carrier contact device, the action status associated with the deposit item. In this case the action status corresponds to the deposit item being removed as indicated at step 438. The exemplary control circuitry of the depository then operates to sense the closure of the depository door as represented by step 440 and to change the condition of the lock to the locked condition as represented at step 442. The depository control circuitry is then operative to send one or more delivery item parcel removal messages to the central circuitry which are indicative of and give a notification that the deposit item has been taken as represented by step 444.

The exemplary central circuitry is then operative to update in at least one data store the status of the deposit item to indicate that the deposit item is with the item carrier as represented by step 446. In some arrangements, the central circuitry may also cause one or more confirmation request messages to be sent to the transport user's portable wireless carrier contact device requesting confirmation that the item carrier has possession of the deposit item. This is represented by step 448. The portable wireless device of the transport user operates to receive these confirmation request messages and to provide outputs to the item carrier indicating the request for confirmation. This is represented by step 450. Responsive to the item carrier providing inputs which confirm the item carrier has possession of the deposit item, the portable wireless carrier contact device sends one or more confirmation response messages to the central circuitry confirming possession of the deposit item by the user. This is represented by step 452.

Responsive to the central circuitry receiving the at least one confirmation response message from the item carrier's portable wireless carrier contact device at step 454 and/or the parcel removal messages, the central circuitry is operative to recover data corresponding to the destination depository for the deposit item at step 456 and to generate the one-time item carrier access delivery code usable by the item carrier to access the depository at the destination as represented at step 458. The central circuitry is then operative to send at least one item transport delivery message including data corresponding to the one-time code and the location of the destination depository to the carrier contact device at step 460. The central system circuitry further operates to store the correlated data corresponding to at least two of the authorized item carrier identifying information, the one-time access code, the deposit item identifying data, and the interior area/destination repository data in the at least one data store.

The portable wireless carrier contact device of the item carrier receives the data including the one-time code and the depository location in the at least one item transport delivery message at step 462. The user operates the portable wireless carrier contact device to be guided to the destination depository through GPS or other location finding methods as represented by step 464. The central circuitry of the exemplary arrangement tracks the item carrier through GPS tracking as represented by step 466. Upon arrival at the destination depository the item carrier operates their portable wireless carrier contact device to provide their user identification data such as the ID token to the RF input device of the depository as represented at step 468. The control circuitry is operative to receive the user identifying data as represented at step 470. The keypad or the wireless portal of the depository is also operative to receive an input access code corresponding to the one-time item carrier access delivery code from the item carrier as represented at step 472. The control circuitry of the depository is operative to send data corresponding to the user identifying data, the input access code corresponding to the one-time item carrier access delivery code and depository identifying data to the central circuitry in at least one depository access request message as represented at step 474.

The central circuitry receives the data included in the at least one deposit access request message from the destination depository as represented at step 476 and operates using the stored data to verify the user identifying data and the input access code as corresponding to the one-time item carrier access delivery code as authorized at step 478. The central circuitry is operative to send one or more access approval messages to the depository indicating that the received data is appropriate as represented by step 480, and the control circuitry of the depository is operative to verify the received message data at step 482. Responsive to the received at least one access approval message indicating that the user data and the code data is authorized, the control circuitry of the depository is operative to cause the lock controlling access to the interior area or compartment space where the central system circuitry has determined the deposit item should be placed to be changed to the unlocked condition as represented by step 484. The control circuitry operates the sensors comprising reading devices to capture the indicia on the deposit item, size, property and/or weight data for the deposit item that is being placed in the interior area of the destination depository as represented by step 486. Alternatively the item carrier may capture the item indicia of the parcel placed in the interior area and send such images and/or data corresponding to the indicia to the central circuitry. The control circuitry also operates the sensors comprising reading devices to capture images including the item carrier access to the depository and the placement of the deposit item therein, and to store the image data along with associated time data in the data store of the control circuitry. This is represented by step 488.

The control circuitry associated with the depository is operative to send at least one parcel placement message including data corresponding to the indicia read and/or sensed from the deposit item to the central circuitry as represented by step 490. Alternatively or in addition at least one parcel placement message may be sent by the carrier contact device. The central circuitry receives the identifying indicia at step 492 and is operative in a step 494 to verify that the identifying indicia, size, property and/or weight information corresponds to the appropriate deposit item and that the user identifying data corresponds to the appropriate user. The exemplary central circuitry is also operative to verify that the read machine readable indicia from the deposit item corresponds to the delivery item identifier. The central circuitry is operative to send one or more messages verifying the correctness of the input data and deposit item as represented at step 496. The at least one correct parcel verification message may alternatively or in addition be sent to the carrier contact device. The control circuitry of the depository receives the one or more messages as represented by step 498 and provides one or more outputs through the indicators or other output devices of the depository that the deposit information is correct as represented by step 500.

The control circuitry associated with the depository is operative to determine the action status of the deposit item from the data captured by the reading devices. As represented in step 502 the action status determination indicates that the deposit item has been received into the depository. The control circuitry operates to sense the closing of the depository door in a step 504, and responsive to sensing the door closure changes the lock to the locked condition as represented by step 506. The control circuitry of the depository then operates to send one or more deposit item received messages to the central circuitry to indicate that the deposit item is located within the depository. This is represented by step 508. Responsive to receiving the messages indicating that the deposit item is within the depository the central circuitry is operative to update the stored record data regarding the deposit item in the data store to indicate that the deposit item is within the particular destination depository as represented by step 510.

In some arrangements, the exemplary central circuitry then operates to cause one or more confirmation request messages to be sent to the portable wireless carrier contact device of the item carrier requesting confirmation that the deposit item has been placed in the depository. This is represented by step 512. The portable wireless carrier contact device of the item carrier receives the messages and provides outputs to the user indicating the request for confirmation. This is represented by step 514. Responsive to inputs by the user to their portable wireless carrier contact device confirming the placement of the deposit item in the depository, the portable wireless carrier contact device is operative to send one or more delivery confirmation response messages as represented at step 516.

Responsive to the central circuitry receiving the at least one delivery confirmation message that the deposit item has been placed in the depository at step 518, the central circuitry is operative to calculate the payment that is due the item carrier for transport of the depository item. This is represented by step 520. The central circuitry is then operative to credit the transport user a payment amount for the transport services provided as represented at step 522. One or more messages are sent to the carrier contact device at step 524 which are received by the user's portable wireless carrier contact device and which provide outputs to the item carrier indicating the payment made for the transport of the deposit item as represented at step 526.

Responsive to the determination by the central circuitry that the deposit item has been delivered to the indicated final destination depository, the central circuitry is then operative to determine the deposit item recipient to be notified of the delivery. The recipient data including recipient contact data may be included in the at least one transport request message associated with the receipt of the deposit item. Alternatively in some arrangements the delivery item delivery location data may correspond to recipient data. The recipient data for registered users including contact data for the user's device may be stored in a data store in operative connection with the central system circuitry. The determination of the recipient data is represented by step 528. In exemplary arrangements the recipient of the deposit item may be the owner of the depository into which the deposit item has been placed as the final destination. Alternatively the recipient to be notified may be a registered user of the system that is not the owner of the depository in which the item has been placed, which necessitates notification and providing access for the intended recipient.

Figure 28:
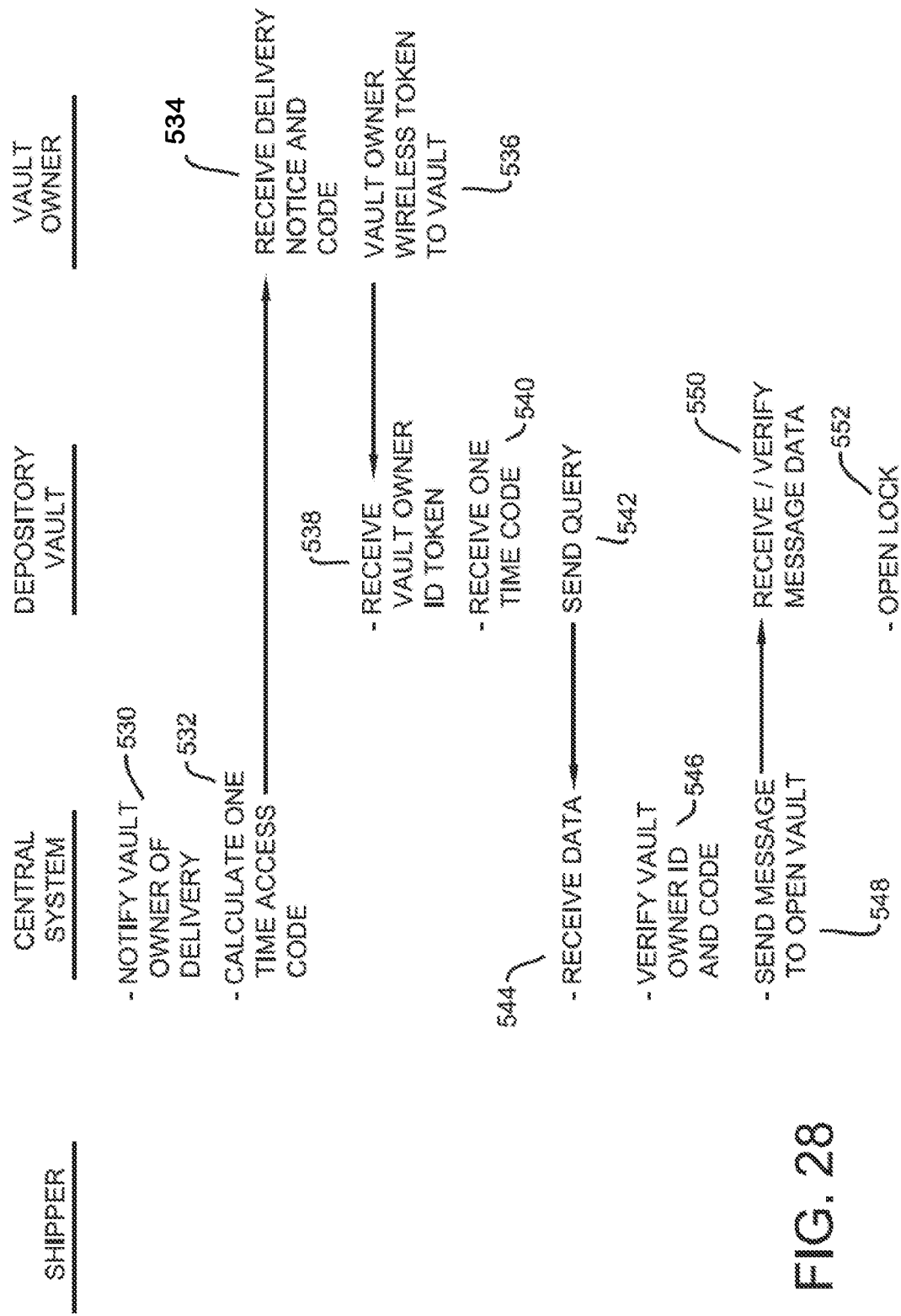
FIGS. 28 through 30 are a schematic representation logic flow carried out by the control circuitry of an exemplary depository, associated central system circuitry and devices operated by authorized users in connection with removing a deposit item from a depository.
Figure 29:
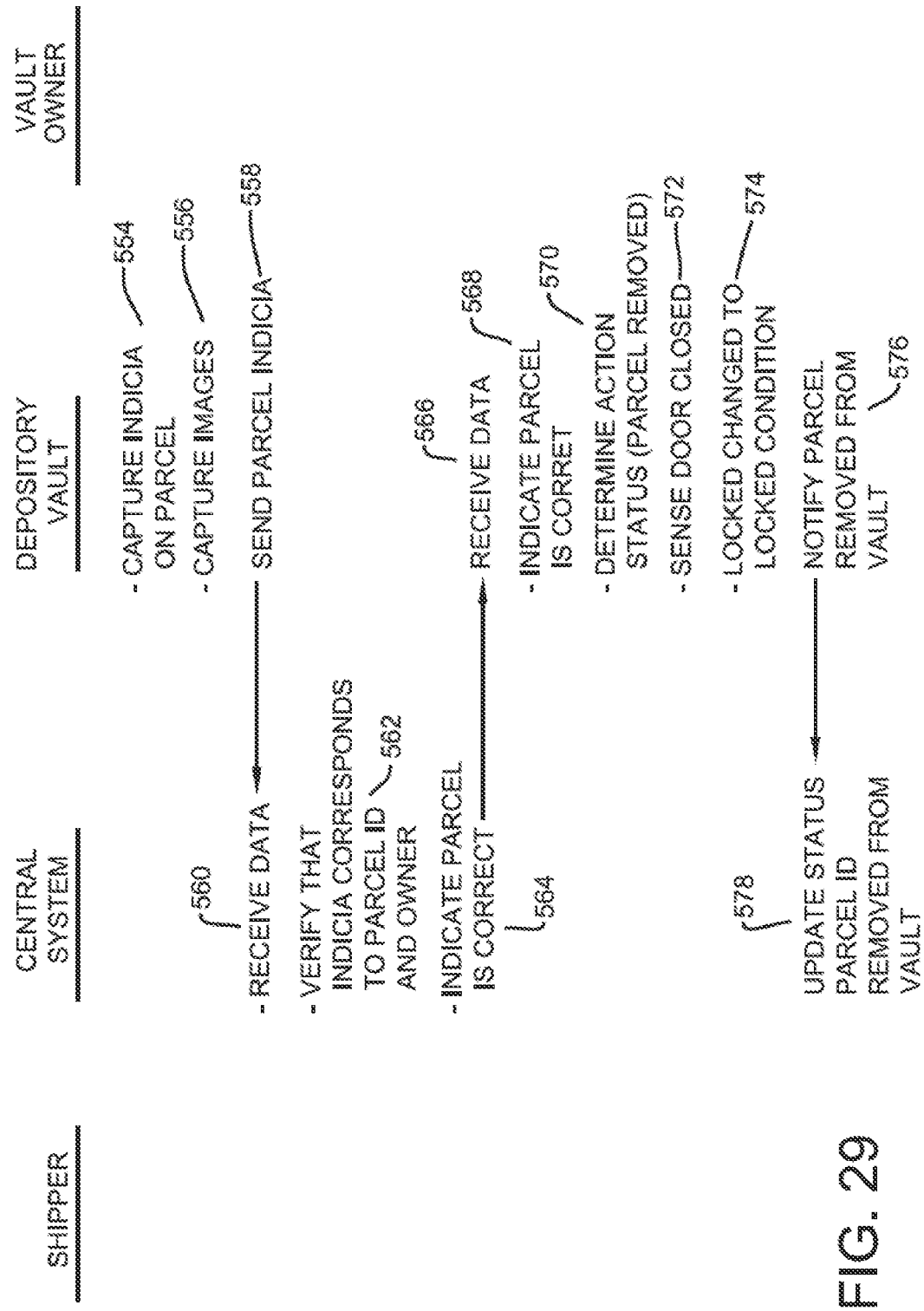
Figure 30:
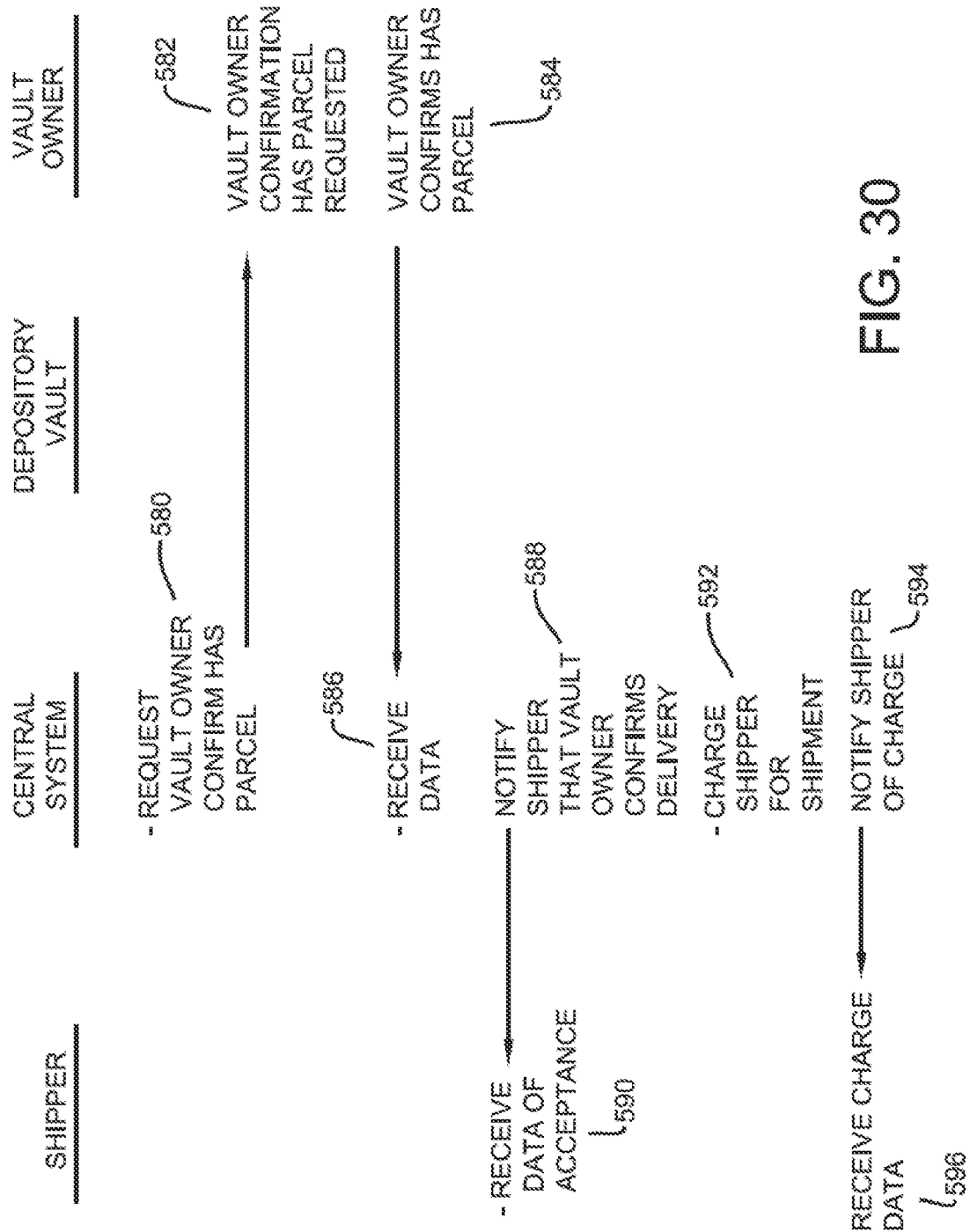
Figure 31:
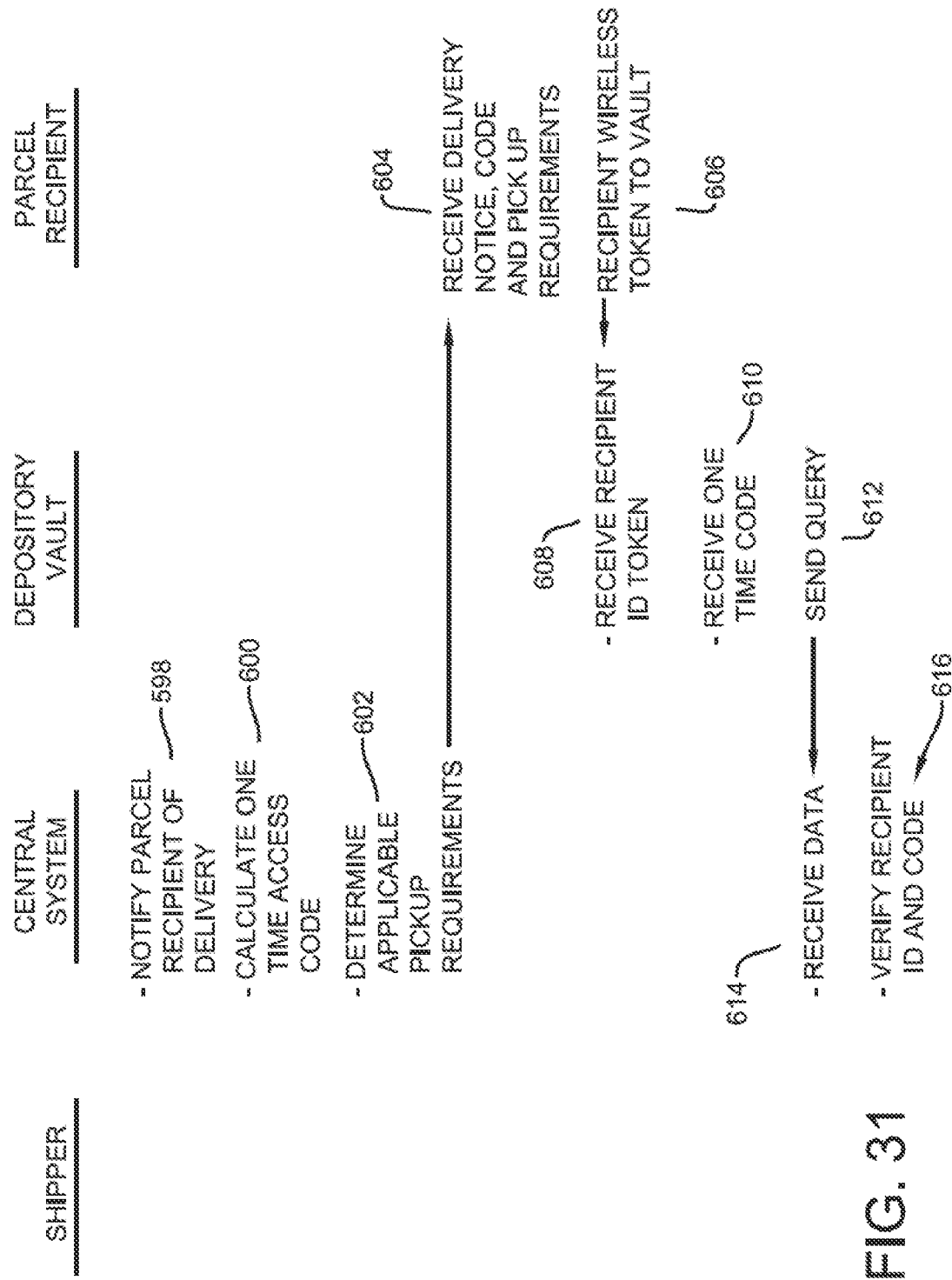
FIGS. 31 through 34 are a schematic representation of logic flow carried out by the control circuitry of the exemplary depository, associated central system circuitry and devices operated by authorized users in connection with delivery and payment associated with a deposit item placed in the depository.
Figure 32:
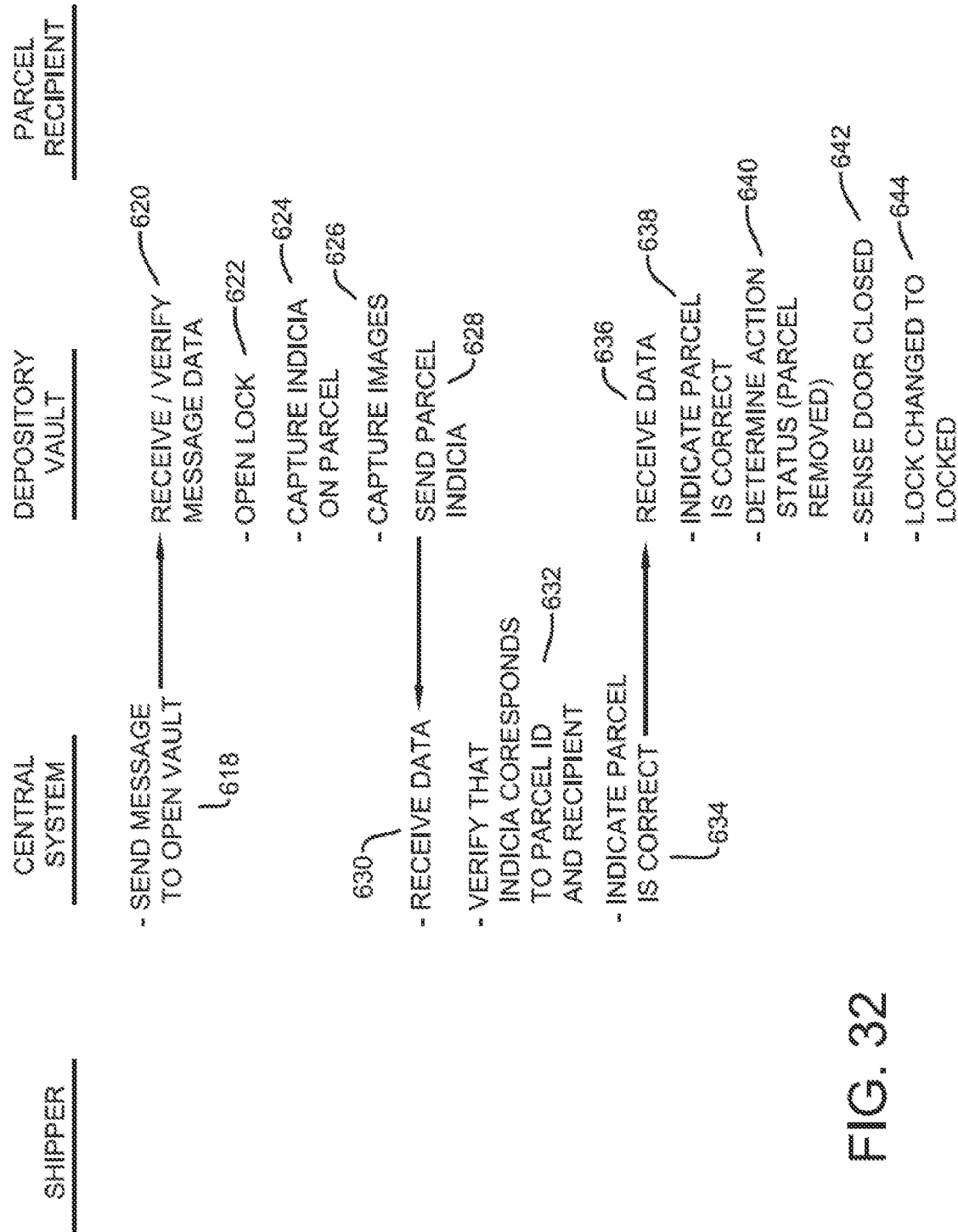
Figure 33:
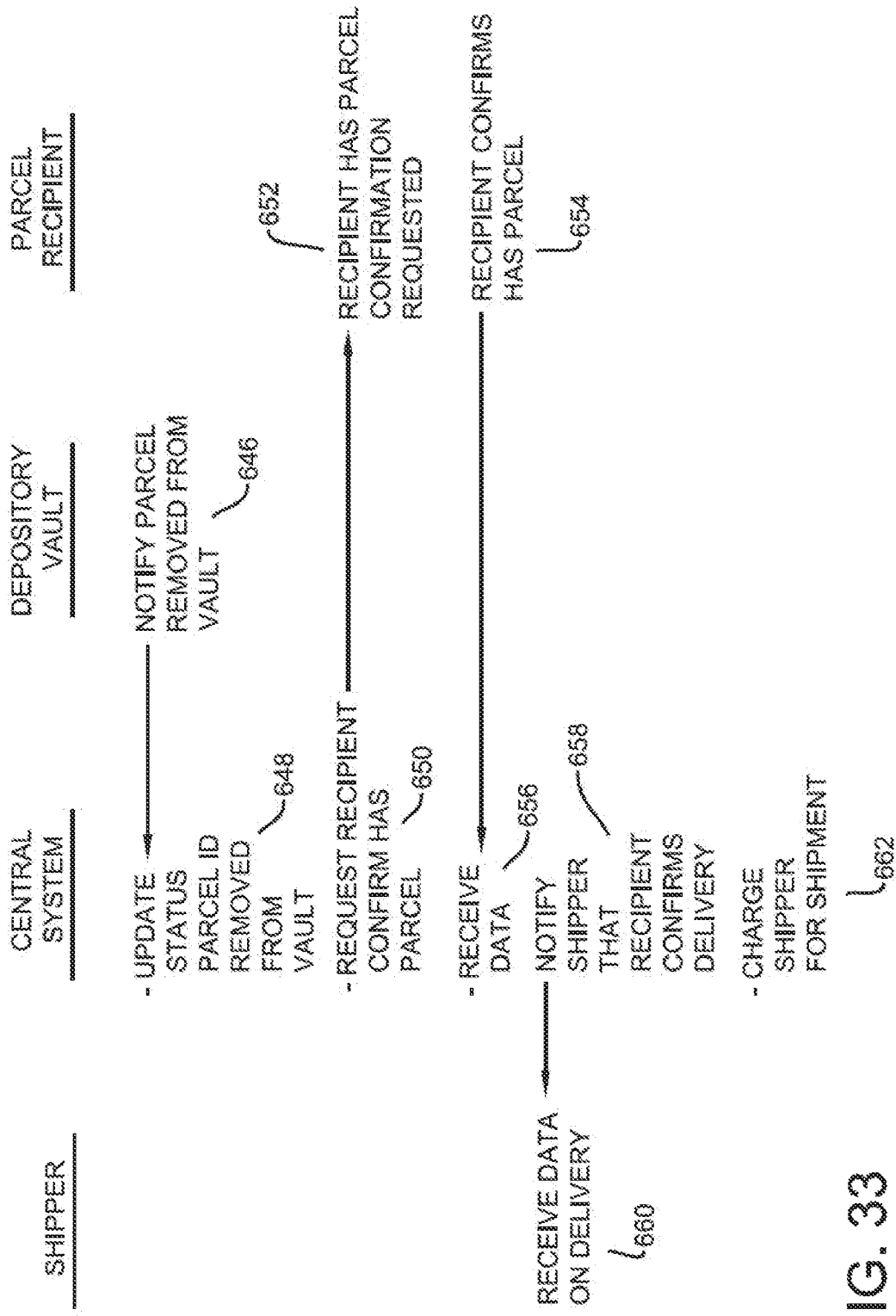
Figure 34:
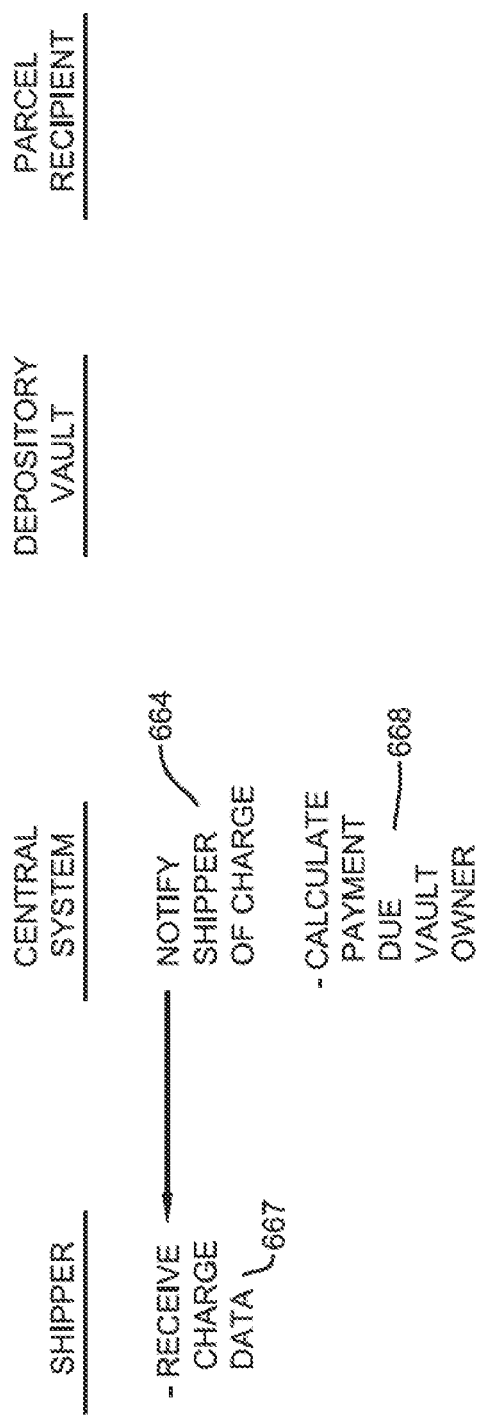

An example where the recipient of the deposit item is the owner of the depository is represented by the logic flow included in FIGS. 28 through 30. Responsive to the central circuitry determining that the depository owner is the recipient of the deposit item to be notified in step 528, the central circuitry operates to produce and at least one notification message to the depository owner at step 530. The central circuitry is also operative to generate a one-time recipient access code for accessing the depository to retrieve the deposit item at step 532. The central circuitry then operates to send at least one recipient notification message including data corresponding to the one-time recipient access code to the portable wireless device or other contact device of the depository owner as represented at step 534. The central system circuitry further operates to store in correlated relation the data corresponding to at least two of the identifying data for the deposit item recipient, the one-time code, the deposit item identifier and the interior area/depository in which the deposit item is stored. The depository owner then travels to the depository and inputs their identifying data wirelessly to the RF input device of the depository as represented by step 536. This identifying data may include an ID token assigned through a registration process of the central system circuitry. The control circuitry of the depository receives the wireless messages including the identifying data at step 538 and also operates to receive the one-time recipient access code through the keypad, wireless portal or other input device at step 540. The control circuitry of the depository is then operative to send at least one depository access request message including data corresponding to the identification data, the input recipient access code and the depository identifier to the central circuitry at step 542.

The central circuitry operates to receive the data in the at least one depository access request message at step 544 and uses the stored data to verify at step 546 that the received user identifying data and recipient access code data correspond to the data for authorized access to the interior area of the destination depository housing the deposit item. The central circuitry then operates to send one or more depository access approval messages to the depository as indicated at step 548. The control circuitry of the depository receives and verifies the message data at step 550 and changes the condition of the lock on the depository to the unlocked condition as represented by step 552. The exemplary control circuitry of the depository operates to capture through sensors and/or input devices the deposit item identifying indicia on the deposit item, size, property and/or weight data associated with the deposit item being removed from the depository as represented by step 554 and also captures images of the recipient depository user and the deposit item which are stored in the data store of the depository control circuitry along with time data as represented at step 556. Alternatively or in addition the user may operate their mobile wireless device to capture images of the item identifying indicia using a camera thereof and send it to the central circuitry.

The exemplary control circuitry associated with the depository is operative to send at least one parcel removal message including data corresponding to the deposit item identifying indicia, size, property and/or weight data to the central circuitry as represented at step 558. The central circuitry receives the data at step 560 and at step 562 verifies that the indicia, size, property and/or weight data sent regarding the deposit item and the user identifying data, corresponds to the authorized removal of the deposit item from the depository. Alternatively or in addition the central circuitry receives the parcel identifying indicia and/or other images or data from the recipient's portable wireless device. In the exemplary arrangement the central circuitry is operative to determine that machine readable indicia read from the removed deposit item corresponds to the deposit item identifier. The central circuitry is operative at step 564 to send one or more correct parcel removal messages to the depository indicating that the received information is appropriate. The control circuitry of the depository receives the one or more correct parcel removal messages at step 566 and provides an indication through the one or more indicators or other output devices of the depository that the deposit item removal data is appropriate at step 568. Alternatively or in addition the at least one correct parcel removal message may be sent to the recipient device.

The exemplary control circuitry associated with the depository is then operative to determine from the captured image data, size, property and/or weight data the action status of the deposit item. This is done in a step 570 in which the action status that the deposit item has been removed from the depository is determined. The control circuitry then operates to sense the closing of the depository door in step 572 and causes the condition of the lock to be changed to the locked condition in a step 574. The control circuitry of the depository then operates to send one or more parcel removed messages to the central circuitry to indicate that the deposit item has been removed from the depository at step 576.

The exemplary central circuitry then operates to update the status data included in one or more data stores of the central circuitry to indicate the deposit item has been removed from the depository as represented in step 578. In some arrangements, the central circuitry operates to send one or more recipient confirmation request messages to the portable wireless device or other device of the recipient depository owner to confirm that they have taken the deposit item as represented by step 580. The portable wireless device or other device of the recipient depository owner receives the receipt confirmation request messages and provides outputs indicating that the confirmation is requested. This is represented by a step 582. Responsive to the depository owner providing one or more inputs to their portable wireless device or other recipient device confirming receipt of the deposit item, the recipient device operates to send one or more recipient confirmation response messages to the central circuitry as represented by step 584.

The central circuitry receives the at least one recipient confirmation response message from the depository owner at step 586. Responsive to receiving the confirmation that the deposit item has been received by the intended recipient, the central circuitry operates to send one or more messages to the user device of the shipper user who is responsible for causing transport of the deposit item to the recipient. This is represented by step 588. Receipt of the information by the shipper who is the originator of the deposit item is represented by step 590. The exemplary central circuitry is also operative at step 592 to calculate the charge associated with the transport of the deposit item and to assess the charge to the shipper entity that requested the transport. The entity requesting the transport is notified of the charge through one or more messages which are sent at step 594 and which are received by the user who is the shipper through their portable wireless device at step 596. In the exemplary arrangement the charges are assessed to the funds source in the manner as designated by the user requesting transport at the time that the request was input to the system. Of course these approaches are exemplary and in other embodiments other approaches may be used. For example in other arrangements the charges may be assessed to a recipient.

The alternative exemplary logic flow when the recipient of the deposit item is not the owner of the destination depository is represented in FIGS. 31 to 34. In this exemplary arrangement the central circuitry is operative to determine the deposit item recipient to be notified as represented in step 598. The recipient and/or recipient contact data may be included in the transport request message. The recipient and/or recipient contact data may alternatively be resolved by the central circuitry from the delivery item destination location or other data included in the request for transport based on stored registered user data in the at least one data store for the recipient. If the recipient is not a registered system user the central control circuitry may require additional information from the shipper user as part of the transport request such as an invoice number or other data that can be used to confirm the identity of the recipient. The central circuitry is further operative to determine the one-time recipient access code to be used to access the interior area depository in which the deposit item is held at step 600. The central circuitry is also operative to determine data stored in the associated data store which corresponds to the applicable requirements associated with the depository which houses the deposit item as represented at step 602. This may include restrictions placed on operation of the depository by the depository owner, such as limited times for access or other requirements which restrict use of the depository by entities other than the depository owner. The central system circuitry further operates to store in correlated relation the data corresponding to at least two of the deposit item recipient, the one-time code, the deposit item identifier, and the interior area/depository in which the deposit item is stored.

The exemplary central circuitry is operative to send data corresponding to the notification and recipient access code and other applicable requirements to the portable wireless device (or other device) of the recipient in at least one notification message as represented by step 604. The notification message may include user identifying data for the recipient that is usable in connection with obtaining the deposit item if the recipient is not a registered system user who has an ID token. In some situations the identifying data may include an ID token or other identifying data that was provided to the recipient during a registration process that is required to participate in the system. The portable wireless device is operative to provide outputs to the recipient of the information needed to access the depository to retrieve the deposit item. As can be appreciated, in some arrangements the information sent to the recipient may include GPS or other location data that facilitates the recipient traveling to the depository to obtain the deposit item.

In an exemplary arrangement the recipient upon being in proximity with the depository operates their portable wireless device to provide the user identifying data wirelessly to the RF input device of the depository as represented by step 606. The depository receives the identifying data as represented by step 608 and also receives the one-time recipient access code through the keypad, or wireless portal or other input device as represented by step 610. In some cases the recipient user may also be required to input other identifying data. The control circuitry is operative to cause data corresponding to the received user identifying data, the code data and depository identifying data to be sent to the central circuitry in at least one depository access request message as represented by step 612. The central circuitry receives the data in the at least one depository access request message as represented at step 614 and operates using the stored data to verify the received user identifying data and the recipient access code data as represented at step 616. The central circuitry is then operative in a manner like that previously discussed to send one or more depository access approval messages to the depository indicating that the activity is authorized and that the depository interior area housing the deposit item should be unlocked. This is represented by step 618.

The control circuitry associated with the depository is operative to receive and verify the at least one depository access approval message from the central circuitry as represented by step 620. Responsive at least in part to the receipt of the messages the control circuitry is operative to unlock the lock to the interior area housing the deposit item as represented by step 622 and to cause the sensors comprising reading devices to capture the size, properties and/or weight associated with the item and the machine readable indicia on the deposit item removed from the interior area of the depository as represented by step 624. Alternatively or in addition the recipient may be prompted to capture item identifying indicia from the parcel or other image data through use of the camera on their portable wireless device and transmit messages to the control circuitry including such image data and/or indicia. The control circuitry is also operative to capture images of the recipient user and the deposit item, and store the images and size, property and/or weight data in the data store associated with the control circuitry along with time data as represented by step 626.

The control circuitry associated with the depository is operative to send data corresponding to the indicia read and/or sensed from the deposit item such as size, property and/or weight data to the central circuitry in at least one parcel removal message as represented by step 628. The central circuitry receives the data from the depository and/or the recipient device as represented by step 630 and operates to verify that the received indicia and weight data corresponds to the appropriate depository item and the user identifying data corresponds to the authorized recipient as represented by step 632. In an exemplary arrangement the central circuitry is operative to verify that the machine readable indicia read from the removed deposit item corresponds to the delivery item identifier. The central circuitry is operative to send one or more correct parcel verification messages to the depository indicating that the information related to removal of the deposit item is correct. Such messages may additionally or alternatively be sent to the recipient device. This is represented by step 634. The control circuitry of the depository is operative to receive the correct parcel verification messages from the central circuitry as represented by step 636 and to provide one or more outputs through the indicators or other output devices on the depository that the deposit item information is correct as represented by step 638.

The control circuitry of the depository is then operative to analyze the captured image data, size property and/or weight data to determine the action status associated with the deposit item as represented by step 640. In this situation the control circuitry is operative to determine that the deposit item has been removed from the depository. The control circuitry is also operative to sense for closure of the depository door as represented by step 642, and responsive to sensing the closure thereof, to cause the lock to be returned to the locked condition as represented by step 644. The control circuitry of the depository is operative to send one or more delivery completion messages to the central circuitry indicating that the deposit item has been removed from the depository as represented by step 646. The central circuitry is operative to receive the delivery completion messages from the depository and update the status data in the data store related to the deposit item to indicate that the deposit item has been removed from the depository as represented in step 648.

In a manner like that previously discussed, in some arrangements, the central circuitry is further operative to cause one or more receipt confirmation request messages to be sent to the portable wireless device of the recipient. This is represented by step 650. The messages request confirmation that the deposit item has been received by the recipient. The portable wireless device of the recipient is operative responsive to the messages to provide outputs requesting such confirmation as represented by step 652. The recipient then provides one or more inputs to their portable wireless device confirming receipt of the deposit item as represented by step 654. The recipient wireless device operates responsive to the recipient inputs to send at least one receipt confirmation response message to the central circuitry. The central circuitry is operative to receive the at least one receipt confirmation from the recipient at step 656, and to send a notification message to the user device of the shipper user that requested the transport of the deposit item to indicate that the item has been received at step 658. The portable wireless device of the shipper user that requested the transport receives one or more delivery indication messages as represented by step 660.

The exemplary central circuitry is also operative to calculate the charge to be assessed to the shipper user requesting transport of the deposit item for the transport thereof. This is represented by step 662. The charge for transport is assessed to the shipper user in the manner designated at the time of requesting shipment, and the user is notified of the charge as represented at step 664. The user receives the charge notifications through their portable wireless device as represented by step 667.

Further in this exemplary arrangement because the deposit item was delivered to the recipient through the depository that is owned by a depository owner other than the recipient, the depository owner receives a payment for the associated use of their depository in connection with the delivery of the deposit item. In the exemplary arrangement the central circuitry is operative to calculate a payment that is due the depository owner as represented in a step 668. In some exemplary arrangements the central circuitry is operative to send one or more messages to the portable wireless device or other system device operated by the depository owner to indicate the receipt of the payments for the use of the depository. Alternatively in other exemplary arrangements, the central circuitry may operate to credit an account of the depository owner for such use of the depository by offsetting the amount of credits against charges to the depository owner for acceptance, transport and/or delivery of deposit items. Of course it should be understood that these approaches are exemplary and in other embodiments other approaches may be used.

It should be understood that while the examples provided discuss users dealing with a single depository item, in exemplary systems numerous different deposit items will be handled by each authorized user. This may be particularly true of item carrier users that simultaneously handle a plurality of deposit items that are being transported as a bundle or group between different depositories. The exemplary embodiments help to assure that the proper depository items are removed and deposited in the proper depository for purposes of transporting the item to the proper destination. The ability of the exemplary arrangements to provide an indication of any incorrect actions and to track the whereabouts of deposit items within the system at all times facilitates the prompt and reliable transport and delivery of such depository items.

Further the exemplary arrangements provide advantages for transport of items between depositories by enabling the transport to be made by individuals who often are otherwise commuting or otherwise traveling to locations where item transport can be conducted as an ancillary activity that generates revenue for the users. Such transport can also be made in incremental steps as previously discussed based on the available transport users. The ability to utilize such user resources can also provide more options for transport of items, while reducing costs compared to scheduled transport systems.

As previously discussed in other exemplary arrangements item carriers may deliver deposit items to recipient addresses rather than to an item depository as a final destination. In such arrangements the item carrier may use their carrier contact device for purposes of documenting the delivery to the recipient. This may include for example, using the carrier contact device as a reader to capture images of the deposit item, including the identifying indicia on the parcel, showing the parcel placed at the delivery location. Alternatively or in addition an item carrier may utilize the carrier contact device and the camera thereon to capture images that show the recipient facility or the individual to whom the item is delivered. In still other exemplary arrangements the item carrier device may be operated by the item carrier to receive audio or audiovisual acknowledgments from the recipient to document the delivery of the parcel. Exemplary carrier contact devices may also include circuit executable instructions that enable the item carrier to capture a "signature" of the parcel recipient through signature capture via recipient finger contact with the touchscreen of the carrier contact device or through other types of inputs which the recipient has agreed that such input corresponds to their legal signature. Messages including the parcel identifying indicia, and delivery documentation are transmitted to the central system circuitry from the carrier contact device. In some arrangements the data sent may also include position data, such as GPS data, which is indicative of the location and time at which such documentation was captured. Such information may be imbedded in metadata of captured images for example. The exemplary central system circuitry is operative to store in at least one data store the delivery documentation in connection with the other data related to the delivery item. Such record information related to the delivery of the parcel may be stored in at least one data store in connection with the central circuitry for a programmed period of time so that the delivery thereof to the recipient can be audited and documented in the event that questions arise as to the delivery or disposition of the particular parcel. Of course these approaches are exemplary and in other arrangements other approaches may be used.

Similar approaches may be used in some exemplary arrangements to have an item carrier pick up deposit items at an originating shipper address. The item carrier may operate their mobile device to capture the item identifying information and other item and shipper information to document acceptance of the item for transport.

In exemplary arrangements the central system or other connected systems may be further operative to assure that the depositories operate properly and that malfunctions or anomalies are detected and corrected promptly. For example in exemplary arrangements the central system may operate to receive information from the control circuitry associated with each depository that is indicative of conditions or statuses associated with the devices that are included as part of the depository or that are in operative connection therewith. In some exemplary arrangements the control circuitry of each depository may be operative to automatically report condition and/or status information on a periodic basis to the central circuitry. Alternatively or in addition the central circuitry may be operative to periodically poll the control circuitry of each depository, which polling messages are operative to cause sending of information by the depository, and the receipt of the condition or status information by the central circuitry. Various combinations of such techniques and alternative arrangements for obtaining condition and status information associated with depositories may be provided in exemplary arrangements.

The control circuitry of depositories in some exemplary arrangements may be operative in accordance with circuit executable instructions to monitor signals associated with the devices included in or connected to the depository. This may include sensors which are operative to detect errors or malfunctions. For example, the control circuitry may operate to detect situations where sensors such as cameras or other image capture devices associated with the depository are no longer operative to send image signals or have degraded clarity so as to indicate a loss of image capture capability. Other signals may be operative to detect a malfunction of other sensors, such as switches that are operative to determine the status of the depository door or other component monitored by the switch. In other exemplary arrangements conditions associated with the lock or locks associated with the depository door may be monitored for purposes of detecting a malfunction or possible efforts at tampering. In some exemplary arrangements the circuitry may operate to monitor the operation of the one or more sensors, such as property sensors of the types previously discussed. Property sensors such as weight sensors, size sensors, image sensors, and other sensor types are monitored to determine if a sensor has malfunctioned or has decreased sensitivity. Other sensors may operate to detect abnormal conditions such as high or low temperatures which may indicate a problem or a malfunction. Other sensors may operate to detect smoke or other particulate matter which may indicate combustion or other possible problems. Additional sensors may be operative to detect the temperature of the control circuitry, a power supply and/or a battery or other element in connection therewith, for purposes of determining a possible malfunction.

In other exemplary arrangements conditions associated with sensors or devices may be monitored to determine malfunctions or other conditions indicative of problems or a probable future problem. For example, if the depository is located in an environment that needs to be illuminated such as during evening hours, sensors may be operative to monitor for the presence of a level of ambient lighting that operates to illuminate the area of the depository for security reasons. The absence of a sufficient level of ambient illumination may be detected as an unacceptable condition which needs to be remedied by the replacement of bulbs or other illumination devices in the area of the depository. Further in exemplary arrangements the circuitry may be in operative connection with sensors that are operative to detect the power draw associated with the operation of depository devices. For example the control circuitry may be operative to detect the power draw associated with the electrical actuation needed for locking or unlocking the lock of the depository. The values associated with the power required for such activity may be stored and monitored over time so that changes indicative of a developing problem can be determined. Alternatively or in addition, conditions associated with the available power capabilities provided by a battery and/or solar cells may be monitored to identify circumstances or trends which indicate that the battery and/or solar power source has failed or is exhibiting conditions which correspond to probable upcoming failure. In some exemplary arrangements such data may be stored and monitored over time. Such data may be analyzed to determine trends which are indicative of the particular component nearing an end-of-life condition or a probable future malfunction.

In other exemplary arrangements the control circuitry may operate to monitor connectivity associated with wireless communications or other communication channels for purposes of verifying that the depository is maintaining the required communications capability with the central system. The inability to maintain such communications capability over a period of time may indicate problems associated with the control circuitry and/or the network in which the depository is connected. Further in exemplary arrangements the depository may include sensors which may sense conditions that are indicative of a criminal attack on the depository. These may include for example conductivity integrity sensors which are positioned in the walls, a bottom and/or one or more doors of the depository and which are operative to detect holes, cutting action or other attempts to access the depository interior. In other exemplary arrangements seismic sensors may be included in depositories for purposes of detecting circumstances under which a depository may be moved or may be subject to impacts for purposes of attempting to steal or breach the depository. Still in other exemplary arrangements, sensors may be provided in or adjacent to the depository for purposes of determining external conditions such as fire, smoke, heat, flood or other conditions which are problematic to the operation of the depository unit. Of course these conditions which may be monitored and analyzed are exemplary, and in other embodiments other conditions may be detected and approaches may be used.

In exemplary arrangements the control circuitry associated with the depository may operate to analyze signals or conditions, and send messages to notify the central system circuitry of the particular condition. In some exemplary arrangements the depository control circuitry may be configured to operate so that detection of the condition may be automatically notified to the central system circuitry as soon as it is detected. This may include categories of urgent conditions such as circumstances which correspond to criminal attacks that attempt to access the interior of the depository. In other circumstances data corresponding to other less urgent conditions may be stored as status data in one or more data stores associated with the depository control circuitry. Such status condition information may be sent individually or in combination with other status information to the central system circuitry when the depository is polled or otherwise requested to submit status data. Of course these approaches are exemplary and in other embodiments other approaches may be used.

In some exemplary arrangements the central system circuitry may be operative to include data corresponding to acceptable operating parameters and ranges for the operation of components included in depositories. Such stored data may correspond to a model, template or other arrangement of information that provides suitable ranges for detected readings, parameters or conditions when a depository is operating properly. In exemplary arrangements communications between the central system circuitry and the control circuitry of each depository may be operative to determine the information from the depository necessary to compare the status information associated with the depository to the stored data. The central circuitry may operate in accordance with its programmed instructions to identify anomalies or irregularities in the data from the depository and to determine the condition or conditions indicated by this data. Further in exemplary arrangements the central circuitry may be operative to identify the remedial actions that are necessary in response to the data that is received from a depository.

In exemplary arrangements in response to determining abnormal conditions, problems, malfunctions or developing conditions at a depository, the central system circuitry may operate in accordance with its programmed circuit instructions to take programmed actions in response to such determinations. Such programmed actions may include for example, sending one or more messages to other systems to indicate the need for repair, servicing or other actions associated with the particular depository. In other circumstances such actions may include notifying appropriate authorities of the condition at a depository. For example if the detected condition includes an attempted theft, breach of the depository or fire condition, the central system circuitry may operate to notify appropriate police or fire authorities in the area where the depository is located. In other circumstances the central system circuitry may operate in accordance with its programming to communicate with other systems to schedule a service call or other remedial or preventive maintenance at the particular depository to correct conditions and/or to replace parts that may be reaching the predicted end of useful life. Of course these approaches are exemplary and in other embodiments other approaches may be used.

In still other exemplary arrangements the central system circuitry may be operative to communicate with the depository to attempt remote correction of problematic conditions which are detected. For example, in circumstances where the depository or device included therein may not be operating in a proper manner, the exemplary system may operate to download to the control circuitry of the depository, circuit executable instructions that may correct or reduce the effect of the problem. This may include for example, downloading to the control circuitry of the depository a substitute script to be executed by the control circuitry for purposes of controlling a particular device. The central system may cause the download of instructions that cause the control circuitry of the depository to execute the substitute script and report the results to the central system. The results reported may indicate further steps that can be taken by the central system through detecting signals from the control circuitry and downloading further scripts or other instructions for purposes of remotely determining the problem and/or making corrections. In other arrangements the central system may operate to cause the control circuitry of a depository or devices connected thereto to reboot or otherwise initialize in an attempt to address problems or correct anomalies. Of course it should be understood that these approaches are exemplary and in other embodiments numerous other approaches may be used.

Figure 35:
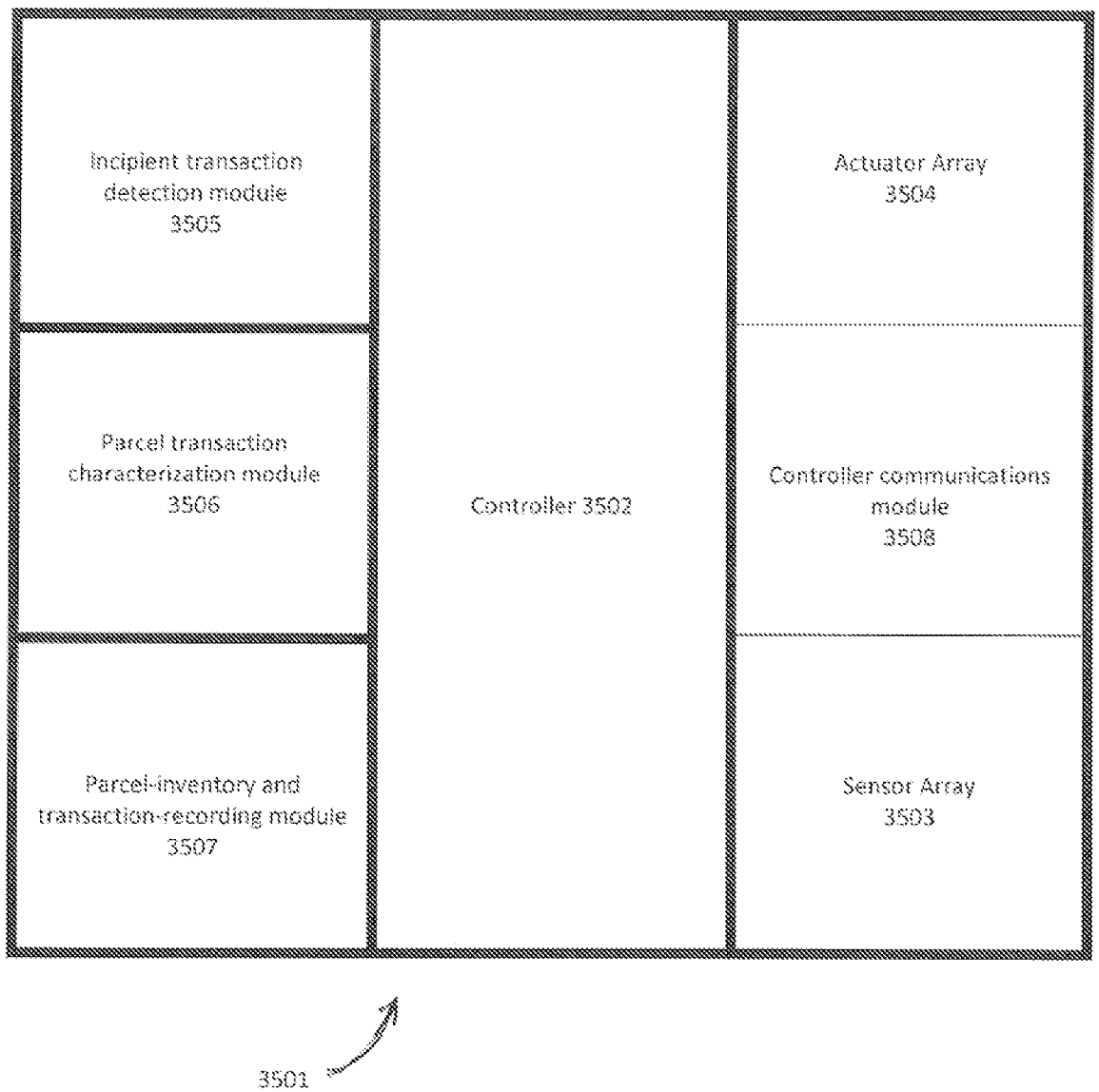
FIG. 35 is a block schematic overview depicting the modules in association with the controller and sensor/actuator array.
Figure 36:
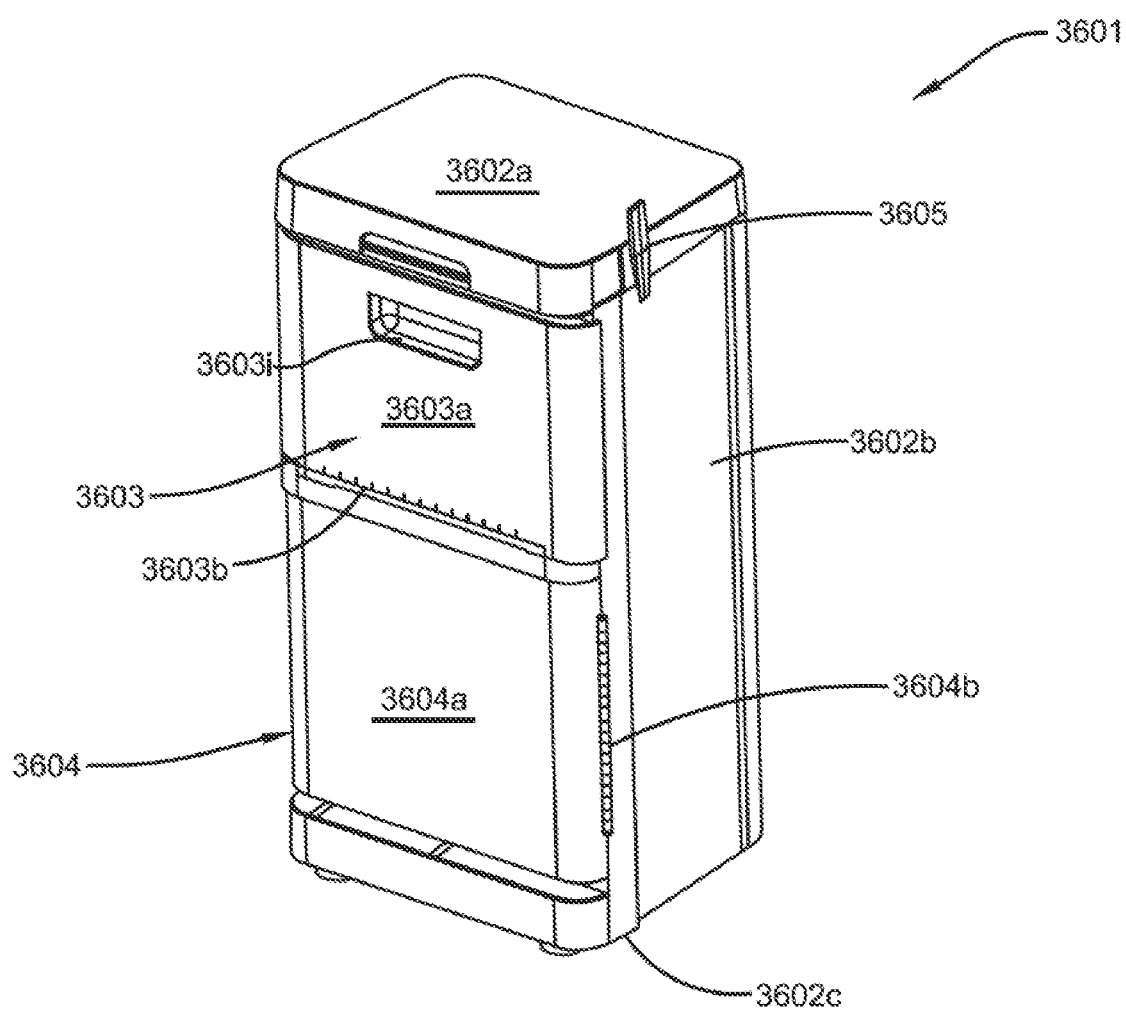
FIG. 36 is a perspective view of a repository embodiment according to aspects of exemplary systems.
Figure 38:
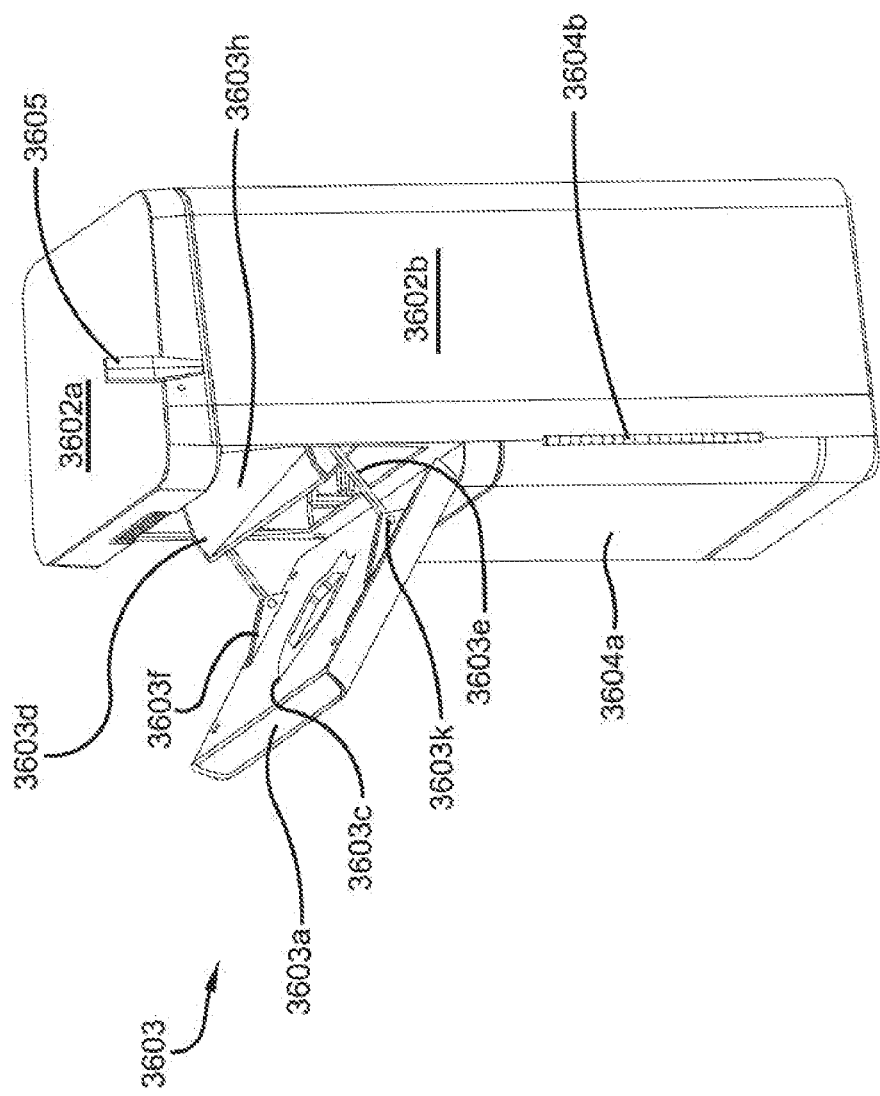
FIG. 38 is a perspective view of the repository shown in FIG. 36, with a parcel delivery chute door in a partially opened position.
Figure 39:
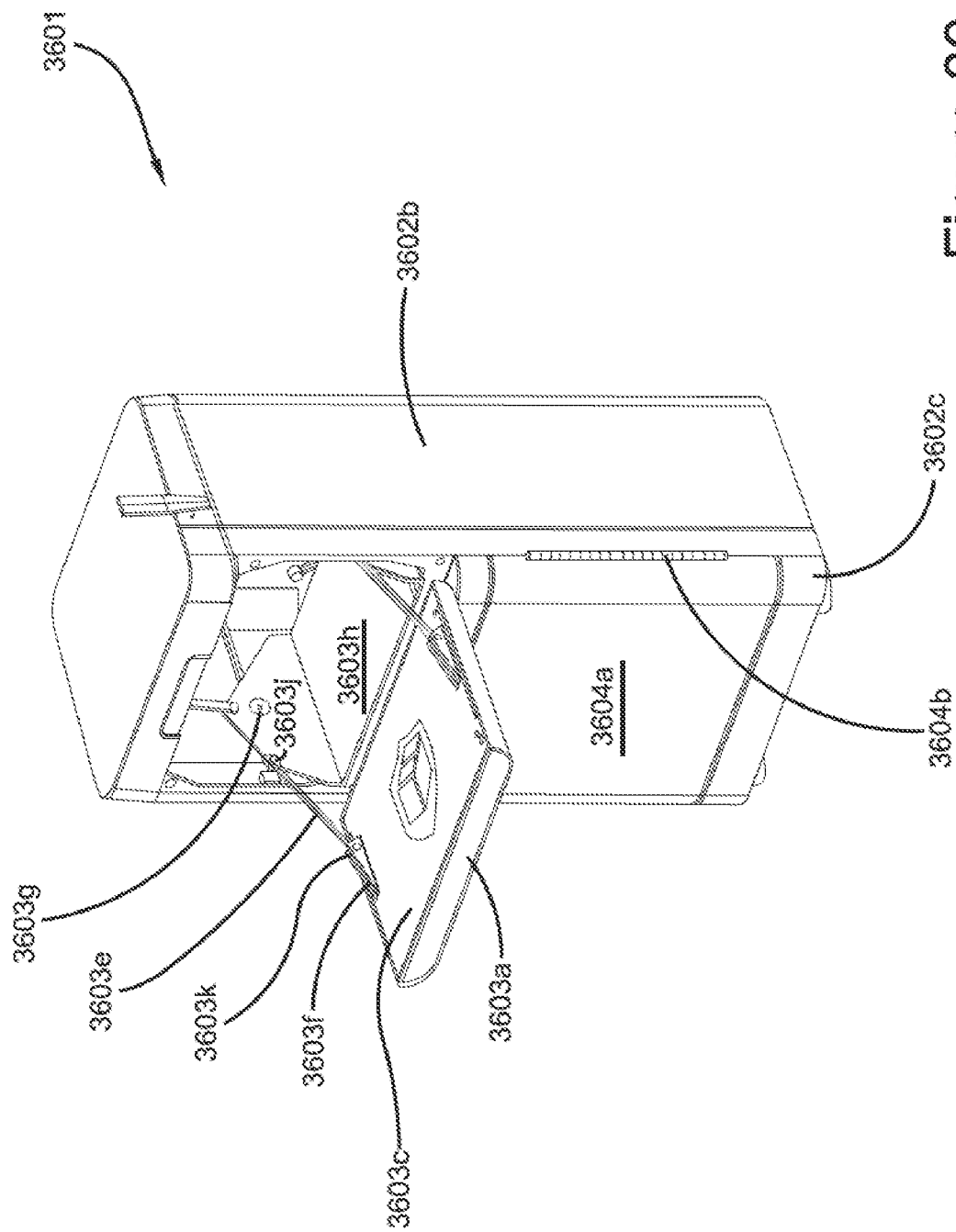
FIG. 39 is a perspective view of the repository shown in FIG. 36, with a parcel delivery chute door in a fully opened position.

As illustrated in FIG. 35 there is provided an exemplary parcel transaction monitor 3501, for a monitored-access parcel depository, which is alternatively referred to herein as a repository or a lock box. Deposit items and delivery items are alternatively referred to herein as parcels or packages. The exemplary repository (not shown), includes control circuitry including at least one controller 3502 with sensor/actuator arrays 3503 and 3504 respectively. The control circuitry is operable to monitor parcel transactions for at least one of parcel delivery or parcel extraction transactions in relation to said repository, and providing for at least one of:

An incipient transaction detection module 3505 for prospectively detecting an incipient parcel transaction in relation to the repository of an at least one of a possible parcel for delivery transaction, or a possible parcel carrier intent on a repository parcel transaction;

A parcel transaction characterization module 3506 for differentially characterizing a parcel transaction; or, A parcel-inventory and transaction-recording module 3507 for sensing a change in repository parcel inventory resulting from a repository parcel transaction.

These exemplary modules are adapted to variously employ elements and functions of said controller and array for the respective operations thereof, and the elements and functions of the controller and array may be variously shared between the modules in the execution of their respective operations.

An incipient transaction detection module 3505 is comprised of a controller 3502 and sensor/actuator arrays 3504/3503 for use with a controlled-access parcel repository which includes at least one sensor for detecting proximity (which may involve physical contact with the repository or something more distant) of a possible parcel for delivery or a possible parcel carrier intent on a repository parcel transaction.

By way of example, this module may employ for this purpose, the controller with one or combinations of sensors/actuators of said array, including:

Accelerometers, or similar repository movement or contact detectors, (e.g. even something as simple as a contact switch—such as a button or a keyboard, or the operation of a parcel repository access door or chute);

Ultrasonic, photoelectric, infra-red, exogenous motion or presence detectors; or, Proximity or estimated time of arrival by radio-frequency—e.g. by tracking a parcel or its carrier location using a GPS signal through a smart phone or other communications device (geo fencing, geo location etc.), or more locally by detecting an RFID or NFC device signal, a Bluetooth device or the like.

The proximity detection module may, on detection of such proximity, and presupposing thereby a possible parcel for delivery or a possible parcel carrier intent on a repository parcel transaction, be operable to further actuate one or both of the other modules. Accordingly, in aspects of exemplary arrangements the incipient transaction detection module may further operate an at least one actuator for:

actuating a parcel transaction characterization module of said controlled-access parcel repository for differentially characterizing a parcel transaction.

actuating a parcel-inventory and transaction-recording module for sensing a change in repository parcel inventory resulting from a repository parcel transaction.

In this way the transaction detection module may power-up other repository modules which may have been turned off or in a hibernating mode in the absence of a prospective parcel transaction (as a power conservation measure or to prepare such modules for use, in order to expedite the impending parcel transaction).

In an aspect of an exemplary arrangement a parcel transaction characterization module is comprised of a controller and sensor/actuator array for use with a controlled-access parcel repository, and including at least one automated sensor operable to facilitate at least one of package or item carrier identification sensing of a corresponding at least one of a possible package or possible carrier presenting at said repository, wherein said module differentiates sensed identification sensor input thereof to correspondingly:

facilitate an impending pre-authorized transaction corresponding to said identification; or, call for a real-time ad hoc user-mediated authorization for an impending transaction, and facilitate a call-responsive ad hoc user-mediated authorization for said impending transaction; or, decline (by default, in the absence of at least one of the two above mentioned "authorizations" to actively facilitate an otherwise unauthorized impending transaction).

Sensed identification sensor may be a controller and array associated camera (which may include a facial recognition facility) or scanner (e.g. bar code, or QR code or the like), a voice or other acoustic input recognition sensor, an RFID, Bluetooth or other parcel transaction identifier for input into said module to differentiate between and selectively facilitate the above operations.

In the instance of an impending pre-authorized transaction corresponding to said sensed identification input, this module may employ a controller/array associated communications module 3508 to signal specifics of the impending transaction to, for example, the repositories owner/user and/or the parcel carrier or carrier service.

In calling for a real-time ad hoc user-mediated authorization for an impending transaction the parcel transaction characterization module may actuate a communications module (which the controller includes or provides access to), to contact a user with a request for authorization of the impending parcel transaction—and subject to a user's authorizing response thereto, to facilitate the impending transaction as an authorized one.

In an instance of an identified pre-authorized transaction, or an instance wherein a real-time ad hoc user-mediated authorization is received in response to a call, the parcel transaction characterization module may signal a latching actuator, as elaborated below in relation to an accessibility control according to an aspect of an exemplary arrangement.

Where the module operates otherwise than in facilitating an authorized transaction, it may be operable to notify a user (e.g. through said communications module) of an unauthorized characterization status of the presumed parcel transaction.

In another aspect of an exemplary arrangement there is provided a parcel-inventory and transaction-recording module, for use with a controlled-access parcel repository including an at least one sensor for sensing a change in package inventory resulting from a repository parcel transaction.

Parcel sizes may be employed (scanned or otherwise sensed as for example by photo-detectors adapted to detect the presence of parcels through interruption of a light beam), or recorded images of the parcels may be stored for these purposes, but an exemplary operation senses parcel weights, by way of a weight (e.g. load) sensor that measures the accumulated parcel weight secured within the interior of the repository. The load or other inventory sensor communicates with a controller-associated memory to log changes in the sensed weight in association with changes in the parcel inventory. In an exemplary arrangement, such a memory correlates parcel transaction identifications with the particular weight change (and time for embodiments where the controller includes a clock facility for such a purpose) associated with the sensed change in the repository's parcel inventory.

In an exemplary arrangement, there is provided an accessibility control, for a controlled-access parcel repository, and comprised of at least one controller with a sensor/actuator array operable to selectively control access to said parcel repository, and comprised of at least one controller with a sensor/actuator array operable to facilitate controlled-access parcel transactions for at least one of parcel delivery or parcel extraction transactions in relation to said repository, and providing a parcel transaction characterization module for facilitating selective locking and unlocking operations of a repository lock actuator, in association with authorized parcel transactions characterized by said parcel transaction characterization module. A latching mechanism may be operated by an actuator through the controller operation by the parcel transaction characterization module.

The accessibility control may be used in association with any controlled access repository, including by way of example only, a building's vestibule, a parcel through-wall passage portal, a garage door, a storage shed, a chest or lock box or other such providing restricted access to an interior space serving to secure parcels reposing therein. Repositories of exemplary arrangements may, in addition to a secured access thereto, may also provide an unsecured access for facilitating parcel deliveries—see for example the provision of a one-way chute in the repository embodiment depicted in FIGS. 36 through 39, which may provide for delivery of parcels notwithstanding the authorization status associated with any given delivery. In such cases, the accessibility control may be used to selectively facilitate authorized access to restricted areas of the repository in question.

The accessibility control herein may further provide for at least one of the incipient transaction detection module or the parcel-inventory and transaction-recording modules mentioned elsewhere herein.

In general, including in conjunction with modules 3505-3507, communications module 3508 may be operated through controller 3505 to communicate sensor-related signals to parties variously involved in a parcel transaction; and to receive authorization and to control signals from such parties, to operate actuators associated with actuator array 3504. Cellular, Wi-Fi, land line, internet, or other communications channels may be employed in this connection. Other exemplary aspects of the controller and array features relating to an exemplary arrangement are disclosed in relation to the embodiments of FIGS. 40 through 44 described elsewhere herein.

Referring now also to FIGS. 36 through 39 there is illustrated various views of an example of a parcel repository related to aspects of exemplary arrangements.

In accordance with an aspect of an exemplary arrangement, there is provided a parcel repository comprising a free-standing parcel repository 3601, defining an enclosure comprised, in part, by a top panel 3602a adapted to cooperate with the enclosure's sides, back and bottom panel assembly 3602b, and a molded cabinet face frame 3602c.

This repository includes a one-way delivery chute 3603, providing an access portal for introduction and passage of a parcel delivery into said repository, but further including a gate for interfering with removal through that chute, of parcels secured within a secured storage bay portion of the repository. External portions of the chute which will be considered a door for purposes of this disclosure, include a delivery chute front panel 3603a, and a hinge 3603b for facilitating opening and closing of the panel as well as operation of the chute 3603 more generally.

This repository further includes a selectively securable (e.g. locked/unlocked) parcel storage bay 3604 having a hinged storage bay door hinge 3604a and a corresponding hinge 3604b to facilitate the opening and closing thereof. Storage bay 3604 corresponds to an interior area of the repository.

Hinges 3603b and 3604b are mounted on respective portions of a frame portion of the cabinet face 3602c.

This repository arrangement (by way of example) provides for two delivery modalities: one facilitated through one-way delivery chute 3603; and the other directly into storage bay 3604 through selectively secured hinged door 3604a. However, of these two distinct delivery modalities, only the hinged door 3604a is adapted to facilitate withdrawal of parcels from the storage bay 3604. This arrangement flexibly facilitates parcel deliveries to be made without necessarily requiring any particular pre-authorization or real-time authorization, but necessitates authorized access to storage bay 3604 in order to remove delivered parcels from the secured storage bay 3604.

Repository 3601 also provides for an inner-delivery chute front interior panel 3603c for supporting parcels for delivery during parcel introduction through delivery chute 3603 on its way into storage bay 3604. Chute 3603 is opened for a delivery transaction, by drawing a recessed handle 3603i forward and downwardly, rotating front panel 3603a and attached front interior panel 3603c outwardly together, around hinge 3603b. Pivot anchors 3603f (secured to front interior panel 3603c), in turn draw outwardly and downwardly through pivot pins 3603k, pulling tray 3603h to rotate by the pivot pins 3603k which are connected to connecting arms 3603e to anchor 3603j on the tray. Tray 3603h rotates in response to this action, around tray pivots 3603g that connect tray 3603h to enclosure side and back and bottom panel assembly 3602b—and into a position that provides a generally coplanar delivery chute surface alignment with front interior panel 3603c. That co-planar alignment facilitates the transfer of a parcel from the panel 3603c onto the receiving surface 3603d of tray 3603h.

With a parcel positioned on the receiving surface 3603d of tray 3603h, the return of front panel 3603a towards its upright and ultimately re-closed position, rotates tray 3603h from the coplanar alignment mentioned above, into an inclined orientation, which induces the parcel to slide along and ultimately off of supporting tray 3603h, to release the parcel into the repository's interior area, where delivered parcels accumulate in storage bay 3604, in supported relation on parcel repository bay floor 3608.

In the illustrated embodiment, parcel delivery transactions made through the chute are not restricted by the operation of the accessibility control.

Parcel bay floor 3608 is connected with a load sensor 3607, which is operable to sense increases/decreases in the accumulated weight of delivered parcels stored within storage bay 3604 on bay floor 3608, as parcels are added by delivery transactions, or removed during pickup transactions to and from repository 3601.

Controller 3609 is connected to an array of sensors and actuators, including latch actuator 3604c an acoustic transducer 3610, an on-board camera/scanner (not shown), and load sensor 3607. Controller 3609 also includes a power management connection for selectively powering the repository operations using a utility line voltage source (not shown) or battery power from battery 3606, or other power sources (not shown, but including by way of example, solar panels). The exemplary controller 3609 is also in operative connection with a wireless antenna 3605 to provide wireless communications.

The on-board camera provides for video and/or still pictures, as well as for bar-code/QR-code scan sensing. The acoustic transducer 3610 provides for audio signaling, and optionally for audio pick-up (sound sensing). Load sensor 3607 senses weight changes reflecting changes in parcel inventory secured within repository 3601 interior area—and may further associate weight changes with particular parcel transactions. Latch actuator 3604c facilitates locking and unlocking operations of door 3604a to provide selective access to storage bay 3604.

Referring now to FIGS. 40 through 44, there are illustrated examples of aspects of exemplary arrangements relating to a delivery lock box (i.e. repository) controller (or controller module) for operating a delivery lock box, and comprises a controller operable for controlling lock box peripherals of arrays thereof to provide discrete modular functionalities variously related to unattended-delivery lock box convenience as well as operational and forensic security, but more particularly to providing combinations of modular functions variously cooperating for providing augmented, and in some embodiments, real-time remote user interface access for such operational/forensic security. In accordance with an exemplary arrangement there is provided discrete modular functionalities variously related to unattended-delivery lock box convenience as well as operational and forensic security, as well as providing combinations of modular functions cooperating variously for providing augmented, and in some embodiments, real-time remote user interface access for such operational/forensic security. More particularly, exemplary arrangements include a (e.g. package) delivery lock box controller module for operating a delivery lock box having a controller operable for controlling lock box peripherals including one or more of: a lock box communications module; a camera and image recording module; a proximity detection sensor module; a lock box motion/shock detection sensor module; and/or a remote lock actuator module.

The lock box communications module is adapted to facilitate RF (radio frequency) communication of lock box peripherals data to a lock box user, and may additionally variously facilitate lock box peripheral control by the user.

The camera and image recording module is adapted to be selectively operable for pre-determinedly capturing and recording at least one image of at least a portion of the lock boxes surroundings. In an aspect of the present arrangement, the camera may also serve a scanner/reader function.

The proximity detection sensor module may serve in the detection of a triggering presence within a range proximal to the lock box and signaling (buzzer or other acoustical device, or RF e.g. through the lock box communications module) a proximity notification of such presence.

The lock box motion/shock detection sensor module, operable for detecting a triggering lock box motion or shock and signaling (buzzer or other acoustic or illumination device, or RF signaling e.g. through the lock box communications module) a motion/shock detection notification.

The remote lock actuator module is operable by an authorized remote user to operate the lock actuator module's lock actuator.

A controller module in the context of exemplary arrangements can be, for example, a chip, an expansion card, or a stand-alone device that interfaces with one or more peripheral devices. Preferably, the controller module comprises a single board implementation comprising a central processing unit (processor) that processes data, memory that holds the programs and data to be processed (although memory may alternatively be located off-board), and I/O (input/output) devices as interfaces that communicate with diverse peripheral devices.

Figure 40:
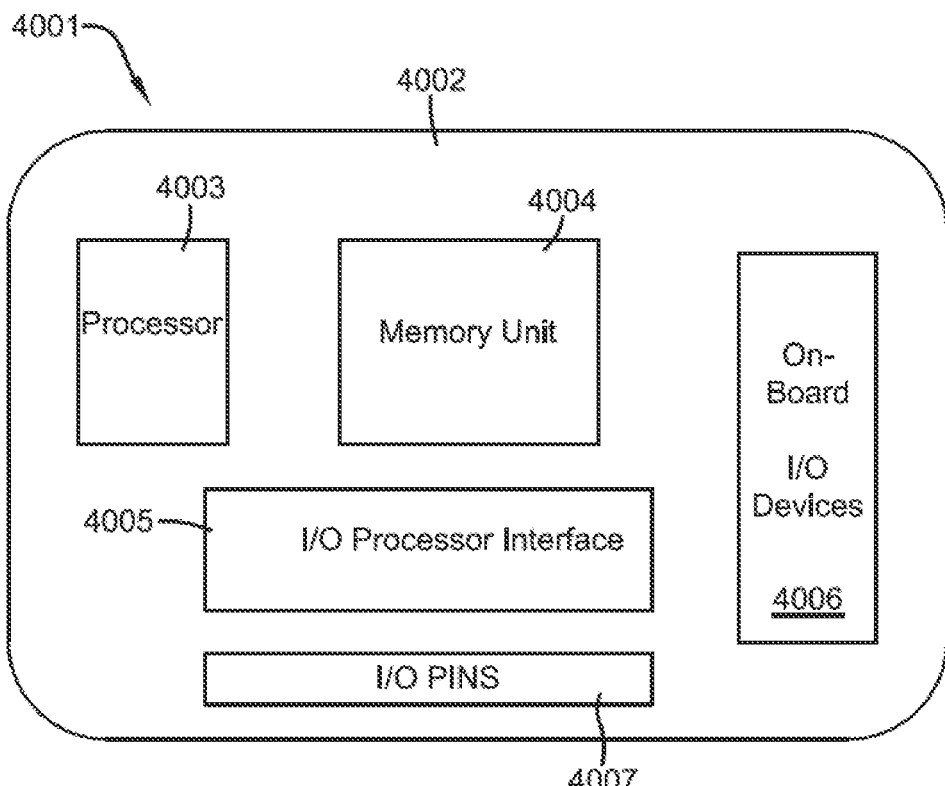
FIG. 40 is a block diagram representation of a controller board according to an exemplary arrangement.

FIG. 40 schematically depicts an embodiment of a control module 4001 according to an exemplary arrangement, comprising a printed circuit board 4002, a processor 4003, a memory 4004, an I/O processor interface 4005, and on-board I/O devices 4006 and I/O pin socket 4007 for connection to off-board I/O devices (not shown).

In accordance with the exemplary arrangement, computer buses of one form or another facilitate data transactions between the processor, memory and these peripherals.

Figure 41:
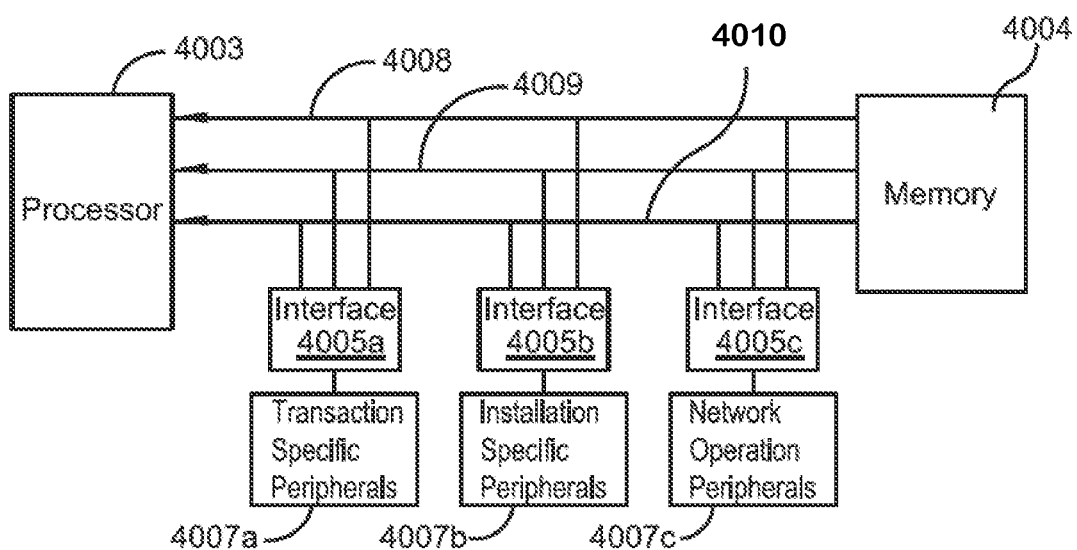
FIG. 41 is a diagrammatic representation of a controller board processor/memory and peripherals interface.

Referring now to FIG. 41, a block schematic representation is provided to illustrate a generalized relationship between processor 4003, memory 4004, and a plurality of interface devices 4005*a*, 4005*b* and 4005*c* associated with respective peripherals 4007*a*, 4007*b* and 4007*c*. Memory bus 4008, address bus 4009 and control bus 4010 are also illustrated in an intermediary relationship with the processor 4003 and the interface devices 4005*a*-*c*.

The control bus is used by the processor for communicating with other devices, while the address bus carries the information about the device with which the processor is communicating and the data bus carries the actual data being processed, and the control bus carries commands from the processor and returns status signals from the devices. Where an address bus is used to specify a physical address—such that when a processor or direct memory access (DMA) enabled device needs to read or write to a memory location, the address bus specifies that memory location on the address bus, but the data value to be read or written to or from that address, is sent on the data bus. The memory bus typically connects the main memory to the memory controller and is often designed to connect directly to DRAM chips.

Figure 42:
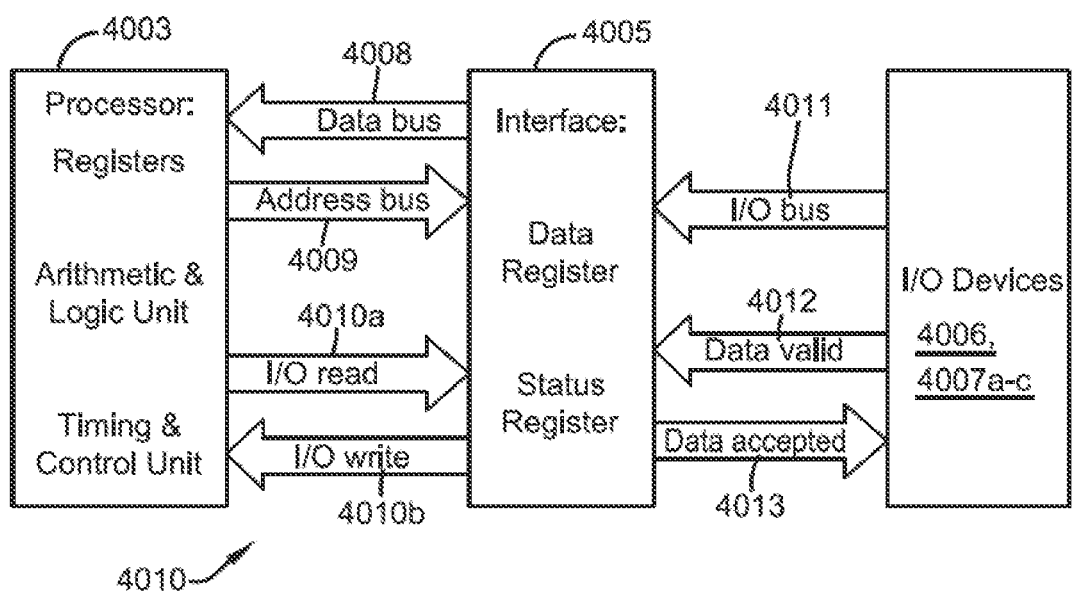
FIG. 42 is a block diagram representation of control, data, and address messaging between a processor, a peripherals interface and peripheral I/O devices.

Referring now to FIG. 42 there is depicted a function block diagram depicting processor 4003 interactions with interface 4005, through the data bus 4008, the address bus 4009, and in the case of the control bus 4010 as I/O read and I/O write transactions 4010*a* and 4010*b*, respectively. Interface 4005 in turn, transacts with I/O devices such as devices 4006 or peripherals 4007*a*-*c*, through an I/O bus 4011 including data validation and acceptance transactions 4012 and 4013, respectively.

Figure 43:
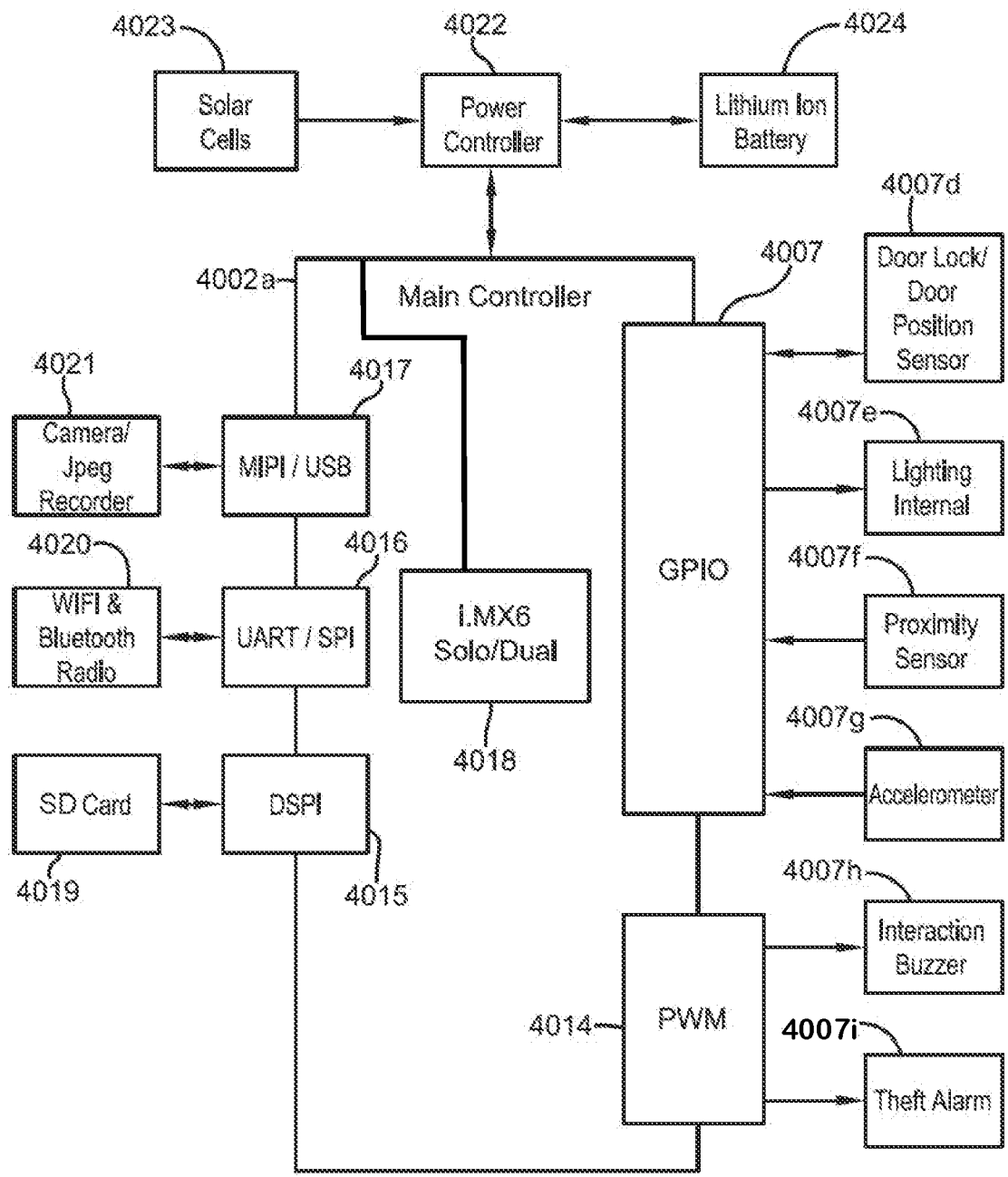
FIG. 43 is a block diagram of a controller board according to an exemplary arrangement, showing various peripherals, interface bus examples, power supply and a number of examples of peripherals.

Referring now to FIG. 43, an exemplary embodiment of the controller module is illustrated. A main controller board 4002*a*, includes a general purpose I/O pin socket 4007, servicing: door lock/position sensors 4007*d*, for lock and door position sensors associated with a delivery lock box locker door(s); internal lighting control 4007*e*; external proximity sensor(s) 4007*f*; and, a motion detector (accelerometer) 4007*g*.

Controller board 4002*a* further includes a PWM (pulse width modulation) output 4014 for controlling analog circuits with a microprocessor's digital outputs—in this instance, a transaction interaction buzzer 4007*h* and a theft alarm 4007*i*.

Also provided on controller board 4002*a*, is a DSPI serial interface connection 4015 which is a fully configurable SPI master/slave device, facilitating the microcontroller's communication with serial peripheral devices—in this case an SD memory card 4019.

Controller board 4002*a* also provides for a universal asynchronous receiver/transmitter (UART) to serial peripheral interface (SPI) interface connection 4016, which is used for communication between SPI slave devices (from a processor) and a UART port—in this instance providing for a Wi-Fi/Bluetooth radio peripheral 4020.

MIPI/USB interface connector 4017 enables USB connectivity to any image sensor which is compliant with Mobile Industry Processor Interface (MIPI) Camera Serial Interface standard—connected in this case to camera/jpeg encoder 4021.

Controller board 4002*a* also supports an i.MX6 processor 4018. Processor 4018 facilitates high-performance scalable multimedia processing, and includes integrated power management based on an ARM Cortex-A9 processor supporting HD 1080p encode and decode operation and having integrated I/O for MIPI CSI-2 camera, Gigabit Ethernet, multiple USB and PCI I/O. Power management is facilitated in conjunction with processor 4018, by way of power controller 4022, to control a hybrid power system based on solar cells 4023 and lithium batteries 4024.

Figure 44:
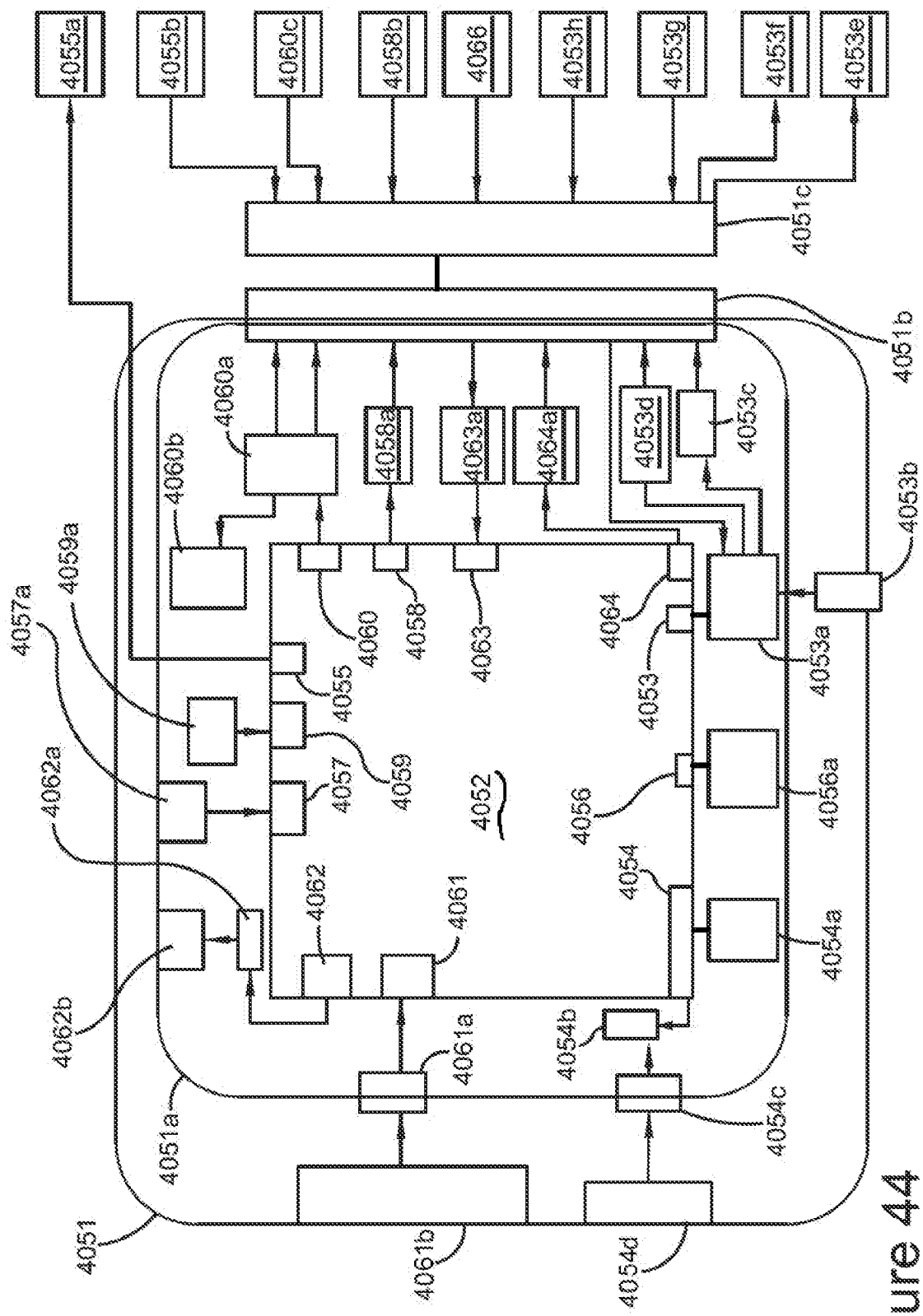
FIG. 44 is a detailed layout of an exemplary embodiment showing a controller board with connections to various peripherals, a connection to a delivery lock box and its associated peripherals.
Figure 45:
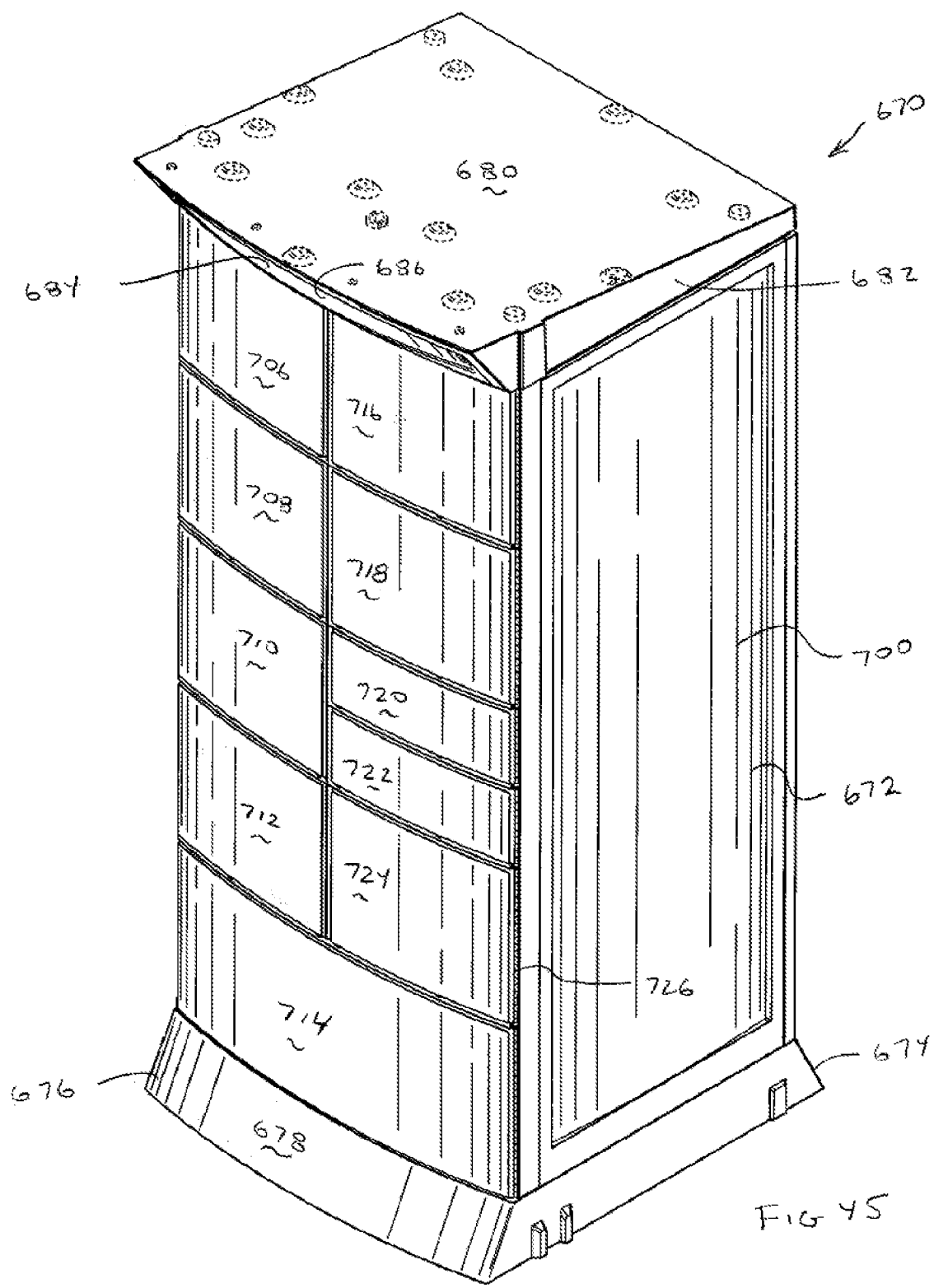
FIGS. 45 through 48 are views of an alternative item repository including a plurality of selectively accessible interior areas for housing delivery items.
Figure 46:
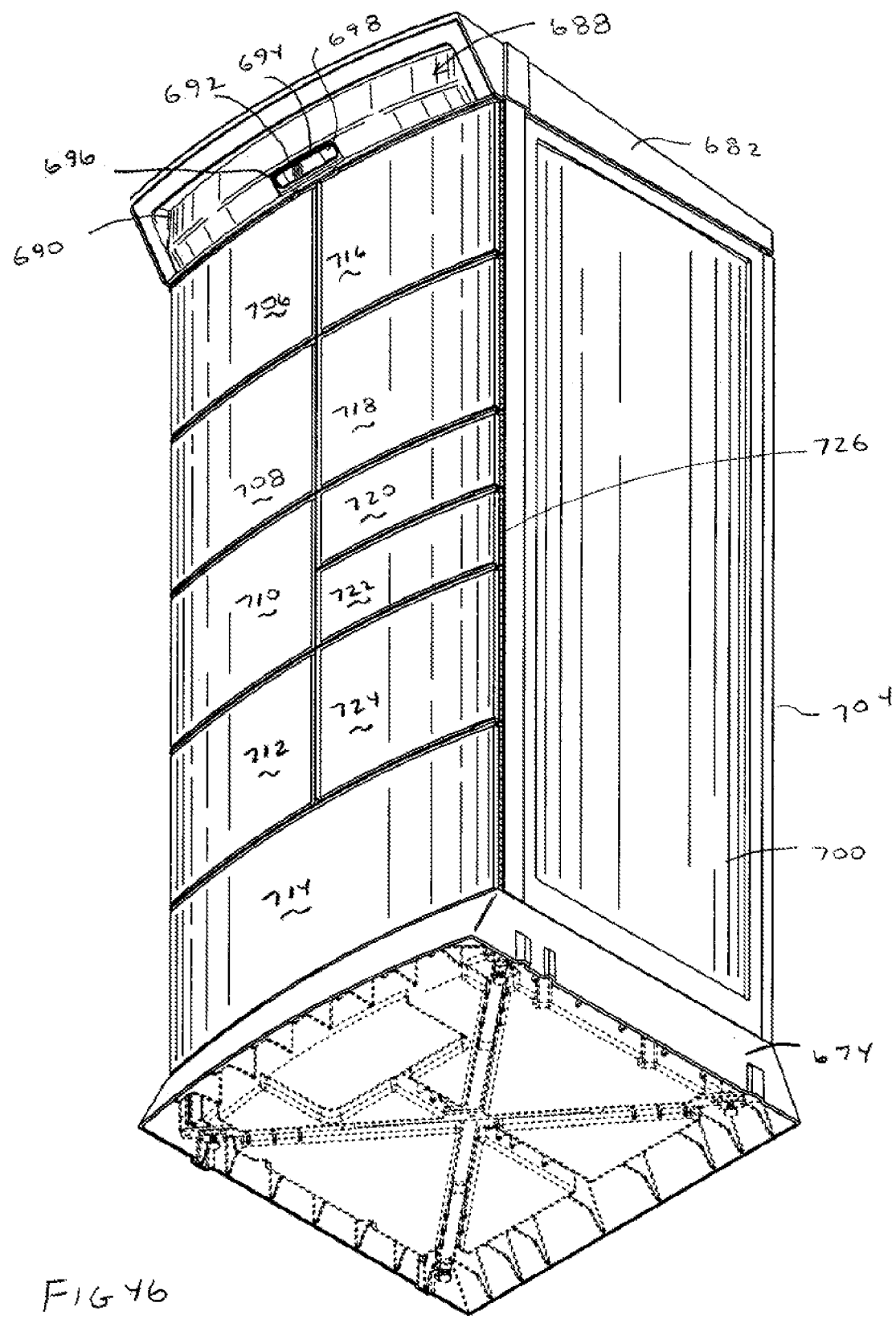
Figure 47:
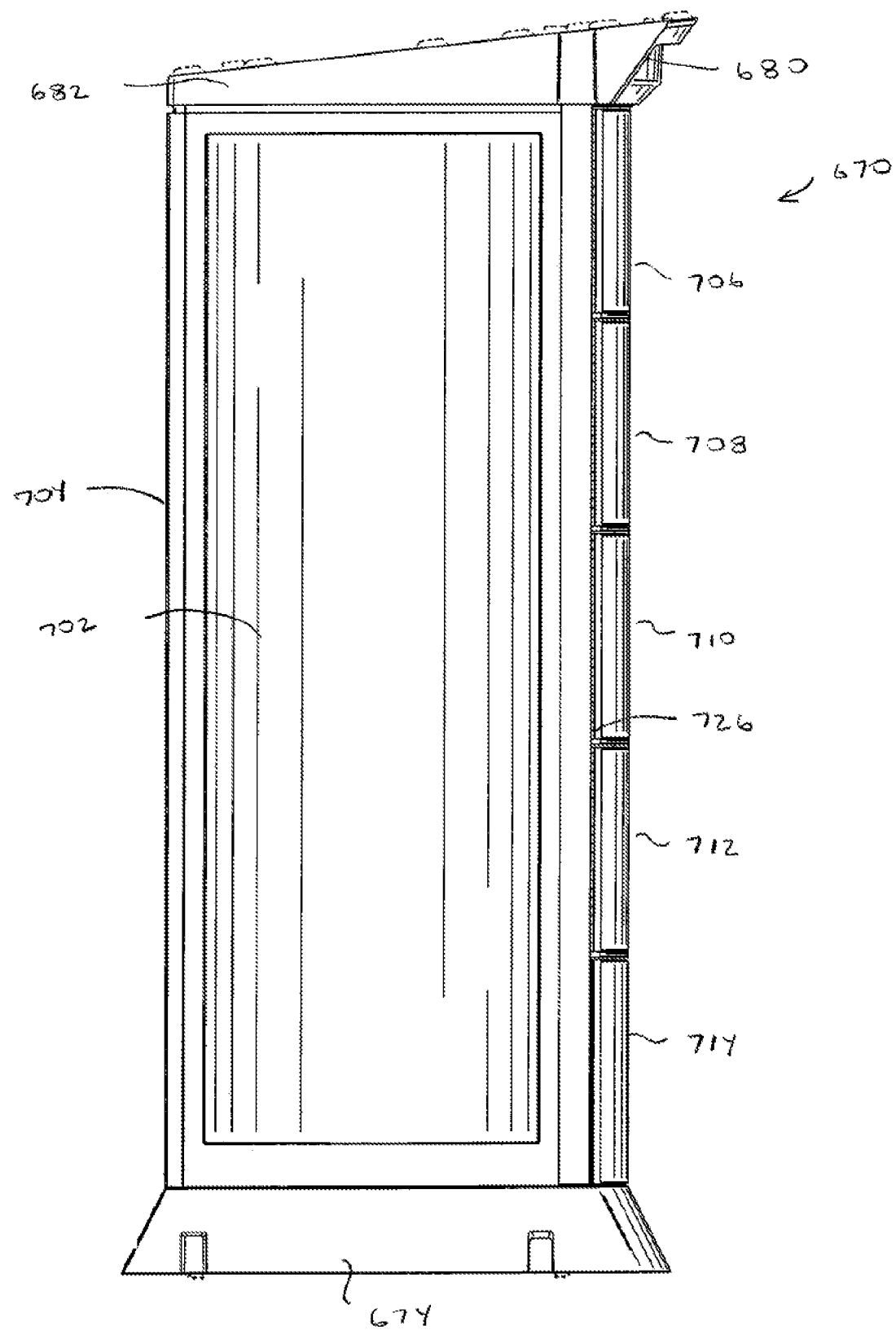
Figure 48:
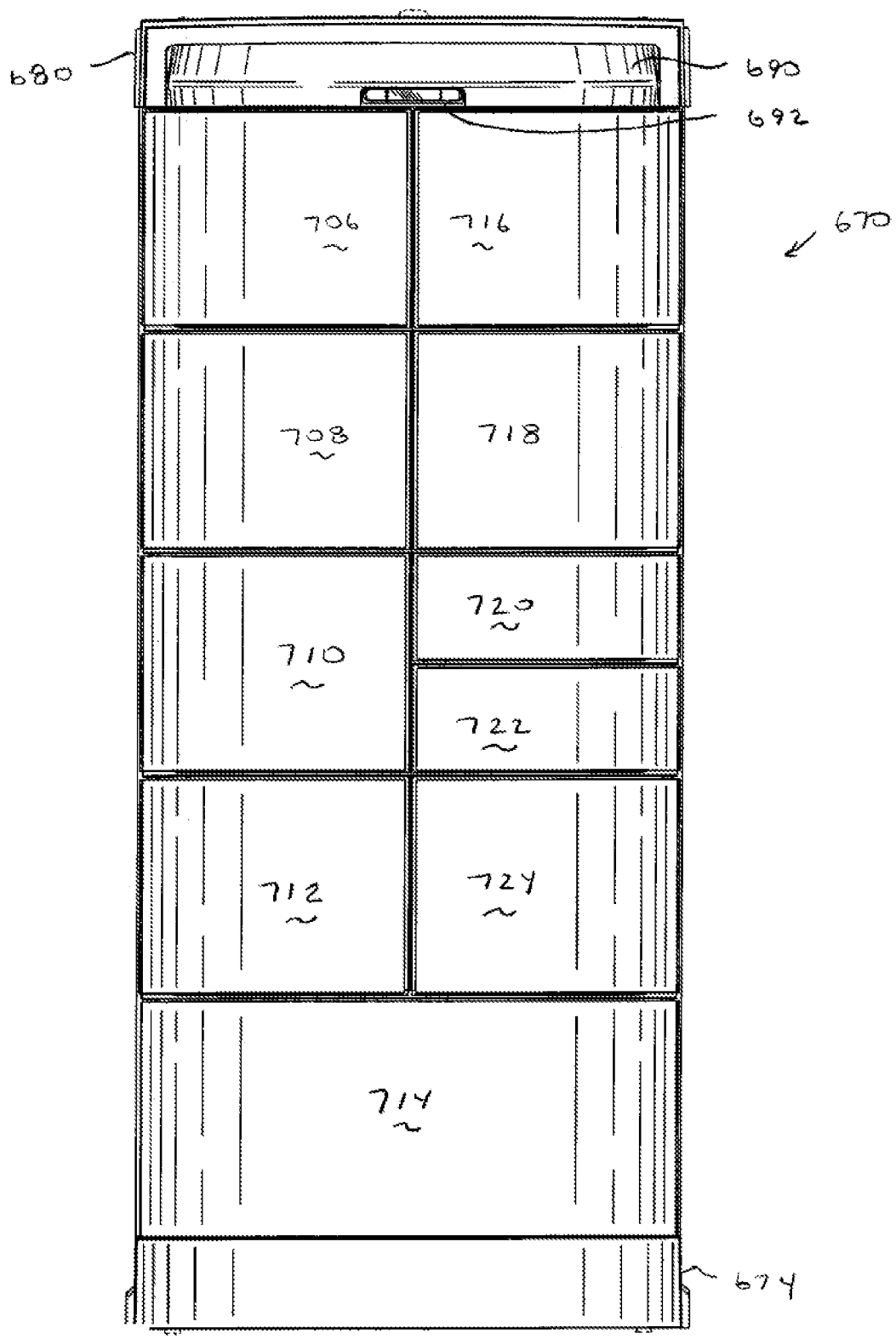

Referring now to FIG. 44, an alternative embodiment depicting a controller board housing 4051, housing a controller board 4051*a*. Controller board 4051*a* can be designed to support a generic application processor, however, processor 4052 in this depicted embodiment is a PICO-IMX6 including an ARM Cortex-A9 NXP i.MX6, Small Footprint, System-on-Module (SoM) having Wi-Fi 802.11ac and Bluetooth v. 4.1 communication interfaces providing a compact form factor optimized for free-standing applications with IoT connectedness. Alternative embodiments may employ other processors, such as ARM core processors, or ARM Cortex processors, such as for example, a Qualcomm Snapdragon 410e which is an ARM Cortex A53 processor.

Processor 4052 provides I$^2$C bus connections 4053, 4054 and 4055. The I$^2$C bus is a serial, half-duplex—I$^2$C (Inter-Integrated Circuit), synchronous, multi-master, multi-slave, packet switched, single-ended, serial computer bus for attaching lower-speed peripheral ICs to processors and microcontrollers in short-distance, intra-board communications.

Connection 4053 is connected to GPIO expanders 4053*a* which are TCA5416A I/O expanders for the two-line bidirectional (I$^2$C) bus and are designed to provide general remote I/O expansion through the I$^2$C interface. Expanders 4053*a* are in turn connected to a Bluetooth Wi-Fi pairing button 4043*b*; an FET switch 4053*c* which is adapted to be connected through enclosure 4051 to a connector 4051*b* and corresponding delivery lock box connector 4051*c*, to delivery lock box external LED lights 4053*e*; an FET switch 4053*d* which is adapted to be connected through connectors 4051*b* and 4051*c*, to delivery lock box door locks actuators 4053*f*; and through connectors 4051*b* and 40451*c* to delivery lock box open door sensors (door "open" contact) 4053*g*. Connector 4053*h* connects to delivery lock box internal LED lighting, and is co-operable with sensors 4053*g*.

Connection 4054 supports both an accelerometer 4054*a* and a motion detection module 4054*b*.

Accelerometer 4054*a* is provided by an LSM303 breakout board which combines a magnetometer/compass module with a triple-axis accelerometer in a compact navigation subsystem, and its two pin I$^2$C interface can be shared by other I$^2$C devices, in this case including module 4054*b*.

Motion detection module 4054*b* provides a motion sensor connection using an LTC2451 16-bit, analog-to-digital converter which also communicates through the I$^2$C interface 4054. It includes an integrated oscillator that does not require any external components and employs a delta-sigma modulator as a converter core and provides single-cycle settling time for multiplexed applications. The LTC2451 includes an input sampling scheme that reduces the average input sampling current several orders of magnitude lower than conventional $\Delta\Sigma$ converters. The LTC2451 is capable of up to 60 conversions per second and, due to the very large oversampling ratio, has extremely relaxed antialiasing requirements. It connects through pin connector 4054*c* to motion sensor 4054*d*.

Connection 4055 connects processor 4052 to a separate, delivery lock box fuel gauge circuit board 4055*a* carrying an LTC2943 module which measures battery charge state, battery voltage, battery current for battery bank 4055*b*, as well as its own temperature in standalone applications. A precision coulomb counter integrates current through a sensing resistor between the battery's positive terminal and the load or charger. Voltage, current and temperature are measured with an internal 14-bit No Latency $\Delta\Sigma$™ ADC and the measurements are stored in internal registers accessible via the onboard I²C/SMBus Interface. The LTC2943 is programmable for setting high and low thresholds for all four measured quantities. If a programmed threshold is exceeded, the device communicates an alert by setting a flag in the internal status register. The LTC2943 requires only a single low value sensing resistor to set the measured current range.

Processor 4052 further includes a PWM (pulse width modulation) output 4056 for controlling analog circuits with a microprocessor's digital outputs—in this instance, a buzzer speaker or other audio transducer 4056a. An SD card connector 4057 and a Wi-Fi Bluetooth connector 4058 are also provided. Bluetooth connector 4058 is connected to an active antenna power module 4058a. Connector 4058b provides for the connection of a Wi-Fi/Bluetooth antenna.

The SD card connector 4057 is interconnected with an SD card slot 4057a, mounted on controller board 4051a. An SD card (Secure Digital Card), not shown, is inserted into slot 4057a to provide reliable data storage in a small form factor for, inter alia, digital camera images, etc. SD cards contain an internal controller interface that handles all internal flash memory operations and data transfer between the processor 4052 and the card is done in 512 byte block, clock serial mode—using a selected one of two bus protocols defined for SD cards, (the default native SD mode or a slower SPI mode).

Processor 4052 also provides for a UART connection 4059, communicating with a Debug TTL UART 4059a.

GPIO connection 4060 on processor 4052, supports an LT3651 automatic lithium ion battery charger circuit 4060a which functions as a solar charge controller (in conjunction with power supply module 4060b), charge regulator and battery regulator to limit the rate at which electric current is added to or drawn from battery bank 4055b electric batteries. Circuit 4060a prevents overcharging and may protect against overvoltage, which can reduce battery performance or lifespan, and may pose a safety risk. It may also prevent completely draining ("deep discharging") a battery, or perform controlled discharges, depending on the battery technology, to protect battery life. Connector 4060c provides for the connection of solar panels or external DC power supplies.

Processor 4052 provides a camera Serial Interface (CSI) 4061 conforming to MIPI Alliance specifications that provide for an interface between a camera and host processor 4052. Interface 4061 connects to a MIPI connection 4061a which in turn is connected to an OV5645 high performance, 5-megapixel system-on-chip (SOC) 4061b. This sensor's single MIPI port replaces both a bandwidth-limited DVP interface and a costly embedded JPEG compressor, with attendant savings on silicon footprint and cost.

USB host connector 4062 connects to a USB to SATA bridge 4062a. Bridge 4062a is a TUSB9261 ARM® Cortex® M3 microcontroller based USB 3.0 to serial ATA bridge. It provides the necessary hardware and firmware to implement a USB attached SCSI protocol (UASP)-compliant mass storage device suitable for bridging hard disk drives (HDD), solid state disk drives (SSD), optical drives, and other compatible SATA 1.5-Gbps or SATA 3.0-Gbps devices to a USB 3.0 bus. Bridge 4062a connects in turn to SATA/PWR connector 4062b.

Serial Peripheral Interface bus (SPI) is a synchronous serial communication interface 4063a for connecting to an analog to digital converter 4063a. Converter 4063a is an ADS1148 device providing 16-bit analog-to-digital converter that includes many integrated features to reduce system cost and component count for sensor measurement applications—including a low-noise, programmable gain amplifier (PGA), a precision delta-sigma (ΔΣ) ADC with a single-cycle settling digital filter, and an internal oscillator and a built-in, low-drift voltage reference, and two matched programmable excitation current sources (IDACs).

GPIO interface 4064 connects though FET switches 4064a to control LED lights connected through connectors 4053e and 4053h.

Referring now to the drawings in general: One aspect of an exemplary arrangement provides for a delivery lock box controller module, housed for example in a housing 4051, and adapted for operating a delivery lock box (not shown). This aspect of the exemplary arrangement comprises a controller (such as controller board 4051a and processor 4052), that is operable for controlling lock box peripherals. In particular, the module according to this aspect of the exemplary arrangement provides for a remote lock actuator module that is operable by an authorized remote user. The remote lock actuator module comprises processor 4052 and I²C bus connection 4053, GPIO expanders 4053a, FET switch 4053d and enclosure connector 4051b. With enclosure connector 4051b engaged with delivery lock box connector 4051c, processor 4052 may be instructed by an authorized user, to operate lock box door lock actuators 4053f to in turn permit access to the lock box interior and thereby facilitate introduction or removal of lock box contents. Preferably, the operation of the lock box door lock actuators 4053f is attended by the operation of lock box external LED lights 4053e by processor 4052 acting across the connection of connectors 4051b and 4051c, and by way of FET switch 4053c, GPIO expanders 4053a and I²C bus connection 4053 of processor 4052. This arrangement can draw a delivery agent's attention to the lock box and aid in the delivery agent's completion of the user-authorized lock box transaction. This can be important since it is often desirable for the lock box installation to be discretely placed, and/or to have it fit unobtrusively into the local decor. Note too, however, that external LED lights 4053e can be operated by processor 4052 independently of the operation of door lock actuators 4053f. This facility for independent operation of external LED lights 4053e permits them to be used simply as a local source of augmented lighting; or as a flashing light source in the case of an emergency or security threat without occasioning the concurrent release of the locks. Moreover lock box internal LED operation through connector 4053h is also independent of the operation of external LED lights 4053e, and operate instead in cooperation with open door sensor 4053g with its connections through connectors 4051b and 4051c, GPIO expanders 4053a, I²C bus connections 4053 to processor 4052. This represents a power saving in circumstances where illumination of the lock box interior is not required and is an important consideration for lock box installations that function without recourse to the electrical grid.

The lock box controller module comprising controller board 4051a and processor 4052 may make provision for a camera and image recording module—as for example by way of camera 40461b, MIPI interface 4061a, and camera serial interface 4061. This arrangement is preferably selectively operable to (optionally pre-determinedly) capture and record at least one image of at least a portion of said lock boxes surroundings. The recording may be captured using an off-board storage drive, using USB host connector 4062, USB to SATA bridge 4062a, and USB host connector 4062b, under the direction of processor 4052. Alternatively, the recording may be captured on an SD card (not shown) using SD card connector 4057 and SSD card slot 4057*a*. An authorized user may trigger processor 4052 to activate the camera and/or the recorder to selectively capture images. In one embodiment processor 4052 operates camera 4061*b* more or less continuously, and records captured images on a memory device as mentioned above, but in a short term first-in-first out over-writing buffer file. Subject then to the occurrence of a pre-determined triggering event, the buffer file is transferred to an archive file, preserving images recorded in advance of the triggering event and appending recordings of images subsequently captured and recorded to the archive file, for a predetermined time or condition. Thereafter, the camera 4061*b* reverts to said more or less continuous operation and recording later images into the over-write buffer as aforesaid.

The lock box controller module comprising controller board 4051*a* and processor 4052 may also make provision for a proximity detection sensor module comprising motion sensor 4054*d*, pin connector 4054*c*, motion detection module 4054*b* and I$^2$C bus connection 4054 for detecting a triggering presence within a range proximal to the lock box, and signaling (e.g. by but not limited to a buzzer or other acoustical device, or flashing external LEDs as mentioned above), a proximity notification of such presence. This signaling may aid in directing legitimate approaches to the lock box, or deter illegitimate interest, and in either case, place the authorized user on alert to the motion in proximity to the lock box.

Similarly, the lock box controller module comprising controller board 4051*a* and processor 4052 may also make provision, through accelerometer 4054*a* and I$^2$C bus connection 4054, for a lock box motion/shock detection sensor module, operable for detecting a triggering lock box motion or shock and signaling (again, for example, via buzzer or other acoustic or illumination device) a motion/shock detection notification to the user. Preferably, this notification is of a loud and insistent character that will assertively deter any attendant theft attempt or vandalism.

In an exemplary embodiment, the controller board 4051*a* and processor 4052 provide for a lock box communications module, in this case by way of a System-on-Module (SoM) having built in Wi-Fi 802.11ac and Bluetooth v. 4.1 radios and communication interfaces providing a compact form factor optimized for free-standing applications with local RF networks as well as providing for IoT (internet of things) connectedness. Processor 4052 is thereby adapted to facilitate RF communication of lock box peripherals data to a lock box user—using in this particular case, SPI connector 4063, A/D converter 4063*a* as well as Bluetooth connector 4058 and active antenna power module 4058*a* with its connections through connectors 4051*b* and 4051*c* to antenna 4058*b*. In operation, control module 4001 with a communications module (e.g., associated with processor 4052 as per the above) comprises a lock box Bluetooth/Wi-Fi communications module which provides for Bluetooth-mediated configuration of Wi-Fi network connections between the lock box communications module and an available (e.g., local) user-selected Wi-Fi network. More particularly, the Bluetooth facility may be operable to link with a user phone and in turn enable a user phone to connect/configure the lockbox to a user selected local Wi-Fi network.

Controller module 4001 may also be operable such that a "proximity notification" includes remotely communicating a "detected presence" to a user's communication device (or some other user proxy), through the communications module. (Note that in general, communications to the user device are typically mediated via Wi-Fi or other local RF networks as well as through cellular, internet, landlines, microwave and all the various modems/gateways or the like that may be variously associated with those networks). In an exemplary embodiment, for example, the control module 4001 further comprises a cellular data modem (not shown) operable to provide an alternative user notification to a user in the event that Wi-Fi functionality is not used or not available for this purpose.

Similarly, controller module 4001 may be operable to convey motion/shock detection notifications by remotely communicating a detected motion/shock notification to a user's communication device, substantially as described in the preceding paragraph.

The operation of the exemplary camera and image recording module is selectively predetermined to provide continuous operation and recording and this is facilitated by one or both of an on-board recording storage or to Wi-Fi connected storage. (Either or both such storage facilities can be FIFO (first-in-first out) over write in order to facilitate currency of recordings in the absence of unlimited storage capacity). Controller module 4001 may also be employed such that the camera and image recording module is additionally or alternatively selectively predetermined to be intermittently operated—subject, for example, to a detected-event-triggered operation. In one exemplary arrangement for example, controller module 4001 may be operable such that a proximity notification comprises triggering the camera and image recording module to record and/or communicate to a user's communication device (or user proxy), that at least one image associated with the proximity notification. Similarly, the control module 4001 may be operated such that the motion/shock detection notification comprises triggering said camera and image recording module to record and/or communicate to a user's communication device (or user proxy), of an at least one image associated with the motion/shock detection. In an exemplary arrangement, the intermittent operation of the camera and image recording module is coextensive with ongoing detection of a detected trigger event.

In exemplary embodiments where the control module 4001 operates image storage as a first-in-first out overwrite storage buffer, the camera and image recording module is further operable in response to a detected trigger event, to save the associated at least one image from the first-in-first out overwrite storage buffer to a long term storage archival location, and preferably so that when a detected trigger event so operates the camera and image recording module, that module saves associated images from the buffer, beginning from a predetermined time preceding detection of the detected event. Moreover, in an exemplary arrangement when a detected trigger event so operates the camera and image recording module, it is operated so as to save associated images for a predetermined time following termination of detection of the detected event.

In the depicted exemplary embodiment control module 4001 is further operable to manage a hybrid power source power supply module 4060*b* provided from a primary power source selected from at least one of a solar power source and a line power source; and, a secondary battery power reserve source (battery bank supply 4055*b*), with the hybrid power source being operable to variously power the delivery lock box operations, and employs delivery box fuel gauge circuit board 4055*a* in that connection. The control module 4001 also operates power supply module 4060*b*, using battery charger circuit 4060*a* to charge the secondary (battery bank 4055*b*) source from the primary source(s).

The control module 4001 may further comprise a cellular data modem to provide an alternative user notification to a user, (collateral with Wi-Fi functions, or as an alternative if Wi-Fi is not available).

In an aspect of an exemplary arrangement, there is also provided a weigh scale peripheral connection 4066. The connection to processor 4052 can be variously facilitated—e.g., through a general input output interface. The weigh scale peripheral may be used to signal the arrival/presence of a package within a repository enclosure—and also in conjunction with the parcel inventory module, to track arrival and withdrawal of one or more parcels from the parcel inventory secured within the repository.

FIGS. 45-48 show an alternative arrangement of a delivery item repository 670. Repository 670 is configured to be utilized in a system which includes a plurality of repositories of the same or similar configuration, such as one of the repository configurations previously discussed herein. The exemplary system is usable to transport delivery items which are also referred to as parcels, from a respective originating repository to a respective destination repository so as to achieve transport of the parcel from one geographic location to another. Exemplary arrangements may facilitate small-scale parcel delivery operations in which item carriers exchange parcels through controlled transfers which occur through intermediate destination repositories under the control of one or more servers or other central system circuitry in a manner like that previously discussed.

The exemplary systems facilitate the use of crowd sourced item carrier participation. Such item carriers may operate to transport parcels between originating repositories and destination repositories. In other exemplary arrangements item carriers may further operate to carry out pickup and delivery activities at points of parcel shipment origination or endpoints of parcel transport that do not include repositories. Exemplary arrangements may provide for a parcel delivery system which is configured to transport parcels that are provided from and delivered to diverse locations and at different times by a plurality of different shipper and recipient system user types.

In exemplary arrangements the system may include a plurality of geographically dispersed repositories such as repository 670. Repository 670 includes a body having a plurality of separated compartment interior areas each of which bound a respective enclosed compartment space that is suitable for holding one or more parcels. Each of the interior areas is selectively accessible by authorized users who are enabled to unlock compartment associated locks and open closure members such as respective doors that are movable to provide access to respective compartment interior areas. Each respective repository may be operated as an originating repository as well as an intermediate or final destination repository. Thus the exemplary system provides for a fully connected physical topography of repositories.

In exemplary arrangements each of the plurality of repositories is in operative connection with central system circuitry like that previously discussed which is alternatively referred to herein as control circuitry. The exemplary central system circuitry operates as a control grid to manage item carrier authorizations and assignments. The central system circuitry also performs monitoring of the pickups of parcels from originating repositories and the delivery of parcels into the destination repositories. Further in exemplary arrangements the monitoring functions of the central system circuitry may operate to assure that parcel items are delivered in accordance with required schedules and/or other handling requirements that may be associated with particular parcels.

Further in exemplary arrangements the central system circuitry which controls the acceptance, transport and delivery of parcels, provides useful aspects compared to other parcel distribution methods. This is achieved in some arrangements due to the handling, transport and sorting of a relatively small number of parcels by each authorized shipping user and item carrier user of the system. For example in exemplary arrangements, each item carrier will generally be involved in handling less than 10 parcels simultaneously at any given time.

The use of crowd sourced item carriers receiving parcels from originating depositories and transporting parcels through intermediate destination repositories, facilitates the transport and delivery of parcels. As item carriers act to provide parcel transport generally in coordination with their other activities such as commuting or other travel, the ability to move parcels to a final destination repository is facilitated even though item carriers may only be willing to carry parcels a portion of the overall parcel transport path. Further the exemplary arrangements provide for item carrier compensation for transport of parcels, which compensation may be readily obtained by the item carrier in connection with their normal commuting or travel activities The exemplary parcel repository 670 shown in FIGS. 45-48 is configured to operate as a free standing device and perform the functions associated with an originating depository and a destination repository concurrently for a plurality of parcels. The exemplary repository 670 includes a body which is alternatively referred to herein as a housing 672. The housing is supported on a base 674. The base 674 includes a forward extending portion 676. The forward extending portion of the exemplary arrangement includes a front to rearward upwardly sloped face 678.

The exemplary repository housing 672 further includes a top or cap 680. The exemplary top includes a roof panel 682. Roof panel 682 is sloped downward from front to rear of the housing 672. The top 680 further includes a forward extending cornice 684. Cornice 684 extends forward beyond the front of the central position of the housing 672. Cornice 684 has a sloped face 686 that is sloped toward the rear of the housing further downward along the face 686.

The exemplary face 686 includes a recess 688. Recess 688 includes a lens 690. The exemplary lens 690 is translucent to enable illumination of the front of the housing by one or more lamps that are positioned within the housing. The cornice 684 further includes a port or opening 692 therein. An electronics housing 694 extends in the opening 692. The electronics housing 694 is configured to hold control circuitry 696 which may be of the type previously discussed, as well as at least one sensor or input device 698 such as a camera or scanner and a wireless portal.

The exemplary housing 672 includes a pair of side panels 700, 702 and a back panel 704. Panels 700, 702 and 704 bound a partitioned housing interior that includes a plurality of separated interior areas. Locker doors 706, 708, 710, 712 714, 716, 718, 720, 722 and 724 are each movably mounted in operative supported connection with the housing 762 through respective hinges 726. Each of the locker doors selectively controls access to a respective interior area within the housing 672. In the exemplary arrangement each of the doors is changeable between a locked condition and an unlocked condition responsive to a respective electrically actuated lock in a manner similar to that used in the previously described repository arrangements.

The exemplary repository 670 is in operative connection with control circuitry which may function in a manner similar to that described in connection with repository 10. In addition repository 670 may include suitable power sources, sensors, input and output devices cameras, microphones and wireless portals that operate in ways like those discussed in connection with the previously described repositories. In some exemplary arrangements the repository 670 may operate responsive entirely to wireless communication with remote central system circuitry and local portable wireless devices. For example user identifying information, access codes and other data that is required to be communicated to the control circuitry of repository 670 may be received via a wireless portal, rather than keypads, touchscreens or other types of manually actuatable input devices. Further exemplary arrangements may provide outputs wirelessly that can be perceived by system users adjacent to the repository through their portable wireless devices. In this manner the exemplary repository avoids having externally accessible components that may be subject to vandalism or tampering. Of course it should be understood that these approaches are exemplary and in other arrangements other approaches may be used.

It should be understood that the number of separate enclosed compartment spaces within repository 760 is exemplary, and other repositories may have different numbers of separately accessible interior areas. The exemplary repository 670 also includes a pair of smaller sized interior areas corresponding to doors 720, 722 compared to the other interior areas, and a single large interior area corresponding to door 714. Other parcel repositories used in connection with exemplary systems may have different numbers and sizes of compartments and compartment spaces so as to accommodate the sizes of parcels being handled through operation of the repository. Other exemplary repositories may be comprised of separate housings that are positioned in adjacent relation so as to provide larger numbers of compartments with interior areas for the acceptance and release of parcels. Such multiple repositories may be controlled responsive to common control circuitry and a single user interface, or may be separately controlled and operable independent of an adjacent repository. Further, the exemplary repository is configured to be positioned in a location that is readily accessible to ground transportation routes. Such configuration facilitates access to the repository by shipper users, item carriers and parcel recipients.

Figure 49:
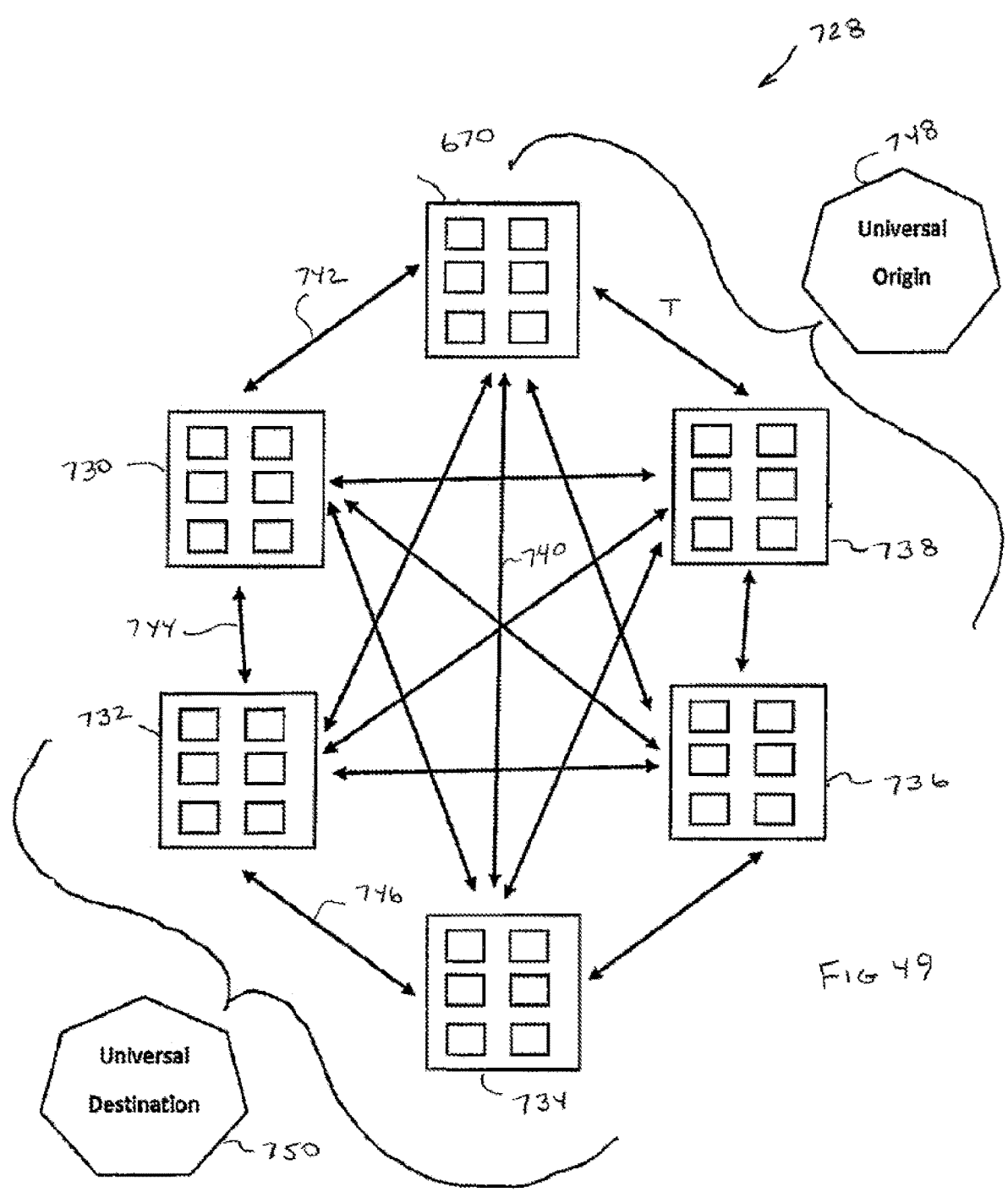
FIG. 49 is a schematic view of a system for the delivery of delivery items.

FIG. 49 shows a system 728 of an exemplary arrangement and the flow of parcels which may occur between repositories in such a system. The exemplary system includes repository 670 as well as a plurality of other repositories schematically indicated 730, 732, 734, 736, and 738. In the exemplary arrangement the repositories included in the system may be similar to repository 760 or the other repositories described herein. In alternative arrangements other repository configurations may be used. It should be understood that the exemplary system further includes central system circuitry which may be similar to the central system circuitry previously discussed.

As represented by arrows T, parcels may be moved between repositories in the system by item carriers. As represented in FIG. 49 parcels that are input to the exemplary system at repository 670 that are required to be delivered at remote final destination repository 734 may be transported in numerous different ways depending on the available item carriers. For example, in some situations a parcel may be transported by an item carrier directly from the originating repository 670 to the final destination repository 734, as represented by Arrow 740. Such a direct transport from the originating repository to the final destination repository may be the result of the fortuitous availability of an item carrier who is available to make such direct transport. Alternatively such a direct route for the parcel may be the result of the shipping user paying an incentive fee for prompt delivery or other circumstances.

In alternative circumstances a parcel that is received in originating repository 670 that is determined by the central system circuitry as required to move to repository 734 as the final destination repository, may be moved by item carriers to one or more intermediate destination repositories before reaching the final destination repository. For example a parcel may be moved from the originating repository 670 to intermediate destination repository 730 by an initial item carrier as represented by Arrow 742. The parcel may then be moved from repository 730 to interim destination repository 732 by another item carrier as represented by Arrow 744. Finally the parcel may be moved from repository 732 to the final destination repository 734 by another item carrier as represented by Arrow 746. Of course as can be appreciated from the other arrows shown in FIG. 49, the parcel may take a more direct path to the final destination repository 734 as a result of the availability of other item carriers that can transport the parcel along the more direct path.

As can be appreciated, the exemplary system 728 may also be operated responsive to the central system circuitry to achieve parcel deliveries to a final destination repository in a more rapid manner than might otherwise occur based on the availability of item carriers. For example the programming associated with the central system circuitry may provide for the consolidation of multiple parcel transport jobs that can be offered to a single item carrier as an incentive to complete the parcel transports more quickly. For example the exemplary central system circuitry may operate to accommodate transport of a collection or bundle of parcels to an intermediate destination repository that may not be on the most direct path to a final system repository for some of the parcels. However, by moving the parcels to an interim destination repository that is closer to the final destination repository more quickly via transport consolidation, the system may achieve delivery at the final destination repository more quickly than might otherwise occur. Further the central system circuitry may take advantage of item carriers who have extended time or delivery location availability compared to other item carriers to achieve movement of more parcels to interim destination repository locations, from which delivery at the final destination repositories may be more rapidly achieved. As can be appreciated these results may be based on the central system circuitry evaluating factors such as available item carriers and carrier locations during different dates and times, as well as other factors that are usable to predict and optimize parcel transport.

Of course as can be appreciated, from a shipper user perspective, the operation of the exemplary system 728 achieves the delivery of delivery items such as parcels from an initial originating location such as a first repository to a final location such as a destination repository. As a result, conceptually the shipment may be considered to have a universal origin as represented schematically as 748, and a universal destination as represented schematically as 750. Although a given parcel may be transported under the control of the central system circuitry through numerous different intermediate parcel repositories by different item carriers, such system activity does not involve the shipper user or the delivery item parcel recipient.

Of course it should be understood that exemplary systems may be implemented in various network topographies such as a peer to peer network communications environment between devices included in the system. Alternatively, the network topography may include a centralized dedicated network adapted to cooperatively link the various system components. Of course other arrangements may include combinations of different system and network topographies to achieve communications between the different system components.

As can be appreciated from the prior discussion in connection with repository 10, the exemplary system 728 may provide for communication through central system circuitry with numerous different types of authorized and/or registered system users who carry out different roles in connection with the system. For example in exemplary arrangements network communication may be provided with the wireless carrier contact devices of item carriers to determine transport availability and to provide transport assignments. Further in exemplary arrangements such carrier contact devices may be utilized for purposes of tracking parcels in transport via GPS or other location monitoring systems. In addition camera or other reader equipped carrier contact devices may be utilized for purposes of scanning machine-readable indicia on parcels, determining size information of parcels or carrying out other actions. Similarly such wireless devices may include wireless portals which enable communication wirelessly with repositories so as to communicate information necessary to access selected interior areas for purposes of receiving or depositing parcels.

Further as can be appreciated, in exemplary arrangements the network communications between the repositories and the central system circuitry may be operative to communicate status and operational information of the types previously discussed. Such information may facilitate the quick repair of any repository malfunctions and the avoidance of future malfunctions for which symptoms can be detected in advance. Similarly such communications may achieve capturing and retaining documentation regarding parcel receipt, transport and delivery such as by the capture of sensor data and other data associated therewith. This may include for example the capture and retention of image data and other data that is usable to document and verify activities related to various parcels. Of course these functions and capabilities are exemplary and in other arrangements different or alternative approaches may be used.

Figure 50:
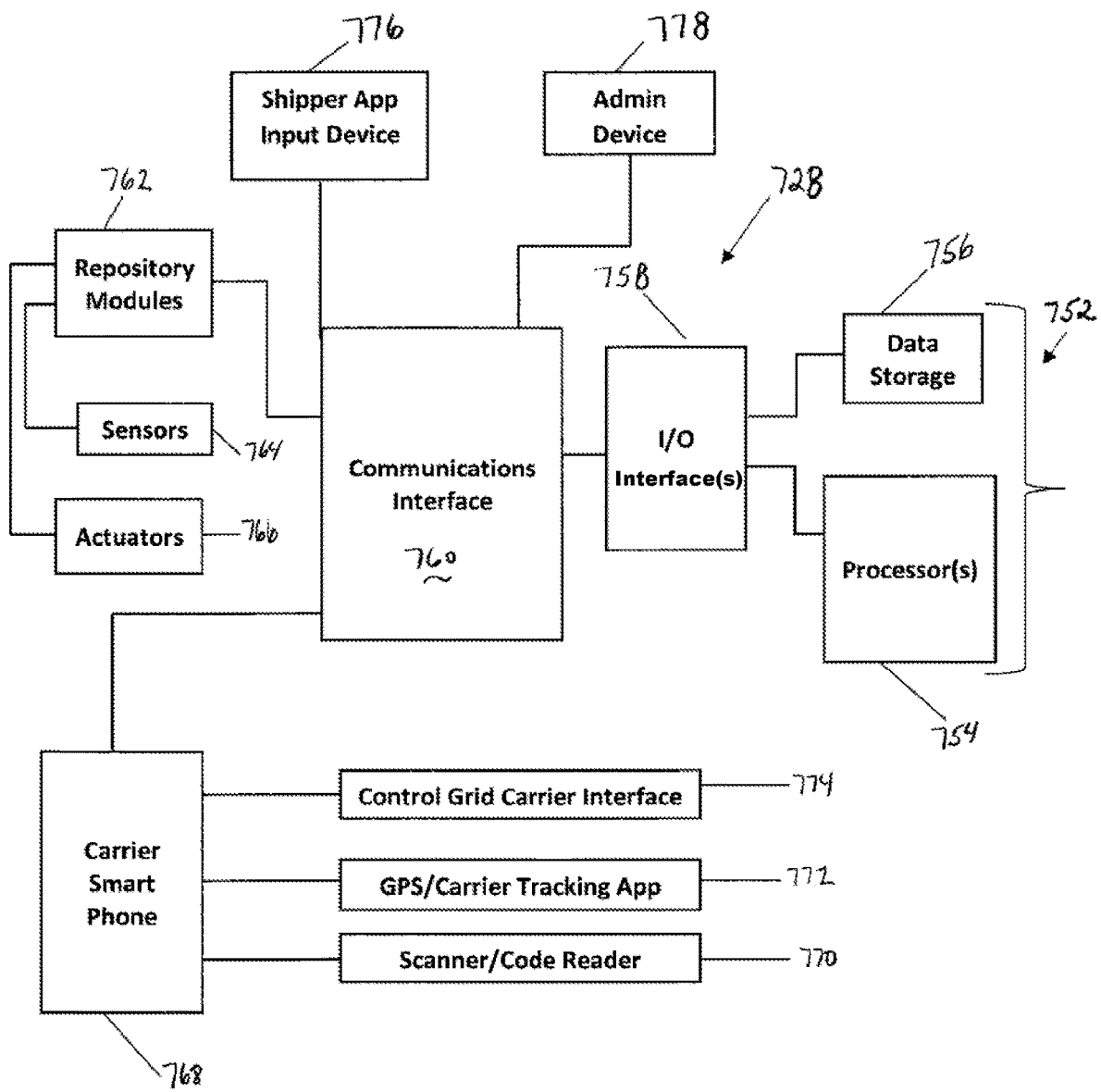
FIG. 50 is a schematic view of system circuitry associated with a delivery item system.

FIG. 50 schematically represents components utilized in connection with an exemplary system such as system 728. In the exemplary arrangement the central system circuitry 752 comprises at least one processor 754 in operative connection with at least one data store 756. As previously discussed, although in this exemplary arrangement the central system circuitry may be represented as a central server or other computer device, in other exemplary arrangements distributed processing and control of the system may be provided in a cloud environment or in a virtual environment within one or more shared platforms.

The exemplary central system circuitry 752 is in operative connection with one or more interfaces schematically indicated 758. The interfaces 758 provide communications connectivity to other system components which communicate in the system. One or more communication interfaces 760 are provided to enable communication of the central system circuitry 752 in the different wired and/or wireless networks to which the components included in the system are connected. Of course it should be understood that in various embodiments numerous different types of communications interfaces may be used.

The plurality of parcel repositories are in operative connection with the system through the network and send communications through interface 760. Such repositories are represented schematically by a repository 762. Repository 762 may include components similar to repository 10 or 760 or the other repositories that have been previously discussed. As schematically shown, each repository includes a plurality of connected components as represented schematically by sensors 764 and actuators 766.

The exemplary system further includes carrier contact devices which are utilized by item carriers in a manner like that previously discussed. Such wireless carrier contact devices such as smart phones are represented by device 768. Such carrier contact devices include control circuitry therein. The control circuitry may include for example a scanner and/or code reader circuitry 770. The exemplary carrier contact device may also include a tracking application such as a GPS circuitry 772. Interface circuitry 774 suitable for communicating with the central system circuitry 752 may also be included in the exemplary item carrier contact device. Of course it should be understood that these device components are exemplary and in other arrangements other or additional components may be used.

As schematically indicated, in the exemplary system devices operated by shipper users as schematically represented 776, may also be in operative connection with the central system circuitry through interfaces 760. Shipper user devices 776 may operate in a manner like that previously discussed to provide communications which enable parcel delivery items to be transported through the system and delivered into the interior area of an originating repository. As can be appreciated numerous different types of shipper user devices and systems may be operative to communicate in the system. The exemplary system further includes one or more administrator devices schematically indicated 778. Such administrator devices may be utilized for purposes of monitoring operation of other devices in the system, providing the mechanism for adding and removing authorized/registered users of the system, receiving alerts or problems identified through operation of system components, generating reports and other information, and providing other oversight and monitoring functions. Of course it should be understood that this schematic representation of system components is merely a high level representation of those system components that are included in an exemplary arrangement.

As has been previously described in detailed examples, the exemplary system enables a shipper user to utilize the system to ship a parcel from an originating location to a destination location through operation of the shipper user device 776. The shipper user device may be operative to provide to the system information regarding the shipment such as for example the ID token associated with the shipper that is recognized by being registered or otherwise authorized to participate in the system. With regard to the particular shipment, the shipping user device may provide information regarding the delivery item and its transport including the originating and destination locations, scheduling requirements (if applicable), item dimensions, weight characteristics and markings, and other information such as a funds source for payment for the shipment.

The exemplary central system circuitry 752 may operate in accordance with the information received from the shipper device to determine an originating repository and a final destination repository for the particular parcel. The exemplary central system circuitry may also carry out other functions such as checking for space availability in the originating repository. The central system circuitry may also provide other information like that previously discussed, that enables the shipper user to apply a label including machine-readable indicia to the parcel that includes a delivery item identifier or other information which is usable to identify the particular parcel in the system. The central system circuitry may also provide to the shipper user device, location information regarding the designated originating depository, an item depositor access code and other information that enables the shipper user to place the parcel in a designated interior area of the originating repository.

The exemplary system circuitry also operates to evaluate available item carriers, current item carrier locations and available location destinations for item transport. The central system circuitry may operate in a manner like that discussed to optimize parcel transport or to consolidate movement of multiple parcels to facilitate the receipt of such parcels at each final destination repository. Central system circuitry may also present opportunity messages to item carriers and assign transport jobs to such item carriers. The central system circuitry may also monitor such item carriers to assure that performance of transport jobs is timely commenced, and if not, may reassign transport jobs to other item carriers.

The exemplary arrangements further enable the central system circuitry to monitor repositories for purposes of determining the placement and removal of parcels into selected interior areas by providing access to authorized users such as shipper users, item carriers, and final parcel recipients. The central system circuitry operates in coordination with the control circuitry of the repositories to monitor the placement, and taking of each parcel between each originating repository and destination repository. Further the exemplary system tracks the parcel and assures the desired movement of the parcel to its final destination repository. In some arrangements the system further operates to provide the recipient of each parcel with notification of the receipt of the parcel at the final destination repository. In such arrangements, the system provides selective controlled access to enable the recipient to remove the parcel from the interior area of the final destination repository, and documents the taking thereof so as to assure that the parcel has been properly delivered. Further in exemplary arrangements the charges and credits associated with the transport of items are provided through the central system circuitry to assure that parcel transports are paid for and that participants in the system are credited as appropriate for their activities. Of course it should be understood that the functions, activities and approaches described herein are exemplary and in other arrangements other approaches may be used.

Further as previously discussed in some exemplary arrangements the central circuitry may be operated so that item carriers deliver parcels to the destination address of the recipient. In such arrangements the central circuitry may be operative to determine a common route which may be followed by an item carrier to deliver multiple parcels to the recipient addresses. In such arrangements an item carrier may collect the parcels from one or more compartments within the interior area of a repository responsive to the central system giving access thereto. The user may then utilize their portable wireless device to document the taking of the parcels from the repository for delivery. Further in some exemplary arrangements the central circuitry may be operative to cause the placement of multiple parcels that will be transported together into a group or bundle that is collected via placement in a single compartment. This may be done to facilitate the ability of the item carrier to obtain the items to be transported by the item carrier in a shorter period of time. In such arrangements the central system may provide the item carrier with the destination address of each parcel. The item carrier may then document the delivery of each parcel at the respective destination address through operation of their mobile wireless device in a manner like that previously discussed. Of course these approaches are exemplary and in other arrangements other approaches may be used.

In some exemplary arrangements the control circuitry associated with the parcel repositories is operative to maintain information concerning the available compartment volume in each enclosed compartment space. This capability enables the control circuitry to determine where a particular parcel may be placed within the compartments of a particular repository. Further in exemplary arrangements the ability to determine the available volume in compartments enables the control circuitry to determine if a plurality of parcels which may be subsequently transported together as a group or bundle by an item carrier, can be placed together in a single compartment. This capability may facilitate the ability of the item carrier to obtain the parcels from the repository so that they can be more readily accessed and transported to a destination repository or other destination.

In some exemplary systems the at least one data store associated with the central system circuitry includes data corresponding to information that is accessible to item carrier contact devices and that can be used to facilitate the placement of parcels into and the removal of parcels from repositories. Such additional data is used in exemplary arrangements to assist item carriers in locating repositories and also in carrying out the necessary processes to access and carry out the necessary parcel transactions at each repository. Such additional data may also be usable by item carriers to locate areas at customer addresses where shipments may originate or be delivered.

As can be appreciated, parcel repositories may be located in a wide variety of different type locations. For example, in some repository locations it may not be easy for an item carrier to find the repository from the available public data regarding the street address and GPS data associated with the street address for the repository. This is because publicly accessible maps and wayfinding services such as Google Maps, for example, generally associate a GPS location for a street address with the physical center of the property located at the associated street address. When the street address is a large facility such as a shopping center, a mall, an office building or other large commercial facility, the location of the repository may not be readily apparent to an item carrier who uses the publicly available maps and wayfinding data to try to locate the repository location using only the address data. Further, some repository locations may be located in areas that are within a facility, or are among a collection of separate buildings which have different addresses. Some repositories may not be located on the ground floor of a facility. In addition, some repositories may be located in areas that have certain security requirements or other requirements that must be met to gain access to the area where the repository is located. Numerous other types of conditions and information may be useful for an item carrier to know in connection with locating and gaining access to a particular repository.

In exemplary arrangements the at least one data store associated with the central system circuitry includes record data corresponding to each parcel repository. FIG. 51 shows schematically an exemplary record format 782 including data that may be included in the at least one data store regarding each repository. In the exemplary arrangement record format 782 includes data which indicates that the record type relates to a parcel repository. The record format further includes data corresponding to the street address at which the repository is located. The exemplary repository format record further includes data corresponding to a repository geolocation. In this exemplary arrangement the geolocation corresponds to GPS data for the repository at the particular street address. As a result geolocation data is usable to determine the precise location of the repository at the particular address location. This usually differs from the geolocation data in publicly accessible maps and wayfinding systems, which conventionally associate a central property location with each street address.

The exemplary repository record format 782 further includes data corresponding to related addresses for the particular repository address. For example data corresponding to related addresses may be included in a repository record when the repository is located in a plaza or other area that is the common space between multiple different buildings having different street addresses. Alternatively multiple related addresses may be utilized when the repository is located in a mall, shopping center or other facility that has multiple street addresses. The inclusion of the related address data is useful for purposes of enabling an item carrier to locate the repository using a related address rather than the primary address.

The exemplary repository record format further includes data corresponding to a facility name. The facility name may be associated with a name of a shopping center, office building, a mall or other area in which the repository is located. Data corresponding to a facility name may be useful to an item carrier when the name of the building or shopping center, for example, is well known or highly visible through signage, but the actual street address is not.

The exemplary repository record format 782 further includes data corresponding to security information associated with accessing the repository. For example in situations where the repository is within a secure facility, the item carrier may benefit from knowing where to find the access point and what requirements will be necessary to reach the area where the repository is located. For example in some facilities the item carrier may be required to wear an identification badge or present other identification information in order to access the area where the repository is located. In some cases item carriers may need to register and/or be issued credentials by the operator of the facility where the repository is located in order to be permitted to obtain access to the repository. Alternatively or in addition, item carriers may need to know how to contact the individuals responsible for security when attempting to access a repository at certain times so that the item carrier is not wrongfully identified as an unauthorized person attempting to access the repository. Numerous different types of information may be included in repository records regarding security requirements associated with accessing particular repositories.

Hazard information may also be included in the exemplary repository record format. In some exemplary arrangements item carriers may need to be aware that certain repository locations have certain hazards that may not be readily apparent to an item carrier. This may include for example a facility that includes guard dogs that protect the facility during certain hours when the location is not open to the public. Such information may also include information about facilities that have automated features that provide silent alarms to law enforcement or other entities when individuals enter certain areas or are present in certain facility areas during certain hours. The exemplary hazard information may be useful to make the item carrier aware or of these hazards and provide information on how such hazards can be avoided or dealt with.

The exemplary repository record format further includes information regarding available parking for the item carrier when visiting the repository. Such parking data may include information about the closest public parking location to the repository. Further such parking data may include information such as loading or unloading zones that the item carrier can use for purposes of loading and unloading and while carrying parcels to and from the particular repository. Such parking data may alternatively include information regarding parking spaces that are indicated as reserved or otherwise not available to the general public that the item carrier may use while taking parcels to or from the repository.

Information regarding handling of parcels may also be included in the exemplary repository record format. For example in some exemplary facilities items being placed in or removed from the repository may need to pass through an area that includes cameras, metal detectors or other types of sensors in order to be permitted to be authorized to be placed in or removed from the repository. Other facilities may require different types of procedures to be followed in connection with handling parcels that are to be placed in or that have been removed from the repository so as to assure that the activities of the item carrier are authorized. Some facilities may require the parcel carrier to use a certain elevator or escalator to reach a particular floor or level where the repository is located. Different repository locations, particularly those that are private locations may have numerous different requirements and handling procedures.

The exemplary repository record format further includes route data. The exemplary route data may include data corresponding to an access route that is used at the street address where the repository is located in order for an item carrier to access the repository. For example route data may include information about a particular entrance that a parcel carrier is required to use to reach the interior of the facility where the repository is located. Route data may also include information describing a path or directions that an item carrier is required to take in order to reach the repository from outside the particular facility where the repository is located. Route data may prescribe certain hallways, walkways, elevators, or other path features the item carrier is required to use. Alternatively route data may include information regarding a different route that a parcel carrier is required to take when leaving the repository and/or the facility. Route data may include other data that makes it easier for an item carrier to travel to and exit from the repository location at the street address location where the repository is located.

Information regarding contacts at the particular facility where the repository is located may also be included in the exemplary repository record format. Contact data may include for example, phone numbers and/or email addresses associated with security functions or personnel responsible for the facility or site. Further exemplary site contact data may include the names of individuals who are responsible for different aspects of the site or facility, their titles, the times during which they are at the facility or other information that may be useful in contacting or locating appropriate personnel who may need to assist or otherwise interface with the item carrier while at the facility. The types of site contact data that may be included in the repository record format may vary with the particular type of site or facility in which the repository is located.

The exemplary repository record format further includes data corresponding to images. In exemplary arrangements the image data will include an image including the repository that can be used to provide the item carrier with a visual frame of reference for finding the repository. Other image data may include images of the particular facility in which the repository is located, particular entrances, security locations or other images that may be helpful to an item carrier in conducting activities at the facility or the repository.

The exemplary repository record format further includes data corresponding to the repository that may be helpful in connection with the item carrier's activities or system operation. Such information may include for example, information regarding the particular system identifier that is associated with the repository. This may be useful to the item carrier in reporting information regarding the particular repository in a manner like that later discussed. Such repository identifying data may include data which facilitates the operation of the system such as by enabling tracking of particular parcels or item carriers in a manner like that previously discussed.

The exemplary record format may also include information regarding the particular repository type associated with the repository. This may include for example information regarding the size and nature of the repository. This may include for example the number of units which make up the repository. The information in the repository record may also indicate the type and nature of compartments that are present in the repository such as refrigerated compartments, heated compartments, high-security compartments or other compartment types that may be included in the repository. Additional information included in the exemplary repository record may also indicate the sizes and volumes of compartments that are included in the particular repository. Such information may be useful to an item carrier for purposes of determining whether a particular parcel can be placed in the particular repository based on its size or other properties or characteristics.

Exemplary repository record formats may also include information regarding the locks associated with the particular repository. This may include information regarding the procedures by which the item carrier may gain access to particular compartments. For example in some arrangements accessing compartments may require certain authentication procedures or other steps that need to be carried out before a compartment can be accessed. Such information may be included to facilitate the ability of the item carrier to carry out the necessary processes and to provide the necessary data and procedures to change the repository locks from the locked condition to the unlocked condition. Further some exemplary arrangements may include information regarding processes and procedures to be used in situations where locking or unlocking functions are not operating properly. Some exemplary arrangements may include data regarding entities or individuals to be contacted in the event of a malfunction of a lock or related components of the repository.

Exemplary repository record formats may also include data regarding sensors that are associated with the particular repository. This may include for example information regarding cameras that have a field of view adjacent to the particular repository and instructions for the parcel carrier to be sure that their activities are within the field of view so that their activities are recorded. This may include for example procedures that assures that the facial features of the item carrier are captured in the images of the cameras which are positioned adjacent to the repository, or on or within the repository, so that such actions are recorded. Alternatively information regarding other sensors may also be provided in the exemplary repository record. This may include for example information regarding readers that are operative to record parcel identifying indicia from particular parcels and the proper positioning of parcels to assure that parcel identifying indicia is read. Other exemplary sensor information may include information regarding weight sensors associated with repositories that are used to determine parcel placement and/or parcel removal from the repository. Such information may include information that provides the user with recommendations regarding how to make placement of parcels so that accurate weight information is captured. Numerous other types of sensor information may also be included in repository records.

Other types of information may be included in data fields in repository records. Such other information may be data of other types associated with the repository that may be useful to an item carrier in connection with repository access or operation.

It should be understood that the types of data mentioned as being in the exemplary repository record format are merely examples of the types of data that may be included in such records. In some arrangements not all of these types of data may be included, while in other arrangements additional data types may be included. Further it should be understood that in exemplary arrangements the character of the data that is associated with any given category or data type may include one or more of textual data, image data, geolocation data or other data as may be appropriate for the particular category or type of information that is included in the records and made available to item carriers.

Figure 52:
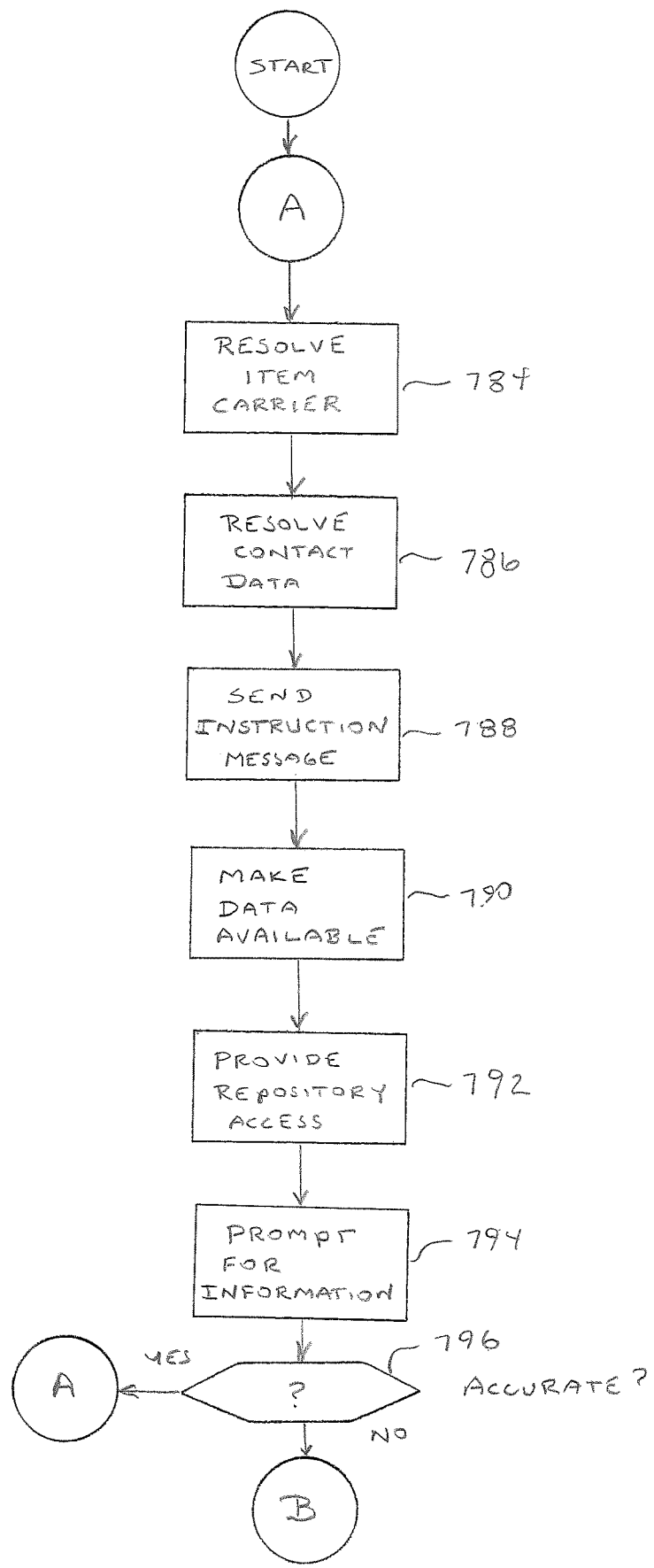
FIGS. 52 through 53 are a schematic representation of logic flow carried out through operations of the central system circuitry in connection with providing item carrier contact devices with information regarding parcel repositories.
Figure 53:
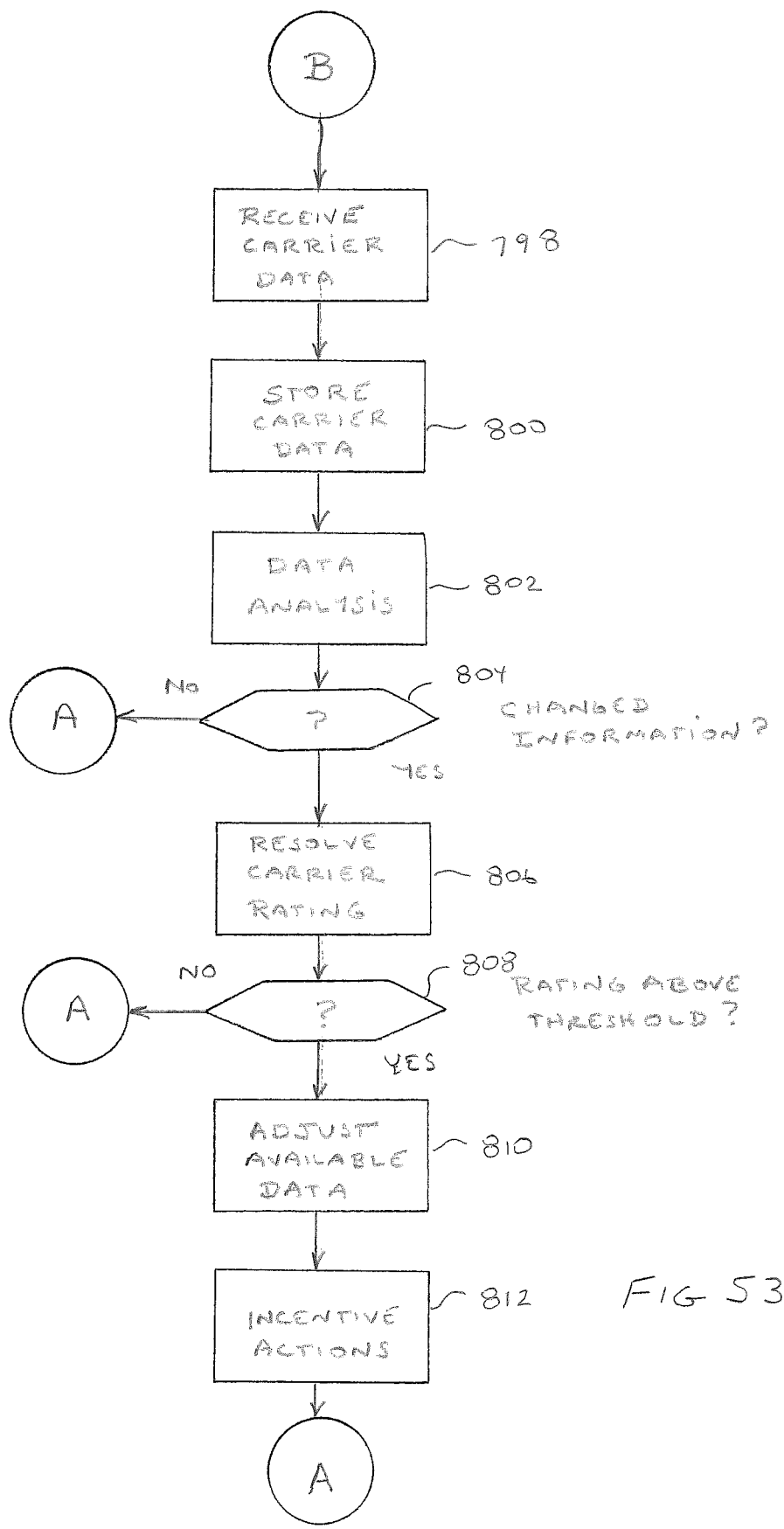

FIGS. 52-53 show schematically an exemplary logic flow carried out by the central system circuitry in connection with making the repository data stored in the at least one data store accessible to item carriers, and for updating such data for purposes of assuring that changes which may occur to such data are captured and stored in connection with the data records regarding the repository.

In the exemplary arrangement the central system circuitry is operative to resolve the particular item carrier who will be removing a parcel from or alternatively be placing a parcel within a respective repository as represented by a step 784. In exemplary arrangements step 784 may include the steps previously discussed for identifying the item carrier who is available and accepts a particular transport assignment. As represented by step 786 the central system circuitry is operative to use the communication address data associated with the item carrier contact device of the selected item carrier to resolve the communication address that is associated with the carrier's contact device to enable the contact device to receive the instructions to handle the parcel and interact with the respective repository.

As represented by step 788 the central system circuitry is operative to send at least one message from the central system circuitry to the determined parcel carrier contact device. The at least one message corresponds to an instruction to place a parcel in or remove a parcel from a designated repository. In the exemplary arrangement the at least one instruction message includes at least the data corresponding to the street address and geolocation data in the repository record associated with the particular repository. The at least one instruction message may correspond for example to the at least one transport assignment message previously discussed, which includes information regarding the repository, the parcel data and credentials which will enable the item carrier to access the particular repository compartment for the placement or removal of the parcel. Of course it should be understood that this approach is exemplary and in other arrangements, other approaches may be used.

As represented in the exemplary logic flow, the central system circuitry is further operative in a step 790 to make the repository record data associated with the particular repository to which the parcel carrier is directed, accessible to the parcel carrier contact device. In the exemplary arrangement, the at least one instruction message is operative to cause the contact device control circuitry to provide outputs from the display or other output device of the carrier contact device, which include indicia which corresponds to the street address and the geolocation of the repository at the street address. Further in exemplary arrangements the parcel carrier is enabled to provide inputs through at least one input device of the carrier contact device, such as the touchscreen, to receive additional information regarding the particular parcel repository. This may include for example all or some of the information included in the repository record 782 previously discussed. Alternatively or in addition the circuit executable instructions that are operative in the contact device control circuitry of the parcel carrier's contact device may be operative to enable the parcel carrier through appropriate inputs, to search for or select certain types of repository record data which the user may require for purposes of finding or accessing the particular repository.

Further in some exemplary arrangements the central system circuitry may be operative in accordance with its circuit executable instructions to provide the parcel carrier contact device with additional information from the corresponding repository record related to the particular repository to which the parcel carrier is being directed. For example in situations where the corresponding repository record includes security requirements or information regarding hazards that a parcel carrier should be apprised of, the exemplary central system circuitry causes at least one message to be sent wirelessly to the parcel carrier contact device. The at least one message further causes the at least one output device of the carrier contact device to output indicia which should make the parcel carrier aware of such requirements at the repository location. Further in some exemplary arrangements, the central system circuitry may be operative to require the parcel carrier to provide one or more inputs through an input device of the carrier contact device so as to acknowledge that the parcel carrier has reviewed such information before the parcel carrier reaches the repository location. Further in some exemplary arrangements the failure to receive an acknowledgment message from the parcel carrier contact device within a set time may cause other steps to be taken such as the automatic sending of further messages or an automated telephone call to be made to the carrier contact device to assure that the parcel carrier is aware of such requirements or hazards. Of course it should be understood that this approach is exemplary and in other arrangements other approaches may be used.

The exemplary central system circuitry is operative to provide the parcel carrier with repository access as schematically represented by step 792. In exemplary arrangements the central system circuitry may operate to provide repository access responsive to the receipt of the user's wireless token data from the carrier contact device and/or parcel identifying indicia in a manner like that previously discussed. The central system circuitry is operative to provide the parcel carrier with access to the compartment of the repository as appropriate to carry out the placing of the parcel in or removing the parcel from the designated compartment. The central system circuitry is also operative to record the actions of the parcel carrier and to track the custody of the parcel and/or the item carrier in ways like those previously discussed.

As represented by a step 794 the exemplary central system circuitry is operative to prompt the parcel carrier to provide inputs through at least one input device of their carrier contact device regarding the information from the repository record that has been presented to the parcel carrier. In some exemplary arrangements the carrier contact device may receive one or more messages that cause outputs prompting the user to indicate whether the data they have received from the carrier contact device regarding the repository is accurate. In other exemplary arrangements the carrier contact device may receive messages that request that the user provide inputs that correspond to certain current actions or activities of the user. For example in some exemplary arrangements the carrier contact device may receive one or more messages proximate to when access to the repository compartment is provided, for the parcel carrier to provide at least one input indicative of their location through an input device of the carrier contact device. In this manner the central system circuitry receives geolocation data associated with the position of the carrier contact device that is indicative of the repository location. Similarly during other parts of the transaction activity, such as in connection with parking, complying with security procedures, traveling the access route at the delivery location, and/or in performing other activities the user may be prompted to provide inputs which are usable by the central circuitry to capture geolocation data, image data or other data that can be compared to existing information in the repository record. Of course this approach is exemplary and in other arrangements other approaches may be used.

In an arrangement where the user is prompted to provide at least one input to indicate whether the repository information they have received is accurate, the user provides at least one input to the at least one input device of the carrier contact device to indicate that the received information is or is not considered accurate. This is represented by step 796. The contact device control circuitry is operative to communicate at least one wireless message to the central system circuitry to indicate whether the user has provided an input which indicates that the received repository data is accurate or not accurate. Responsive to the receipt of the at least one message indicating that the received data is accurate, the exemplary central system circuitry is operative to continue operation without modifying the stored data associated with the repository record. In some exemplary arrangements the central system circuitry is operative responsive at least in part to receipt of the at least one message indicating that the received data is accurate, to increase an associated accuracy or reliability value in the at least one data store associated with the repository record. The increase in the associated accuracy value is an indication that the repository record data is more likely to be accurate and may be presented by the central system circuitry to users of other parcel carrier contact devices with an indication of the accuracy value associated with the information.

If in step 796 the parcel carrier indicates that the received data is not accurate, the central system circuitry operates as represented in a step 798. In the exemplary arrangement the parcel carrier is prompted to provide at least one input through at least one input device of the parcel carrier contact device which indicates the data that was received is inaccurate regarding the repository. In exemplary arrangements the central system circuitry may operate to send one or more messages which are operative to cause the contact device control circuitry to output indicia which requests that the user identify the particular type of data that was found to be inaccurate or incomplete in connection with the repository. In some arrangements the user is also requested to indicate if the data was insufficient due to being incomplete. In the exemplary arrangement the item carrier may provide inputs through at least one user input device to indicate the data type which was inaccurate and to provide inputs which indicate the corrected or additional data related to the repository. The contact device control circuitry is then operative to send at least one further message from the carrier contact device to the central system circuitry. The central system circuitry receives the data as represented in step 798 and stores the item carrier data in the at least one data store in associated relation with the repository record data as represented by step 800.

The exemplary central system circuitry then operates as represented in a step 802 to analyze the received item carrier data. In exemplary arrangements the central system circuitry operates in accordance with its circuit executable instructions to evaluate the received item carrier data and compare it to the corresponding repository data currently in the repository record. In some exemplary arrangements for example, the central system circuitry may evaluate the geolocation information provided for the location of the repository to determine if it is substantially different than that currently stored data. In some exemplary arrangements the stored geolocation data for the repository location may be within a set threshold to be considered sufficiently close to the currently stored data so that no changes are required. Similarly if item carrier data is received related to a parking location, such data may be deemed so close to the currently stored data that the currently stored data may be considered accurate. Alternatively for example, if the item carrier data indicates that the facility name differs only by punctuation, capitalization or other insubstantial ways from the currently stored data, no correction of the currently stored data may be necessary. Of course it should be understood that these are merely examples of the evaluations that may be carried out by the central system circuitry on the item carrier data provided by the item carrier in connection with the repository. Numerous other types of evaluations may be carried out to determine if the item carrier data is sufficiently different from the currently stored data to warrant a possible change to the repository record data.

If as represented in a step 804 it is determined that the item carrier data regarding the repository is not sufficiently different than the currently stored data, the central system circuitry then operates to maintain the current repository record data without change. If however in the step 804 it is determined that the item carrier data represents new or different data from that currently stored regarding the repository, the central system circuitry then executes step 806. In step 806 the central system circuitry is operative to resolve the rating data associated with the particular item carrier who has provided the item carrier information. As previously discussed, in the exemplary system carrier rating information is stored for each item carrier based on a number of different factors which are indicative of the reliability of the particular item carrier.

In the exemplary arrangement the circuit executable instructions associated with the central system circuitry includes at least one threshold value which an item carrier must have before item carrier information will be deemed sufficiently reliable to make the information available to other item carriers and/or to change existing data in a repository record. In exemplary arrangements the threshold value may be different based on the type or category of repository information that is changed or inconsistent with the item carrier data. If as represented by a step 808 the rating associated with the item carrier who has provided the item carrier data is not above the applicable threshold, the central system circuitry does not modify or supplement the repository data. If however in step 808 it is determined that the item carrier's rating is above the threshold, the central system circuitry then operates as represented by step 810 to adjust the data regarding the repository that is stored in association with the repository record in the at least one data store.

In some exemplary arrangements the item carrier data may supersede certain data in the existing repository record. Alternatively in other arrangements the item carrier data may be appended to the existing data in the repository record so as to provide item carriers with access to the provided information in addition to the prior information. Whether the particular repository data is replaced or supplemented in the existing arrangement depends on the category of data involved and the carrier rating associated with the particular item carrier who provided the item carrier data. The central system circuitry then operates to make the adjusted data associated with the repository available to other parcel carrier contact devices of parcel carriers who are instructed to interact with the particular parcel repository.

In the exemplary arrangement the central system circuitry is operative in accordance with its circuit executable instructions to take steps that will encourage item carriers to provide information that will keep the repository records accurate and up to date. In some exemplary arrangements the central system circuitry may be operative to provide one or more incentives to item carriers who provide item carrier data that is usable by the system to update repository records. In some exemplary arrangements the item carrier who provided the updated information may be given an award such as a bonus or gift card for their efforts. In other arrangements item carriers may receive registration in a lottery or other awards program which provides them with the opportunity to receive a prize or other benefits as a result of being diligent in providing updated information to the system.

Further in exemplary arrangements if the particular item carrier information regarding a particular repository that is not initially made available to other item carriers because of the carrier not having an associated rating sufficiently above the threshold, the central system circuitry operates in accordance with its programming to retain the item carrier data. If subsequently another item carrier provides the same or substantially the same updated repository data, the central system circuitry may operate in accordance with its programming to not only update the repository data stored in the repository record, but also to upgrade the carrier rating of the item carrier who initially provided the information. Of course these described approaches are exemplary and in other arrangements other approaches may be used.

In some exemplary arrangements systems for providing the transport and delivery of parcels may further provide for item carriers to pick up parcels at customer locations rather than only at repository locations. Likewise in some exemplary arrangements item carriers may deliver parcels at customer locations as well as at repository locations. Such systems may provide customers with the convenience of not having to travel to a repository for purposes of shipping and receiving their parcels.

In exemplary arrangements where customers may ship and receive their parcels from their customer address, the at least one data store associated with the central system circuitry includes records which include customer information. In the case of a residential or other noncommercial type customers, records may be stored in the at least one data store that provide information that may assist an item carrier in picking up and delivering parcels from the customer address. FIG. 54 shows an example of an exemplary record format 814 associated with a residential customer from which parcels may be picked up and to which parcels may be delivered by parcel carriers. For purposes hereof residential customers and noncommercial customers will be considered to be the same except as otherwise expressly stated.

In the exemplary record format 814, many of the types of data that are included are similar to those included in the record format for repositories. However in the exemplary arrangement the record format for residential customers includes a customer name associated with the customer. The record format also includes related names such as the name of the spouse or other family member that may provide parcels for shipment or receive deliveries at the same address. In the exemplary arrangement related addresses may include situations where the particular address spans one or more street addresses and/or where the particular customer owns a plurality of properties or buildings in close proximity but for which deliveries and pickups will all be made in a common location. Of course these particular situations which describe the particular data types are exemplary and in other arrangements other circumstances may dictate the use of related name and address data types.

In the exemplary arrangement in record format 814 the geolocation data corresponds to a common pickup and delivery location. For example in some arrangements the pickup and delivery location may correspond to a particular door or porch at the residence at which the customer will provide or receive parcels. Alternatively, in some arrangements the particular customer may have a lock box or similar structure into which the customer wishes to place items for shipment and to have delivered items placed. In some exemplary arrangements the delivery location may correspond to the customer's deck, patio, garage or other area that is not readily visible from the street. Numerous different approaches may be taken depending on the customer's preferences for the location from which pickups and to which deliveries are made.

In the case of a residential customer the security information may include information such as an access code to be used to open the gate at the location which enables the item carrier to place the parcel in the location for delivery. Security information may also include an access code that enables the parcel carrier to open the garage or even the customer's home for purposes of making the parcel delivery. Other security procedures may include instructions to announce the delivery at the delivery location such that the customer's web connected doorbell or procedures for use of a system operative to communicate with the carrier at the delivery location that instructs the carrier to be within a field of view of cameras so the customer system can record the parcel carrier making the delivery. Numerous other types of data may be included in the exemplary records.

Hazard information may include particular aspects of hazards that the parcel carrier may encounter at the address. Such hazard information may include that the owner of the facility may have a dog that might be a problem for the parcel carrier. Other hazards may include information about security systems, alarms, livestock or other features that could pose a problem for the item carrier unless dealt with properly.

Other data types may include parking locations to use when making pickups and deliveries, and handling instructions such as requirements to wear identifying information or badges when making pickups and deliveries at the premises. Other information in the records may include the route that the parcel carrier will need to travel while at the delivery address to reach the geolocation for pickups and deliveries.

Other record information may include customer contact data including phone numbers and email addresses that can be used to reach the customer. Parcel carriers may wish to contact the customer if they have been sent to the location for pickup and are unable to obtain the parcel from the customer by pressing the doorbell or knocking on the door. Numerous types of image data may also be included in the records for purposes of facilitating pickup and delivery activities of parcel carriers. In exemplary arrangements each of the data types may include text data, image data or other data that is usable by the parcel carriers in connection with making parcel pickups and parcel deliveries to the residential customer. Of course it should be understood that these data types and formats are exemplary and in other arrangements other record types and data may be used.

Further in other exemplary arrangements exemplary systems may be used to make parcel pickups and parcel deliveries for commercial customers. Commercial customers often have large facilities and/or additional requirements associated with parcel pickups and deliveries not required for residential and noncommercial customers. For example commercial customers may require parcel pickups at different locations than the locations used for parcel deliveries. Further in some exemplary arrangements different processes and procedures may apply to parcel deliveries than those that are applicable to parcel pickups. Further in exemplary arrangements commercial facilities may span or be associated with numerous different facility addresses that have pickups, deliveries and other activities at different designated addresses. Also in connection with commercial customers there may be more frequent need for item carriers to deal with particular employees responsible for different functions of the customer. There may also be situations where multiple item carriers may need to coordinate activities at a particular customer facility so as to facilitate actions in connection with the pickup and delivery of the customer parcels.

In exemplary arrangements the at least one data store in operative connection with the central system circuitry may include a plurality of records associated with particular commercial customers. FIG. 55 shows an exemplary data record format 816 used in connection with deliveries to a commercial customer. In the exemplary arrangement the delivery record 816 includes data types similar to those previously described in connection with other data record formats. However as can be appreciated in the exemplary arrangement the geolocation data is specific to a location at which parcel deliveries are made to the commercial customer. In addition the site contact data will generally include information concerning a phone number and/or email address associated with the particular person or persons who have responsibility for receiving deliveries at the customer facility. Also as can be appreciated, the data types related to security, hazards, parking, handling and route at the delivery location are more likely to include more information at a large commercial facility than at a smaller customer.

FIG. 56 shows an exemplary data record format 818 for a pickup record used in an exemplary arrangement for a commercial customer. The data types included in the exemplary pickup record are similar to those included in the exemplary delivery record. Of course as can be appreciated, the geolocation data associated with picking up parcels for transport will likely be different than that associated with the geolocation for parcel deliveries. Likewise in many cases the other data types will have different information compared to a delivery record when parcel pickups are made at a different location than parcel deliveries. In exemplary arrangements the central system circuitry may be operative in accordance with its circuit executable instructions to automatically replicate certain data from data records for the same customer. For example, when initially setting up the record data for a commercial customer in the at least one data store, the central system circuitry may operate to cause selected data types to automatically be replicated in both of the pickup and delivery records associated with the same customer and street address. The central system circuitry may operate in a manner like that later discussed for purposes of receiving updated information from parcel carriers which indicates that different record data should be included in the pickup and delivery records. In this manner at least some customer data is included in the respective records until better data is received as a result of item carrier provided data. Of course this approach is exemplary and in other arrangements other approaches may be used.

In the case of commercial customers, item carriers may also find it necessary to deal with customer personnel who can resolve issues that may arise in connection with parcel pickups and deliveries. The exemplary central system circuitry is operative to maintain records concerning data used in connection with customer interactions that may assist item carriers in resolving issues that arise in connection with the particular customer. FIG. 57 shows a format for an exemplary customer interaction record 820. The exemplary customer interaction record includes data types included with other commercial customer records that are used in connection with parcel pickups and deliveries. Further in exemplary arrangements the customer interaction record may include data concerning one or more customer contacts and their contact information. This may include for example individuals that have responsibility for shipping parcels, receiving parcels or managing the facility, whose assistance may be needed by parcel carriers in order to properly pick up items or to make deliveries. Further exemplary customer interaction records may include geolocation data that corresponds to a particular individual's office or work area so that a parcel carrier may more readily locate the individual who can address situations that may arise. Of course as can be appreciated from the exemplary record format 820, exemplary records also include the types of data that are included in other types of records.

In some exemplary arrangements the central system circuitry may also include records associated with particular commercial customers that can be used to resolve issues that may arise with parcel carriers or between parcel carriers in connection with a particular customer. In some exemplary arrangements the at least one data store may include carrier interaction records for a particular customer having a format as shown in record 822 in FIG. 58. The exemplary carrier interaction record includes information of the same data types as are included in other records for commercial customers. In addition the internal carrier interaction records may include information that may be needed by parcel carriers in performing actions that may need to be carried out at the customer location. For example in circumstances where a particular item carrier was inadvertently provided with an incorrect parcel by the customer, the item carrier may be directed to wait for the arrival of another item carrier who will be transporting that parcel toward the proper destination. The exemplary internal carrier interaction record includes data corresponding to a geolocation which item carriers may use at the customer location to transfer the parcel or otherwise resolve the problem. Alternatively or in addition circumstances of vehicle breakdown or emergency may cause a parcel carrier to be unable to fulfill a transport mission after having received one or more parcels from the customer. The internal carrier interaction record may provide a place for another parcel carrier to meet the parcel carrier having the emergency to receive the parcels for further transport. Further types of data that may be useful in resolving internal issues associated with the transport of parcels may be included in internal carrier interaction records in exemplary arrangements.

Figure 59:
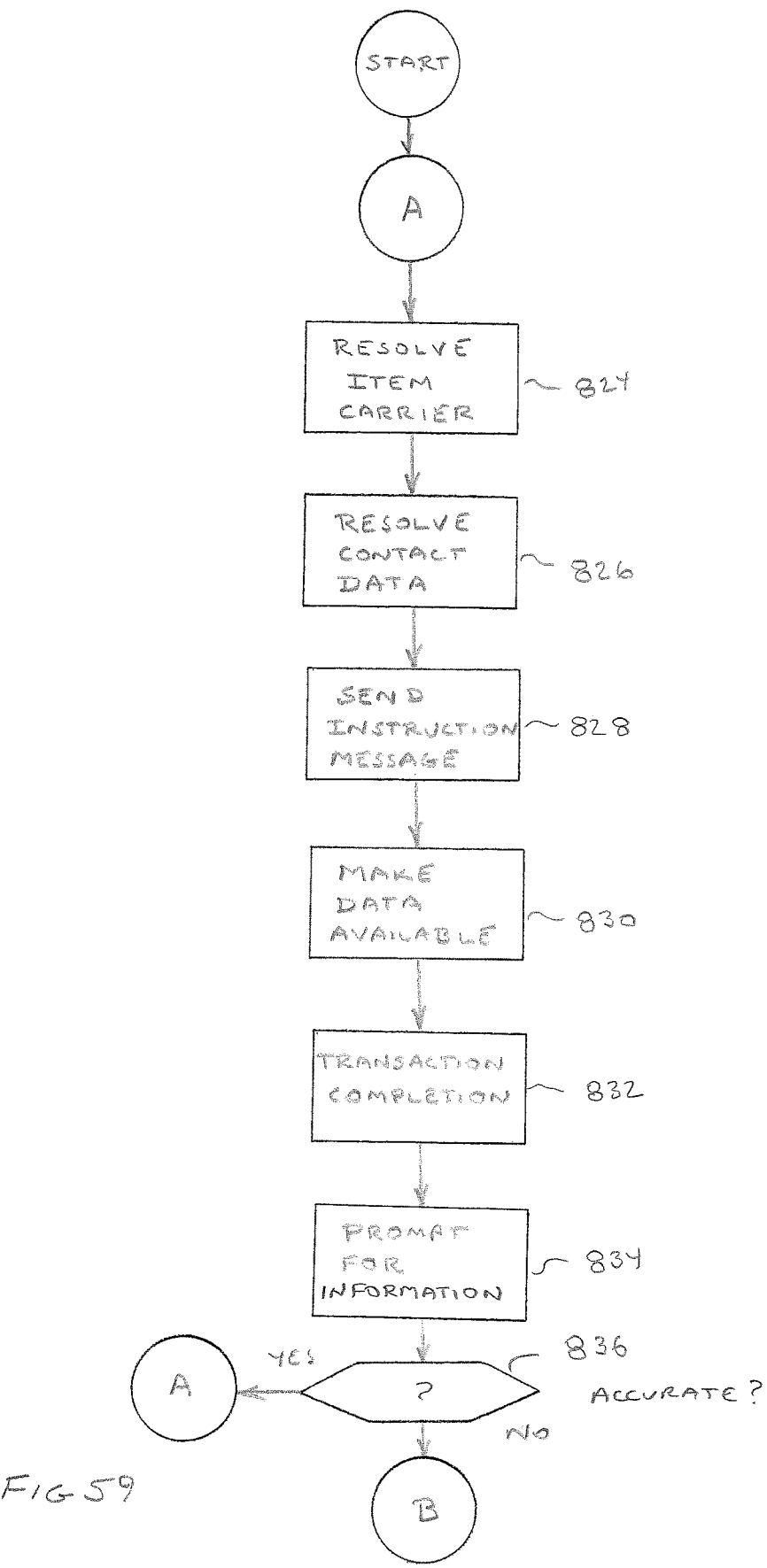
FIGS. 59 through 60 are a schematic representation of logic flow carried out through operation of the central system circuitry in connection with communicating with item carrier devices in making parcel pickups and parcel deliveries.
Figure 60:
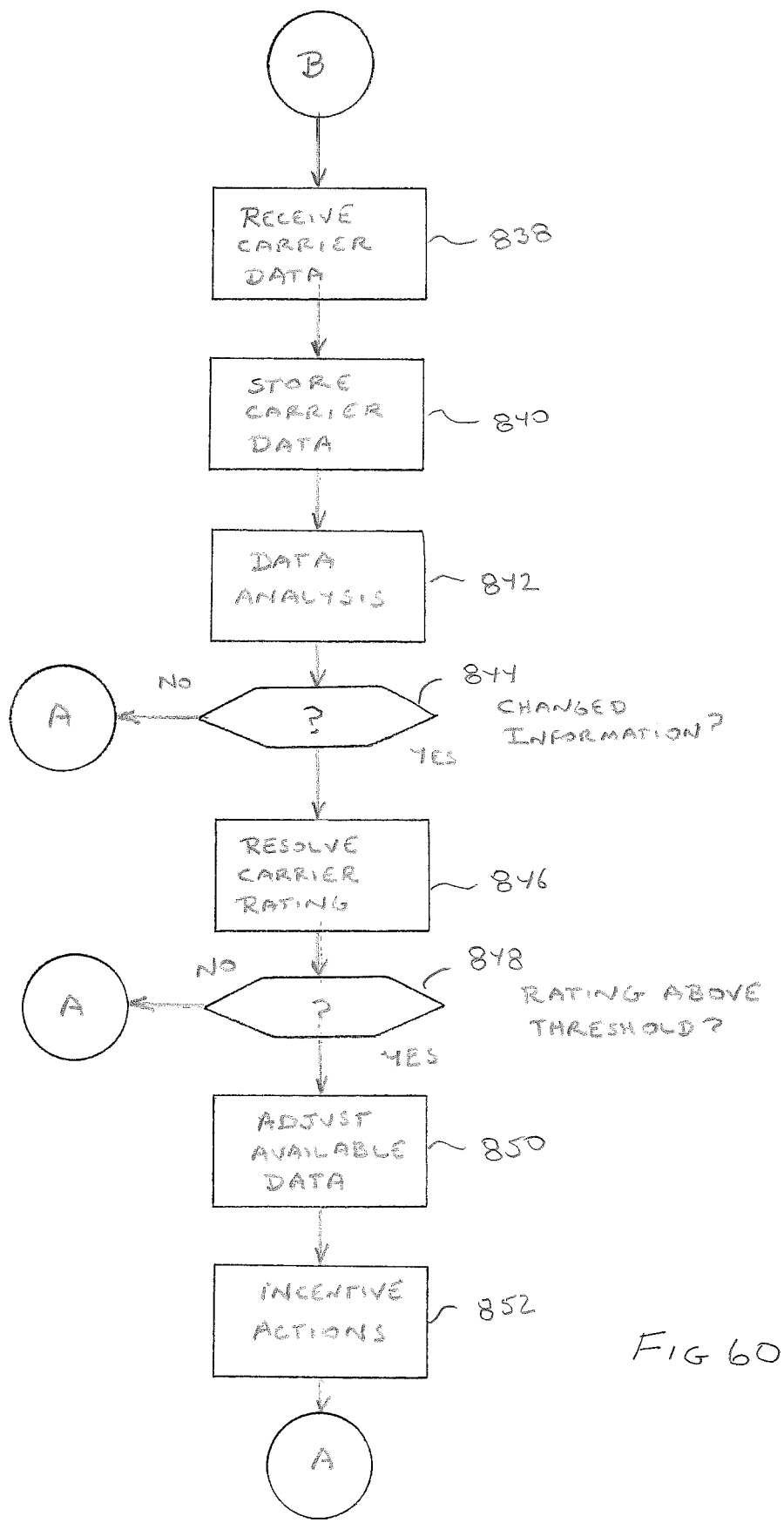

FIGS. 59-60 schematically show an exemplary logic flow associated with actions carried out by the central system circuitry in making deliveries to residential and commercial customers and in updating record data associated with pickup and delivery locations. Of course it should be understood that this schematic logic flow is exemplary and is described at a very high level. In other arrangements different additional steps and/or functions may be carried out.

In an initial step represented as 824 in FIG. 59 the central system circuitry is operative to resolve item carrier data. The actions carried out in connection with step 824 by the central system circuitry may be similar to those carried out in step 784 previously discussed. The central system circuitry is also operative to resolve the contact data for a designated item carrier in a step 826 in a manner like that previously discussed in connection with step 786.

As represented in a step 828 the central system circuitry is operative to send at least one instruction message to the parcel carrier contact device of the designated parcel carrier. In exemplary arrangements the at least one instruction message 828 may correspond to an instruction to pick up a parcel at a pickup location. In other exemplary arrangements the at least one instruction message may correspond to an instruction to deliver a parcel at a particular delivery location.

In the case of the situation where the at least one instruction message corresponds to a delivery instruction, the particular parcel carrier will have previously received instructions from the central system to obtain the parcel to be delivered from a particular parcel repository in a manner like that previously discussed. The at least one instruction message concerning the parcel may include data corresponding to the delivery address and/or the customer name that corresponds to the data stored in the at least one data store for the customer to which the particular parcel is to be delivered. In the exemplary arrangement the at least one delivery message sent by the central system circuitry is received by the parcel carrier contact device. The contact device control circuitry is operative responsive at least in part to the at least one instruction message to enable the output of indicia from an output device of the carrier contact device that includes indicia corresponding to the delivery address and/or the customer name.

In exemplary arrangements the at least one instruction message may further include at least one delivery parameter that corresponds to data in the at least one data store associated with delivery for the particular customer. For example in exemplary arrangements the at least one delivery parameter may include data corresponding to the geolocation at which the delivery is to be made, the parking location for making the delivery and/or security procedures associated with the delivery, provided that such data is stored in the corresponding customer record. Further the at least one delivery parameter may include other data types included in the applicable customer record. This may include for example information regarding alternative addresses, the facility name, and/or contact information such as a phone number or email for the customer contact associated with the delivery. Further exemplary delivery parameter information may include an access route at the delivery location, the range of times during which deliveries can be made, handling procedures and image data that will facilitate the ability of the parcel carrier to make the parcel delivery. In exemplary arrangements, the contact device control circuitry of the carrier contact device is operative responsive to the receipt of the delivery parameter to provide at least one output corresponding to the delivery parameter data. This is represented by step 830.

In some exemplary arrangements the carrier contact device may execute circuit executable instructions to enable the item carrier to provide inputs to at least one input device of the carrier contact device, to enable the item carrier to selectively review the associated delivery record data. Alternatively, in some arrangements such as for security data, hazard data or other information that may be critical for the parcel carrier to know in connection with making the delivery, the central system circuitry may operate to send one or more messages to the carrier contact device so as to provide the information to the carrier and assure that the carrier has received it in a manner like that previously discussed. Of course these approaches are exemplary and in other arrangements other approaches may be used.

Further in exemplary arrangements where a parcel is to be picked up at the customer location the at least one instruction message sent to the carrier contact device may correspond to instructions to the carrier to pick up the particular parcel. The at least one instruction message may include data such as that previously discussed that is included in the applicable customer record. Further the item carrier contact device may also be provided with information regarding the parcel identifying indicia or other data associated with the particular parcel or parcels to be picked up from the customer.

In the exemplary logic flow the central system circuitry operates in a manner like that previously discussed to communicate with the item carrier contact device to document the delivery of the parcel or the pickup of the parcel as appropriate. This is represented by a step 832. The central system circuitry then operates in a manner like that previously discussed in connection with step 794 to send messages which prompt the parcel carrier to provide information concerning the accuracy of the data concerning the pickup or delivery location which has been provided to the parcel carrier by the system. This is represented by step 834. In exemplary arrangements parcel carriers may be prompted to provide inputs through the carrier contact device at a number of different locations during the course of the particular transaction to provide data to document a parking location, pickup locations, a delivery location, an access route or other similar data. In some exemplary arrangements the inputs provided by the parcel carrier may transmit geolocation data, image data or other data associated with the then current location of the item carrier's contact device in the different locations at the customer address. Such information may be used by the central system circuitry to capture and/or to confirm the accuracy of record data which is stored in the at least one data store.

In the exemplary logic flow the inputs provided by the item carrier responsive to the at least one output prompt may indicate that the data provided by the central system circuitry concerning the customer transaction location is either accurate and complete or inaccurate and/or incomplete. This is represented by step 836. If the at least one input by the item carrier to their carrier contact device indicates that the data received concerning the customer transaction location is accurate and complete, the carrier contact device is operable to send at least one message to the central system circuitry that includes data which indicates that the parcel carrier considers the data to be accurate and complete. In response to such a message the central system circuitry may be operative to increase an associated confidence value associated with the existing data and may continue to operate by making the existing record data available to other parcel carriers.

If however the parcel carrier indicates that certain data provided through operation of the system is inaccurate and/or incomplete, the at least one parcel carrier is prompted or otherwise urged to provide corrected or supplemental information through inputs to at least one input device of the carrier contact device. The carrier contact device then sends at least one wireless message to the central system circuitry that includes the item carrier data concerning the delivery or pickup location. This is represented in FIG. 60 by a step 838. The central system circuitry is operative to store the item carrier data in associated relation with the corresponding record data in the at least one data store as represented by a step 840.

As previously discussed in connection with step 802 carried out in connection with use of repository data, the central system circuitry then operates as represented by step 842 to analyze the provided item carrier data. The item carrier data is analyzed to determine if it represents materially different or other data that may be useful to correct or supplement the record data in the at least one data store. A determination is made as represented in step 844 concerning whether the item carrier data represents new or modified data that warrants inclusion as part of the record data in the at least one data store. If the determination in step 844 indicates that the item carrier data does not warrant changing the record data, the central system circuitry does not modify the existing record data based on the provided item carrier data.

Alternatively if in step 844 it is determined that the item carrier data represents a change or additional data that should be included in the corresponding record data, the central system circuitry then operates as represented in step 846 to determine the rating associated with the item carrier who provided the data. A determination is then made as represented in step 848 concerning whether the rating associated with the item carrier is above the threshold for the particular type of data that would be amended or supplemented by the provided item carrier data. If it is determined in step 848 that the rating data associated with the item carrier that supplied the item carrier data is not above the threshold, then the central system circuitry operates to store the data in associated relation with the record data, but does not change or supplement the record data that is made available to other item carrier contact devices in connection with parcel transactions. Further as previously discussed, in some exemplary arrangements the central system circuitry may operate to adjust the stored data regarding the transaction location at a later time in the event that item carrier data from another item carrier is received which indicates a need for a change in the current record data.

If in step 848 it is determined that the rating associated with the item carrier providing the item carrier data is above the threshold, the exemplary system circuitry operates to supplement or change the record data that is made available to item carriers as represented in a step 850. Further as represented in a step 852 the exemplary central system circuitry is operative to offer incentives or to take other steps to reward the item carrier for providing the item carrier data. This may be done in a manner like that discussed in connection with prior step 812 or through other actions.

In exemplary arrangements the central system circuitry may also operate to communicate with item carrier contact devices to provide information corresponding to data stored in the at least one data store to facilitate parcel transactions. For example, a parcel carrier who is instructed to make a parcel pickup or delivery at a particular customer address that cannot be located, may communicate with the central system circuitry to determine if the indicated address is one of the alternative addresses stored in connection with a different address in the at least one data store. Further in exemplary arrangements where a parcel carrier is instructed to deal with a particular customer name for which corresponding record data is not included in the at least one data store, the item carrier contact device may communicate with the central system circuitry to locate available records in which the particular customer name is listed as a related name in the at least one data store. Further in exemplary arrangements the central system circuitry may operate to provide parcel carrier contact devices with information on addresses, building identifiers, loading dock locations and other site data that is not included in publicly available map and wayfinding systems. Of course as can be appreciated numerous additional features and capabilities may be provided based on the types of record data available in the at least one data store and the circuit executable instructions associated with the central system circuitry.

Thus the exemplary embodiments described herein achieve improved operation, eliminate difficulties encountered in the use of prior devices and systems, and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the inventive features are not limited to the features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

It should be understood that features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

The term "non-transitory" with regard to a computer readable medium is intended to exclude only the subject matter of a transitory signal, per se, where the medium itself is transitory. The term "non-transitory" is not intended to exclude any other form of computer readable media, including but not limited to media comprising data that is only temporarily stored or stored in a transitory fashion. Should the law change to allow computer readable medium itself to be transitory signals, then this exclusion is no longer valid or binding.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

We claim:
1. Apparatus comprising:
   central system circuitry operable in a parcel transport system, wherein the central system circuitry is in operative connection with at least one data store,
   wherein the central system circuitry is configured to communicate wirelessly with
      a plurality of parcel repositories, and
      a plurality of parcel carrier contact devices,
   wherein each parcel repository includes
      a body, wherein the respective body includes at least one enclosed compartment space,
      wherein each respective compartment space has a respective opening through which the compartment space is accessible from outside the body,
      at least one door, wherein each respective opening is associated with a respective door, wherein each door is movably mounted in operatively supported connection with the body,
      wherein each respective door is movable between
         a closed position, wherein in the closed position the door closes the respective opening, and
         an open position, wherein in the open position at least a portion of the door is disposed away from the respective opening such that the respective compartment space is accessible from outside the body,
      at least one lock, wherein each respective lock is in operative connection with a respective door,
      wherein each respective lock is selectively changeable between
         a locked condition, wherein in the locked condition the lock is operative to hold the respective door in the closed position, and
         an unlocked condition, wherein in the unlocked condition the door is movable from the closed position to the open position,
      repository control circuitry, wherein the repository control circuitry is in operative connection with each at least one lock of the respective repository,
      wherein wireless communication between the central system circuitry and the repository control circuitry is operative to selectively cause each at least one lock to unlock and to make a respective compartment space within the repository selectively accessible for the placement of parcels in and the removal of parcels from the respective compartment space,
   wherein each parcel carrier contact device includes
      at least one input device,
      at least one output device, contact device control circuitry, wherein the contact device control circuitry is in operative connection with the at least one input device and the at least one output device,
wherein the at least one data store includes data corresponding to
a communication address associated with each parcel carrier contact device,
each repository, wherein the data corresponding to each repository includes data corresponding to
a street address of the respective repository, and
a geolocation of the respective repository,
wherein the central system circuitry is operative to communicate at least one message to a first parcel carrier contact device through use of the communication address data associated in the at least one data store with the respective first parcel carrier contact device,
wherein the at least one message corresponds to an instruction to at least one of place a parcel within or remove a parcel from a first parcel repository, wherein the at least one message includes data corresponding to the street address data and the geolocation data associated in the at least one data store with the first parcel repository,
wherein the at least one message is operative to cause the contact device control circuitry of the first parcel carrier contact device to enable the at least one output device of the first parcel carrier contact device to output indicia corresponding to
the street address of the first parcel repository, and
the geolocation of the first repository at the street address.

2. The apparatus according to claim 1
wherein the at least one data store further includes data corresponding to
a facility name associated with the first repository, wherein the facility name corresponds to a name of a facility at which the first repository is located,
wherein the at least one message includes data corresponding to the facility name associated in the at least one data store with the first parcel repository,
wherein the at least one message is further operative to cause the contact device control circuitry of the first parcel carrier contact device to enable the at least one output device of the first parcel carrier contact device to provide at least one output corresponding to the facility name.

3. The apparatus according to claim 2
wherein the at least one data store further includes data corresponding to
an image including the first parcel repository,
a parking location in proximity to the first parcel repository,
an access route associated with the first parcel repository, wherein the access route includes a description of a route at the street address associated with the first parcel repository to reach the first parcel repository,
at least one hazard associated with the first parcel repository, wherein the at least one hazard includes a description associated with the at least one hazard associated with the first parcel repository,
wherein the at least one message includes data corresponding to
the image,
the parking location,
the access route, and
the at least one hazard,
wherein the at least one message is further operative to cause the contact device control circuitry of the first parcel carrier contact device to enable the at least one output device of the first parcel carrier contact device to provide at least one output corresponding to each of the image, parking location, the access route, and the at least one hazard,
wherein the central system circuitry is operative to communicate at least one further message with the first parcel carrier contact device,
wherein the at least one further message includes item carrier data corresponding to a first parcel repository related input to the at least one input device of the first carrier contact device,
wherein the central system circuitry is operative responsive at least in part to the at least one further message to cause data corresponding to the item carrier data to be stored in associated relation with the data corresponding to the first parcel repository in the at least one data store,
wherein the central system circuitry is operative to make data corresponding to the item carrier data accessible to parcel carrier contact devices other than the first carrier contact device,
wherein the at least one data store further includes data corresponding to
a plurality of parcel transaction locations, wherein each parcel transaction location does not include a repository and corresponds to a location at which parcels may be both picked up and delivered,
wherein the data corresponding to each parcel transaction location includes parcel transaction data corresponding to
a parcel transaction street address associated with the respective parcel transaction location,
a customer name associated with the respective parcel transaction location,
a geolocation for parcel transactions at the respective parcel transaction location,
a security procedure to conduct a parcel transaction at the respective parcel transaction location,
a parking location to make a parcel transaction at the respective parcel transaction location,
a warning of hazards that may be encountered in conducting a parcel transaction at the respective parcel transaction location,
a facility name associated with the respective parcel transaction location,
at least one of a contact phone number and a contact email associated with the respective parcel transaction location,
an access route at the respective parcel transaction location to reach a transaction location,
a time range during which parcel transactions can be conducted at the respective parcel transaction location,
a handling procedure for parcel transactions at the respective parcel transaction location,
an image associated with the respective parcel transaction location,
wherein the central circuitry is operative to communicate at least one parcel transaction message with a second parcel carrier contact device through use of the communication address data associated in the at least one data store with the respective second parcel carrier contact device,
wherein the at least one parcel transaction message corresponds to an instruction to conduct a transaction involving a further parcel at a first parcel transaction location, wherein the at least one parcel transaction message includes data corresponding to the parcel transaction data,
wherein the at least one parcel transaction message is operative to cause the contact device control circuitry of the second parcel carrier contact device to enable the at least one output device of the second parcel carrier contact device to provide at least one output corresponding to the parcel transaction data.

4. The apparatus according to claim 3
wherein the at least one data store further includes data corresponding to a rating of a second parcel carrier associated with use of the second parcel carrier contact device,
wherein the central system circuitry is operative to communicate at least one further parcel transaction message with the second parcel carrier contact device,
wherein the at least one further parcel transaction message includes item carrier parcel transaction data related to the first parcel transaction location corresponding to at least one parcel transaction input through the at least one input device of the second carrier contact device,
wherein the central system circuitry is operative responsive at least in part to the at least one further parcel transaction message to cause the data corresponding to the carrier parcel transaction data to be stored in association with the data corresponding to the first parcel transaction location in the at least one data store,
wherein the central system circuitry is operative responsive at least in part to the rating data associated with the second parcel carrier, to make data corresponding to the carrier parcel transaction data accessible to parcel carrier contact devices other than the second carrier contact device.

5. The apparatus according to claim 1
wherein the at least one data store further includes data corresponding to
an image including the first parcel repository,
wherein the at least one message includes data corresponding to the image associated in the at least one data store with the first parcel repository,
wherein the at least one message is further operative to cause the contact device control circuitry of the first parcel carrier contact device to output an image, wherein the image includes the first parcel repository.

6. The apparatus according to claim 1
wherein the at least one data store includes data corresponding to a parking location in proximity to the first parcel repository,
wherein the at least one message includes data corresponding to the parking location included in the at least one data store in association with the first parcel repository,
wherein the at least one message is further operative to cause the contact device control circuitry of the first parcel carrier contact device to cause the at least one output device of the first parcel carrier contact device to provide at least one output corresponding to the parking location.

7. The apparatus according to claim 1
wherein the at least one data store further includes data corresponding to
an access route associated with the first repository, wherein the access route includes a description of a route at the street address associated with the first repository to reach the first repository,
wherein the at least one message includes data corresponding to the access route associated in the at least one data store with the first parcel repository,
wherein the at least one message is further operative to cause the contact device control circuitry of the first parcel carrier contact device to enable the at least one output device of the first parcel carrier contact device to provide at least one output corresponding to the access route.

8. The apparatus according to claim 1
wherein the at least one data store further includes data corresponding to
at least one hazard associated with the first parcel repository, wherein the at least one hazard includes a description associated with the at least one hazard associated with the first parcel repository,
wherein the at least one message includes data corresponding to the at least one hazard associated in the at least one data store with the first parcel repository,
wherein the at least one message is further operative to cause the contact device control circuitry of the first parcel carrier contact device to enable the at least one output device of the first parcel carrier contact device to provide at least one output data corresponding to the at least one hazard.

9. The apparatus according to claim 1
wherein the central system circuitry is operative to communicate at least one further message with the first parcel carrier contact device,
wherein the at least one further message includes item carrier data corresponding to a first parcel repository related input through the at least one input device of the first carrier contact device,
wherein the central system circuitry is operative responsive at least in part to the at least one further message to cause data corresponding to the item carrier data to be stored in associated relation with the data corresponding to the first parcel repository in the at least one data store.

10. The apparatus according to claim 1
wherein the central system circuitry is operative to communicate at least one further message with the first parcel carrier contact device,
wherein the at least one further message includes item carrier data corresponding to a first parcel repository related input through the at least one input device of the first carrier contact device,
wherein the central system circuitry is operative responsive at least in part to the at least one further message to cause data corresponding to the item carrier data to be stored in associated relation with the data corresponding to the first parcel repository in the at least one data store,
wherein the central system circuitry is operative to make data corresponding to the item carrier data accessible to parcel carrier contact devices other than the first carrier contact device.

11. The apparatus according to claim 1
wherein the at least one data store further includes data corresponding to a rating of a first parcel carrier associated with use of the first parcel carrier contact device,
wherein the central system circuitry is operative to communicate at least one further message with the first parcel carrier contact device, wherein the at least one further message includes item carrier data corresponding to a first parcel repository related input through the at least one input device of the first carrier contact device, wherein the central system circuitry is operative responsive at least in part to the at least one further message to cause data corresponding to the item carrier data to be stored in associated relation with the data corresponding to the first parcel repository in the at least one data store, wherein the central system circuitry is operative responsive at least in part to the rating data associated with the first parcel carrier, to make data corresponding to the item carrier data accessible to parcel carrier contact devices other than the first carrier contact device.

12. The apparatus according to claim 1
wherein the at least one data store further includes data corresponding to
  a plurality of delivery locations, wherein the delivery locations do not include a repository,
    wherein the data corresponding to each delivery location includes data corresponding to
      a street address associated with the respective delivery location, and
      a customer name associated with the respective delivery location,
wherein the central circuitry is operative to communicate at least one delivery message to a second parcel carrier contact device through use of the communication address data associated in the at least one data store with the respective second parcel carrier contact device,
wherein the at least one delivery message corresponds to an instruction to deliver a further parcel at a first delivery location, wherein the at least one delivery message includes data corresponding to at least one of the street address data and the customer name data associated in the at least one data store with the first delivery location,
wherein the at least one delivery message is operative to cause the contact device control circuitry of the second parcel carrier contact device to enable the at least one output device of the second parcel carrier contact device to provide at least one output corresponding to at least one of
  the street address of the first delivery location, and
  the customer name associated with the first delivery location.

13. The apparatus according to claim 1
wherein the at least one data store further includes data corresponding to
  a plurality of delivery locations, wherein the delivery locations do not include a repository,
    wherein the data corresponding to each delivery location includes data corresponding to
      a street address associated with the respective delivery location, and
      a geolocation to provide delivery at the respective delivery location,
wherein the central circuitry is operative to communicate at least one delivery message to a second parcel carrier contact device through use of the communication address data associated in the at least one data store with the respective second parcel carrier contact device,
wherein the at least one delivery message corresponds to an instruction to deliver a further parcel at a first delivery location, wherein the at least one delivery message includes data corresponding to at least one of the street address data and the geolocation data associated in the at least one data store with the first delivery location,
wherein the at least one delivery message is operative to cause the contact device control circuitry of the second parcel carrier contact device to enable the at least one output device of the second parcel carrier contact device to provide at least one output corresponding to at least one of
  the street address of the first delivery location, and
  the geolocation to make delivery of the further parcel at the street address.

14. The apparatus according to claim 1
wherein the at least one data store further includes data corresponding to
  a plurality of delivery locations, wherein the delivery locations do not include a repository,
    wherein the data corresponding to each delivery location includes data corresponding to
      a street address associated with the respective delivery location,
      a customer name associated with the respective delivery location, and
      at least one delivery parameter, wherein the at least one delivery parameter includes data corresponding to at least one of
        a geolocation to make delivery at the respective delivery location,
        a security procedure to make delivery at the respective delivery location,
        a parking location to make delivery at the respective delivery location,
        a warning of hazards that may be encountered to make delivery at the respective delivery location,
        a facility name associated with the respective delivery location,
        at least one of a contact phone number and a contact email associated with the respective delivery location,
        an access route at the respective delivery location to reach a location to make delivery,
        a range of times during which delivery can be made associated with the respective delivery location,
        a handling procedure for delivery associated with the respective delivery location,
        an image associated with the respective delivery location,
wherein the central system circuitry is operative to communicate at least one delivery message to a second parcel carrier contact device through use of the communication address data associated in the at least one data store with the respective second parcel carrier contact device,
wherein the at least one delivery message corresponds to an instruction to deliver a further parcel at a first delivery location, wherein the at least one delivery message includes data corresponding to at least one of the street address data and the customer name data associated in the at least one data store with the delivery location, and the at least one delivery parameter,
wherein the at least one delivery message is operative to cause the contact device control circuitry of the second parcel carrier contact device to enable the at least one

87 output device of the second parcel carrier contact device to provide at least one output corresponding to at least one of
the street address of the first delivery location,
the customer name associated with the first delivery location, and
the at least one delivery parameter.

15. The apparatus according to claim 1
wherein the at least one data store further includes data corresponding to
a plurality of delivery locations, wherein the delivery locations do not include a repository,
wherein the data corresponding to each delivery location includes data corresponding to
a street address associated with the respective delivery location, and
a customer name associated with the respective delivery location,
wherein the central circuitry is operative to communicate at least one delivery message to a second parcel carrier contact device through use of the communication address data associated in the at least one data store with the respective second parcel carrier contact device,
wherein the at least one delivery message corresponds to an instruction to deliver a further parcel at a first delivery location, wherein the at least one delivery message includes data corresponding to at least one of the street address data and the customer name data associated in the at least one data store with the first delivery location,
wherein the at least one delivery message is operative to cause the contact device control circuitry of the second parcel carrier contact device to enable the at least one output device of the second parcel carrier contact device to provide at least one output corresponding to at least one of
the street address of the first delivery location,
the customer name associated with the first delivery location,
wherein the central system circuitry is operative to communicate at least one further delivery message with the second parcel carrier contact device,
wherein the at least one further delivery message includes item carrier delivery data related to the first delivery location corresponding to at least one delivery input through the at least one input device of the second carrier contact device,
wherein the central system circuitry is operative responsive at least in part to the at least one further delivery message, to cause the data corresponding to the item carrier delivery data to be stored in associated relation with the data corresponding to the first delivery location in the at least one data store.

16. The apparatus according to claim 1
wherein the at least one data store further includes data corresponding to
a plurality of delivery locations, wherein the delivery locations do not include a repository,
wherein the data corresponding to each delivery location includes data corresponding to
a street address associated with the respective delivery location, and
a customer name associated with the respective delivery location,
wherein the central circuitry is operative to communicate at least one delivery message to a second parcel carrier

88 contact device through use of the communication address data associated in the at least one data store with the respective second parcel carrier contact device,
wherein the at least one delivery message corresponds to an instruction to deliver a further parcel at a first delivery location, wherein the at least one delivery message includes data corresponding to at least one of the street address data and the customer name data associated in the at least one data store with the delivery location,
wherein the at least one delivery message is operative to cause the contact device control circuitry of the second parcel carrier contact device to enable the at least one output device of the second parcel carrier contact device to provide at least one output corresponding to at least one of
the street address of the first delivery location, and
the customer name associated with the first delivery location,
wherein the central system circuitry is operative to communicate at least one further delivery message with the second parcel carrier contact device,
wherein the at least one further delivery message includes item carrier delivery data related to the first delivery location corresponding to at least one delivery input through the at least one input device of the second carrier contact device,
wherein the central system circuitry is operative responsive at least in part to the at least one further delivery message to cause the data corresponding to the item carrier delivery data to be stored in associated relation with the data corresponding to the first delivery location in the at least one data store,
wherein the central system circuitry is operative to make data corresponding to the item carrier delivery data accessible to parcel carrier contact devices other than the second carrier contact device.

17. The apparatus according to claim 1
wherein the at least one data store further includes data corresponding to
a plurality of delivery locations, wherein the delivery locations do not include a repository,
wherein the data corresponding to each delivery location includes data corresponding to
a street address associated with the respective delivery location, and
a customer name associated with the respective delivery location,
wherein the central circuitry is operative to communicate at least one delivery message to a second parcel carrier contact device through use of the communication address data associated in the at least one data store with the respective second parcel carrier contact device,
wherein the at least one delivery message corresponds to an instruction to deliver a further parcel at a first delivery location, wherein the at least one delivery message includes data corresponding to at least one of the street address data and the customer name data associated in the at least one data store with the delivery location,
wherein the at least one delivery message is operative to cause the contact device control circuitry of the second parcel carrier contact device to enable the at least one output device of the second parcel carrier contact device to provide at least one output corresponding to at least one of
the street address of the first delivery location, and
the customer name associated with the first delivery location,
wherein the at least one data store further includes data corresponding to a rating of a second parcel carrier associated with use of the second parcel carrier contact device,
wherein the central system circuitry is operative to communicate at least one further delivery message with the second parcel carrier contact device,
wherein the at least one further delivery message includes item carrier delivery data related to the first delivery location corresponding to at least one delivery input through the at least one input device of the second carrier contact device,
wherein the central system circuitry is operative responsive at least in part to the at least one further delivery message to cause the data corresponding to the item carrier delivery data to be stored in associated relation with the data corresponding to the first delivery location in the at least one data store,
wherein the central system circuitry is operative responsive at least in part to the rating data associated with the second parcel carrier, to make data corresponding to the item carrier delivery data accessible to parcel carrier contact devices other than the second carrier contact device.

18. The apparatus according to claim 1
wherein the at least one data store further includes data corresponding to
a plurality of pickup locations, wherein the pickup locations do not include a repository,
wherein the data corresponding to each pickup location includes data corresponding to
a street address associated with the respective pickup location, and
a customer name associated with the respective pickup location,
wherein the central circuitry is operative to communicate at least one pickup message to a second parcel carrier contact device through use of the communication address data associated in the at least one data store with the respective second parcel carrier contact device,
wherein the at least one pickup message corresponds to an instruction to pick up a further parcel at a first pickup location, wherein the at least one pickup message includes data corresponding to at least one of the street address data and the customer name data associated in the at least one data store with the first pickup location,
wherein the at least one pickup message is operative to cause the contact device control circuitry of the second parcel carrier contact device to enable the at least one output device of the second parcel carrier contact device to provide at least one output corresponding to at least one of
the street address of the first pickup location, and
the customer name associated with the first pickup location.

19. The apparatus according to claim 1
wherein the at least one data store further includes data corresponding to
a plurality of pickup locations, wherein the pickup locations do not include a repository,
wherein the data corresponding to each pickup location includes data corresponding to
a street address associated with the respective pickup location, and
a geolocation at which to provide parcel pickup at the respective pickup location,
wherein the central circuitry is operative to communicate at least one pickup message with a second parcel carrier contact device through use of the communication address data associated in the at least one data store with the respective second parcel carrier contact device,
wherein the at least one pickup message corresponds to an instruction to pickup a further parcel at a first pickup location, wherein the at least one pickup message includes data corresponding to at least one of the street address data and the geolocation data associated in the at least one data store with the first pickup location,
wherein the at least one pickup message is operative to cause the contact device control circuitry of the second parcel carrier contact device to enable the at least one output device of the second parcel carrier contact device to provide at least one output corresponding to at least one of
the street address of the first pickup location, and
the geolocation to make parcel pickup of the further parcel at the street address of the first pickup location.

20. The apparatus according to claim 1
wherein the at least one data store further includes data corresponding to
a plurality of pickup locations, wherein the pickup locations do not include a repository,
wherein the data corresponding to each pickup location includes data corresponding to
a street address associated with the respective pickup location, and
a customer name associated with the respective pickup location, and
at least one pickup parameter, wherein the at least one pickup parameter includes data corresponding to at least one of
a geolocation at which to make parcel pickup at the respective pickup location,
a security procedure to make parcel pickup at the respective pickup location,
a parking location to make parcel pickup at the respective pickup location,
a warning of hazards that may be encountered to make parcel pickup at the respective pickup location,
a facility name associated with the respective pickup location,
at least one of a contact phone and a contact email associated with the respective pickup location,
an access route at the pickup location to reach a location to make parcel pickup,
range of times during which parcel pickup can be made associated with the respective pickup location,
a handling procedure for parcel pickup associated with the respective pickup location,
an image associated with the respective pickup location,
wherein the central circuitry is operative to communicate at least one pickup message to with second parcel carrier contact device through use of the communication address data associated in the at least one data store with the respective second parcel carrier contact device, wherein the at least one pickup message corresponds to an instruction to pickup a further parcel at a first pickup location, wherein the at least one pickup message includes data corresponding to at least one of the street address data, the customer name data associated in the at least one data store with the first pickup location, and the at least one pickup parameter, wherein the at least one pickup message is operative to cause the contact device control circuitry of the second parcel carrier contact device to enable the at least one output device of the second parcel carrier contact device to provide at least one output corresponding to at least one of the street address of the first pickup location,
the customer name associated with the first pickup location, and
the at least one pickup parameter.

21. The apparatus according to claim 1
wherein the at least one data store further includes data corresponding to
a plurality of pickup locations, wherein the pickup locations do not include a repository,
wherein the data corresponding to each pickup location includes data corresponding to
a street address associated with the respective pickup location, and
a customer name associated with the respective pickup location,
wherein the central circuitry is operative to communicate at least one pickup message with a second parcel carrier contact device through use of the communication address data associated in the at least one data store with the respective second parcel carrier contact device,
wherein the at least one pickup message corresponds to an instruction to pick up a further parcel at a first pickup location, wherein the at least one pickup message includes data corresponding to at least one of the street address data and the customer name data associated in the at least one data store with the first pickup location,
wherein the at least one pickup message is operative to cause the contact device control circuitry of the second parcel carrier contact device to enable the at least one output device of the second parcel carrier contact device to provide at least one output corresponding to at least one of
the street address of the first pickup location, and
the customer name associated with the first pickup location,
wherein the central circuitry is operative to communicate at least one further pickup message with the second parcel carrier contact device,
wherein the at least one further pickup message includes item carrier pickup data corresponding to at least one pickup input through the at least one input device of the second carrier contact device,
wherein the central system circuitry is operative responsive at least in part to the at least one further pickup message to cause the data corresponding to the item carrier pickup data to be stored in associated relation with the data corresponding to the first pickup location in the at least one data store.

22. The apparatus according to claim 1
wherein the at least one data store further includes data corresponding to
a plurality of pickup locations, wherein the pickup locations do not include a repository,
wherein the data corresponding to each pickup location includes data corresponding to
a street address associated with the respective pickup location, and
a customer name associated with the respective pickup location,
wherein the central circuitry is operative to communicate at least one pickup message with a second parcel carrier contact device through use of the communication address data associated in the at least one data store with the respective second parcel carrier contact device,
wherein the at least one pickup message corresponds to an instruction to pickup a further parcel at a first pickup location, wherein the at least one pickup message includes data corresponding to at least one of the street address data and the customer name data associated in the at least one data store with the first pickup location,
wherein the at least one pickup message is operative to cause the contact device control circuitry of the second parcel carrier contact device to enable the at least one output device of the second parcel carrier contact device to provide at least one output corresponding to at least one of
the street address of the first pickup location, and
the customer name associated with the first pickup location,
wherein the at least one data store includes data corresponding to a rating of a second parcel carrier associated with use of the second parcel carrier contact device,
wherein the central system circuitry is operative to communicate at least one further pickup message with the second parcel carrier contact device,
wherein the at least one further pickup message includes item carrier pickup data related to the first pickup location corresponding to at least one pickup input through the at least one input device of the second carrier contact device,
wherein the central system circuitry is operative responsive at least in part to the at least one further pickup message to cause the data corresponding to the item carrier pickup data to be stored in associated relation with the data corresponding to the first pickup location in the at least one data store,
wherein the central system circuitry is operative responsive at least in part to the rating data associated with the second parcel carrier, to make data corresponding to the item carrier pickup data accessible to parcel carrier contact devices other than the second carrier contact device.

23. Apparatus comprising:
central system circuitry operative in a parcel transport system, wherein the central system circuitry is in operative connection with at least one data store,
wherein the central system circuitry is configured to communicate wirelessly with
a plurality of parcel repositories,
a plurality of parcel carrier contact devices,
wherein each parcel repository includes
at least one enclosed compartment space,
at least one movable door, wherein the at least one door is movable to prevent or allow access to an interior of the at least one enclosed compartment space,
at least one lock, wherein the at least one lock is in operative connection with the at least one door, wherein the at least one lock is selectively operable to enable the interior of a respective compartment space to be accessible such that parcels can be placed in or removed from the respective compartment,
wherein each parcel carrier contact device includes
at least one input device,
at least one output device,
contact device control circuitry, wherein the contact device control circuitry is in operative connection with the at least one input device and the at least one output device,
wherein the at least one data store includes data corresponding to
a communication address associated with each carrier contact device,
each repository, and
a plurality of parcel transaction locations, wherein each parcel transaction location does not include a repository and corresponds to a location at which parcels transported via the system may be at least one of delivered and picked up,
wherein the data corresponding to each parcel transaction location includes data corresponding to
a street address associated with the respective parcel transaction location, and
a customer name associated with the respective parcel transaction location,
wherein the central system circuitry is operative to communicate at least one parcel transaction message with a first parcel carrier contact device through use of the communication address data associated in the at least one data store with the respective first parcel carrier contact device,
wherein the at least one parcel transaction message corresponds to an instruction to pickup or deliver a parcel at a first parcel transaction location, wherein the at least one parcel transaction message includes data corresponding to at least one of the street address data and the customer name data associated in the at least one data store with the first parcel transaction location,
wherein the at least one parcel transaction message is operative to cause the contact device control circuitry of the first parcel carrier contact device to enable the at least one output device of the first parcel carrier contact device to provide at least one output corresponding to at least one of
the street address of the first parcel transaction location, and
the customer name associated with the first parcel transaction location.

24. The apparatus according to claim 23
wherein the at least one data store further includes data corresponding to
a geolocation to provide the parcel pickup or parcel delivery at the respective parcel transaction location,
wherein the at least one parcel transaction message includes data corresponding to the geolocation data associated in the at least one data store with the first parcel transaction location,
wherein the at least one parcel transaction message is operative to cause the contact device control circuitry of the first parcel carrier contact device to enable the at least one output device of the first parcel carrier contact device to provide at least one output corresponding to the geolocation at the street address of the parcel transaction location.

25. The apparatus according to claim 23
wherein the at least one data store further includes data corresponding to
at least one parcel transaction parameter, wherein the at least one parcel transaction parameter includes data corresponding to at least one of
a geolocation for parcel pickup or delivery at the respective parcel transaction location,
a security procedure to conduct a parcel transaction at the respective parcel transaction location,
a parking location for parcel pickup or delivery at the respective parcel transaction location
a hazard warning for conduct of a parcel pickup or delivery at the respective parcel transaction location,
a facility name associated with the respective parcel transaction location,
at least one of a contact phone number and a contact email associated with the respective parcel transaction location,
an access route at the respective parcel transaction location to reach a parcel pickup or delivery location,
a time range during which parcel pickup or delivery can be conducted at the respective parcel transaction location,
a handling procedure for parcel pickup or delivery at the respective parcel transaction location,
an image associated with the respective parcel transaction location,
wherein the at least one parcel transaction message includes data corresponding to the at least one parcel transaction parameter,
wherein the at least one parcel transaction message is operative to cause the contact device control circuitry of the first parcel carrier contact device to enable the at least one output device of the first parcel carrier contact device to provide at least one output corresponding to the at least one parcel transaction parameter.

26. The apparatus according to claim 25
wherein the central system circuitry is operative to communicate at least one further parcel transaction message with the first parcel carrier contact device,
wherein the at least one further parcel transaction message includes item carrier parcel transaction data corresponding to at least one parcel transaction location related input through the at least one input device of the first carrier contact device,
wherein the central system circuitry is operative responsive at least in part to the at least one further parcel transaction message to cause data corresponding to the carrier parcel transaction data to be stored in association with the data corresponding to the first transaction location in the at least one data store,
wherein the central system circuitry is operative to make data corresponding to the carrier parcel transaction data accessible to parcel carrier contact devices other than the first carrier contact device.

27. The apparatus according to claim 26
wherein the at least one data store further includes data corresponding to a rating of a first parcel carrier associated with use of the first parcel carrier contact device,
wherein the central system circuitry is operative responsive at least in part to the rating data associated with the first parcel carrier, to make the data corresponding to the carrier parcel transaction data accessible to parcel carrier contact devices other than the first carrier contact device.

28. The apparatus according to claim 27 wherein the data corresponding to each repository in the at least one data store includes data corresponding to a repository street address of the respective repository, and a repository geolocation of the respective repository, wherein the central system circuitry is operative to communicate at least one further message with a second parcel carrier contact device through use of the communication address data associated in the at least one data store with the respective second parcel carrier contact device, wherein the at least one further message corresponds to an instruction to at least one of place a further parcel within or remove a further parcel from a first parcel repository, wherein the at least one further message includes data corresponding to the repository street address data and the repository geolocation data associated in the data store with the first parcel repository, wherein the at least one further message is operative to cause the contact device control circuitry of the second parcel carrier contact device to enable the at least one output device of the second parcel carrier contact device to provide at least one output corresponding to the repository street address of the first parcel repository, and the repository geolocation of the first parcel repository at the repository street address.

\* \* \* \* \*